(12) United States Patent
Fisher et al.

(10) Patent No.: US 10,346,275 B2
(45) Date of Patent: *Jul. 9, 2019

(54) ATTRIBUTING CAUSATION FOR ENERGY USAGE AND SETPOINT CHANGES WITH A NETWORK-CONNECTED THERMOSTAT

(71) Applicant: Google LLC, Mountain View, CA (US)

(72) Inventors: Evan J. Fisher, Palo Alto, CA (US); David Sloo, Menlo Park, CA (US); Yoky Matsuoka, Palo Alto, CA (US); Timo A. Bruck, Palo Alto, CA (US); Matthew Lee Rogers, Los Gatos, CA (US); Anthony Michael Fadell, Portola Valley, CA (US)

(73) Assignee: Google LLC, Mountain View, CA (US)

( * ) Notice: Subject to any disclaimer, the term of this patent is extended or adjusted under 35 U.S.C. 154(b) by 1013 days.

This patent is subject to a terminal disclaimer.

(21) Appl. No.: 13/831,236

(22) Filed: Mar. 14, 2013

(65) Prior Publication Data

US 2013/0211783 A1 Aug. 15, 2013

Related U.S. Application Data

(63) Continuation-in-part of application No. 13/434,560, filed on Mar. 29, 2012, now Pat. No. 9,453,655,
(Continued)

(51) Int. Cl.
*G06F 11/30* (2006.01)
*G05D 23/19* (2006.01)
(Continued)

(52) U.S. Cl.
CPC .............. *G06F 11/30* (2013.01); *F24F 11/30* (2018.01); *G05D 23/1904* (2013.01); *F24F 11/52* (2018.01); *F24F 2221/32* (2013.01)

(58) Field of Classification Search
CPC ...................................................... G06F 11/30
See application file for complete search history.

(56) References Cited

U.S. PATENT DOCUMENTS 3,991,357 A 11/1976 Kaminski
4,183,290 A 1/1980 Kucharczyk
(Continued)

FOREIGN PATENT DOCUMENTS

CA 2202008 2/2000
DE 19609390 A1 9/1997
(Continued)

OTHER PUBLICATIONS

Ecobee, "Smart Thermostat" Quick Start Guide (2008).*
(Continued)

*Primary Examiner* — Hyun D Park
(74) *Attorney, Agent, or Firm* — Kilpatrick Townsend & Stockton LLP

(57) ABSTRACT

Systems and methods are described for attributing a primary causative agent for HVAC system usage being above or below an average, the HVAC system being controlled by a self-programming network-connected thermostat. Systems and method are also described interactively and graphically displaying schedule information to a user of an HVAC system controlled by a network-connected thermostat. The displayed information can include indications of the manner in which one or more setpoints was created or last modified. Historical HVAC performance information can also be displayed that can include details of certain energy-effecting events such as setpoint changes, adaptive recovery, as well as automatic and manually set non-occupancy modes.

12 Claims, 40 Drawing Sheets

Related U.S. Application Data which is a continuation-in-part of application No. 13/269,501, filed on Oct. 7, 2011, now Pat. No. 8,918,219, and a continuation-in-part of application No. 13/317,423, filed on Oct. 17, 2011, now Pat. No. 9,489,062, and a continuation-in-part of application No. PCT/US2011/061437, filed on Nov. 18, 2011, and a continuation-in-part of application No. PCT/US2012/030084, filed on Mar. 22, 2012.

(60) Provisional application No. 61/627,996, filed on Oct. 21, 2011, provisional application No. 61/415,771, filed on Nov. 19, 2010, provisional application No. 61/429,093, filed on Dec. 31, 2010.

(51) Int. Cl.
*F24F 11/30* (2018.01)
*F24F 11/52* (2018.01)

(56) References Cited

U.S. PATENT DOCUMENTS

| | | |
|---|---|---|
| 4,223,831 A | 9/1980 | Szarka |
| 4,316,577 A | 2/1982 | Adams et al. |
| 4,335,847 A | 6/1982 | Levine |
| 4,408,711 A | 10/1983 | Levine |
| 4,460,125 A | 7/1984 | Barker et al. |
| 4,615,380 A | 10/1986 | Beckey |
| 4,621,336 A | 11/1986 | Brown |
| 4,674,027 A | 6/1987 | Beckey |
| 4,685,614 A | 8/1987 | Levine |
| 4,751,961 A | 6/1988 | Levine et al. |
| 4,768,706 A | 9/1988 | Parfitt |
| 4,847,781 A | 6/1989 | Brown, III et al. |
| 4,897,798 A | 1/1990 | Cler |
| 4,971,136 A | 11/1990 | Mathur et al. |
| 5,005,365 A | 4/1991 | Lynch |
| D321,903 S | 11/1991 | Chepaitis |
| 5,088,645 A | 2/1992 | Bell |
| 5,211,332 A | 5/1993 | Adams |
| 5,224,648 A | 7/1993 | Simon et al. |
| 5,224,649 A | 7/1993 | Brown et al. |
| 5,240,178 A | 8/1993 | Dewolf et al. |
| 5,244,146 A | 9/1993 | Jefferson et al. |
| D341,848 S | 11/1993 | Bigelow et al. |
| 5,294,047 A | 3/1994 | Schwer et al. |
| 5,303,612 A | 4/1994 | Odom et al. |
| 5,395,042 A * | 3/1995 | Riley .............. F24F 11/0009 165/237 |
| 5,415,346 A | 5/1995 | Bishop |
| 5,460,327 A | 10/1995 | Hill et al. |
| 5,462,225 A | 10/1995 | Massara et al. |
| 5,476,221 A | 12/1995 | Seymour |
| 5,482,209 A | 1/1996 | Cochran et al. |
| 5,485,954 A | 1/1996 | Guy et al. |
| 5,499,196 A | 3/1996 | Pacheco |
| 5,544,036 A | 8/1996 | Brown, Jr. et al. |
| 5,555,927 A | 9/1996 | Shah |
| 5,603,451 A | 2/1997 | Helander et al. |
| 5,611,484 A | 3/1997 | Uhrich |
| 5,627,531 A | 5/1997 | Posso et al. |
| 5,673,850 A | 10/1997 | Uptegraph |
| 5,761,083 A | 6/1998 | Brown, Jr. et al. |
| D396,488 S | 7/1998 | Kunkler |
| 5,808,294 A | 9/1998 | Neumann |
| 5,808,602 A | 9/1998 | Sellers |
| 5,816,491 A | 10/1998 | Berkeley et al. |
| 5,902,183 A | 5/1999 | D'Souza |
| 5,909,378 A | 6/1999 | De Milleville |
| 5,918,474 A | 7/1999 | Khanpara et al. |
| 5,931,378 A | 8/1999 | Schramm |
| 5,959,621 A | 9/1999 | Nawaz et al. |
| 5,973,662 A | 10/1999 | Singers et al. |
| 5,977,964 A | 11/1999 | Williams et al. |
| 6,020,881 A | 2/2000 | Naughton et al. |
| 6,032,867 A | 3/2000 | Dushane et al. |
| 6,062,482 A | 5/2000 | Gauthier et al. |
| 6,066,843 A | 5/2000 | Scheremeta |
| 6,072,784 A | 6/2000 | Agrawal et al. |
| D428,399 S | 7/2000 | Kahn et al. |
| 6,095,427 A | 8/2000 | Hoium et al. |
| 6,098,893 A | 8/2000 | Berglund et al. |
| 6,122,603 A | 9/2000 | Budike, Jr. |
| 6,164,374 A | 12/2000 | Rhodes et al. |
| 6,206,295 B1 | 3/2001 | LaCoste |
| 6,211,921 B1 | 4/2001 | Cherian et al. |
| 6,213,404 B1 | 4/2001 | Dushane et al. |
| 6,216,956 B1 | 4/2001 | Ehlers et al. |
| 6,286,764 B1 | 9/2001 | Garvey et al. |
| 6,298,285 B1 | 10/2001 | Addink et al. |
| 6,311,105 B1 | 10/2001 | Budike, Jr. |
| D450,059 S | 11/2001 | Itou |
| 6,349,883 B1 | 2/2002 | Simmons et al. |
| 6,351,693 B1 | 2/2002 | Monie et al. |
| 6,356,204 B1 | 3/2002 | Guindi et al. |
| 6,363,422 B1 | 3/2002 | Hunter et al. |
| 6,370,894 B1 | 4/2002 | Thompson et al. |
| 6,415,205 B1 | 7/2002 | Myron et al. |
| 6,453,687 B2 | 9/2002 | Sharood et al. |
| D464,660 S | 10/2002 | Weng et al. |
| 6,478,233 B1 | 11/2002 | Shah |
| 6,502,758 B2 | 1/2003 | Cottrell |
| 6,513,723 B1 | 2/2003 | Mueller et al. |
| 6,519,509 B1 | 2/2003 | Nierlich et al. |
| D471,825 S | 3/2003 | Peabody |
| 6,574,581 B1 | 6/2003 | Bohrer et al. |
| 6,595,430 B1 | 7/2003 | Shah |
| 6,619,055 B1 * | 9/2003 | Addy .............. F24F 11/006 236/46 R |
| 6,622,925 B2 | 9/2003 | Carner et al. |
| D480,401 S | 10/2003 | Kahn et al. |
| 6,636,197 B1 | 10/2003 | Goldenberg et al. |
| 6,641,054 B2 | 11/2003 | Morey |
| 6,641,055 B1 | 11/2003 | Tiernan |
| 6,643,567 B2 | 11/2003 | Kolk et al. |
| 6,644,557 B1 | 11/2003 | Jacobs |
| 6,645,066 B2 | 11/2003 | Gutta et al. |
| D485,279 S | 1/2004 | DeCombe |
| 6,726,112 B1 | 4/2004 | Ho |
| D491,956 S | 6/2004 | Ombao et al. |
| 6,769,482 B2 | 8/2004 | Wagner et al. |
| 6,785,630 B2 | 8/2004 | Kolk et al. |
| 6,798,341 B1 | 9/2004 | Eckel et al. |
| D497,617 S | 10/2004 | Decombe et al. |
| 6,814,299 B1 | 11/2004 | Carey |
| 6,824,069 B2 | 11/2004 | Rosen |
| 6,851,621 B1 | 2/2005 | Wacker et al. |
| D503,631 S | 4/2005 | Peabody |
| 6,891,838 B1 | 5/2005 | Petite et al. |
| 6,904,385 B1 | 6/2005 | Budike, Jr. |
| 6,909,921 B1 | 6/2005 | Bilger |
| 6,951,306 B2 | 10/2005 | DeLuca |
| D511,527 S | 11/2005 | Hernandez et al. |
| 6,975,958 B2 | 12/2005 | Bohrer et al. |
| 6,990,821 B2 | 1/2006 | Singh et al. |
| 7,000,849 B2 | 2/2006 | Ashworth et al. |
| 7,024,336 B2 | 4/2006 | Salsbury et al. |
| 7,028,912 B1 | 4/2006 | Rosen |
| 7,038,667 B1 | 5/2006 | Vassallo et al. |
| 7,055,759 B2 | 6/2006 | Wacker et al. |
| 7,083,109 B2 | 8/2006 | Pouchak |
| 7,108,194 B1 | 9/2006 | Hankins, II |
| 7,111,788 B2 | 9/2006 | Reponen |
| 7,114,554 B2 | 10/2006 | Bergman et al. |
| 7,135,965 B2 | 11/2006 | Chapman, Jr. et al. |
| 7,140,551 B2 | 11/2006 | de Pauw et al. |
| 7,141,748 B2 | 11/2006 | Tanaka et al. |
| 7,142,948 B2 | 11/2006 | Metz |
| 7,149,727 B1 | 12/2006 | Nicholls et al. |
| 7,149,729 B2 | 12/2006 | Kaasten et al. |
| 7,152,806 B1 | 12/2006 | Rosen |
| 7,156,318 B1 | 1/2007 | Rosen |
| 7,159,789 B2 | 1/2007 | Schwendinger et al. |

(56) References Cited

U.S. PATENT DOCUMENTS

| | | |
|---|---|---|
| 7,159,790 B2 | 1/2007 | Schwendinger et al. |
| 7,181,317 B2 | 2/2007 | Amundson et al. |
| 7,188,482 B2 | 3/2007 | Sadegh et al. |
| 7,222,494 B2 | 5/2007 | Peterson et al. |
| 7,222,800 B2 | 5/2007 | Wruck |
| 7,225,054 B2 | 5/2007 | Amundson et al. |
| D544,877 S | 6/2007 | Sasser |
| 7,232,075 B1 * | 6/2007 | Rosen ............... G05D 23/1902 236/51 |
| 7,258,280 B2 | 8/2007 | Wolfson |
| D550,691 S | 9/2007 | Nally et al. |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,289,887 B2 | 10/2007 | Rodgers |
| 7,299,996 B2 | 11/2007 | Garrett et al. |
| 7,302,642 B2 | 11/2007 | Smith et al. |
| 7,333,880 B2 | 2/2008 | Brewster et al. |
| 7,346,467 B2 | 3/2008 | Bohrer et al. |
| D566,587 S | 4/2008 | Rosen |
| 7,379,778 B2 * | 5/2008 | Hayes .................. G05B 15/02 340/10.1 |
| 7,379,791 B2 | 5/2008 | Tamarkin et al. |
| RE40,437 E | 7/2008 | Rosen |
| 7,418,663 B2 | 8/2008 | Pettinati et al. |
| 7,427,926 B2 | 9/2008 | Sinclair et al. |
| 7,434,742 B2 | 10/2008 | Mueller et al. |
| 7,451,937 B2 | 11/2008 | Flood et al. |
| 7,455,240 B2 | 11/2008 | Chapman, Jr. et al. |
| 7,460,690 B2 | 12/2008 | Cohen |
| 7,469,550 B2 | 12/2008 | Chapman, Jr. et al. |
| D588,152 S | 3/2009 | Okada |
| 7,509,753 B2 | 3/2009 | Nicosia et al. |
| D589,792 S | 4/2009 | Clabough et al. |
| D590,412 S | 4/2009 | Saft et al. |
| 7,516,106 B2 | 4/2009 | Ehlers et al. |
| D593,120 S | 5/2009 | Bouchard et al. |
| 7,537,171 B2 | 5/2009 | Mueller et al. |
| D594,015 S | 6/2009 | Singh et al. |
| D595,309 S | 6/2009 | Saski et al. |
| 7,555,364 B2 | 6/2009 | Poth et al. |
| D596,194 S | 7/2009 | Vu et al. |
| D597,101 S | 7/2009 | Chaudhri et al. |
| 7,558,648 B2 | 7/2009 | Hoglund et al. |
| D598,463 S | 8/2009 | Hirsch et al. |
| 7,571,014 B1 | 8/2009 | Lambourne et al. |
| 7,571,865 B2 | 8/2009 | Nicodem et al. |
| 7,575,179 B2 | 8/2009 | Morrow et al. |
| D599,810 S | 9/2009 | Scalisi et al. |
| 7,584,899 B2 | 9/2009 | de Pauw et al. |
| 7,600,694 B2 | 10/2009 | Helt et al. |
| D603,277 S | 11/2009 | Clausen et al. |
| D603,421 S | 11/2009 | Ebeling et al. |
| D604,740 S | 11/2009 | Matheny et al. |
| 7,614,567 B2 | 11/2009 | Chapman, Jr. et al. |
| 7,620,996 B2 | 11/2009 | Torres et al. |
| D607,001 S | 12/2009 | Ording |
| 7,624,931 B2 | 12/2009 | Chapman, Jr. et al. |
| 7,634,504 B2 | 12/2009 | Amundson et al. |
| 7,641,126 B2 | 1/2010 | Schulz et al. |
| 7,644,869 B2 | 1/2010 | Hoglund et al. |
| 7,667,163 B2 | 2/2010 | Ashworth et al. |
| D613,301 S | 4/2010 | Guntaur et al. |
| D614,196 S | 4/2010 | Guntaur et al. |
| 7,693,582 B2 | 4/2010 | Bergman et al. |
| 7,702,424 B2 | 4/2010 | Cannon et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,784,704 B2 | 8/2010 | Harter |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| 7,848,900 B2 | 12/2010 | Steinberg et al. |
| 7,849,698 B2 | 12/2010 | Harrod et al. |
| 7,854,389 B2 | 12/2010 | Ahmed |
| D630,649 S | 1/2011 | Tokunaga et al. |
| 7,890,195 B2 | 2/2011 | Bergman et al. |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 6/2011 | Gardner et al. |
| 7,984,384 B2 | 6/2011 | Chaudhri et al. |
| D643,045 S | 8/2011 | Woo |
| 8,010,237 B2 | 8/2011 | Cheung et al. |
| 8,019,567 B2 | 9/2011 | Steinberg et al. |
| 8,037,022 B2 | 10/2011 | Rahman et al. |
| D648,735 S | 11/2011 | Arnold et al. |
| D651,529 S | 1/2012 | Mongell et al. |
| 8,090,477 B1 | 1/2012 | Steinberg |
| 8,091,375 B2 | 1/2012 | Crawford |
| 8,091,794 B2 | 1/2012 | Siddaramanna et al. |
| 8,091,795 B1 * | 1/2012 | McLellan ......... G05D 23/1923 236/51 |
| 8,131,207 B2 | 3/2012 | Hwang et al. |
| 8,131,497 B2 | 3/2012 | Steinberg et al. |
| 8,131,506 B2 | 3/2012 | Steinberg et al. |
| 8,136,052 B2 | 3/2012 | Shin et al. |
| D656,950 S | 4/2012 | Shallcross et al. |
| D656,952 S | 4/2012 | Weir et al. |
| 8,155,900 B1 | 4/2012 | Adams |
| 8,156,060 B2 | 4/2012 | Borzestowski et al. |
| 8,166,395 B2 | 4/2012 | Omi et al. |
| D658,674 S | 5/2012 | Shallcross et al. |
| 8,174,381 B2 | 5/2012 | Imes et al. |
| 8,180,492 B2 | 5/2012 | Steinberg |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,219,249 B2 | 7/2012 | Harrod et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,280,536 B1 | 10/2012 | Fadell et al. |
| 8,281,244 B2 | 10/2012 | Neuman et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| 8,392,561 B1 * | 3/2013 | Dyer .................. H04L 63/0281 709/225 |
| 8,442,695 B2 | 5/2013 | Imes et al. |
| 8,442,752 B2 | 5/2013 | Wijaya et al. |
| 8,543,243 B2 | 9/2013 | Wallaert et al. |
| 8,571,518 B2 | 10/2013 | Imes et al. |
| 8,893,032 B2 | 11/2014 | Bruck et al. |
| 2002/0005435 A1 | 1/2002 | Cottrell |
| 2002/0022991 A1 | 2/2002 | Sharood et al. |
| 2002/0178047 A1 | 11/2002 | Or |
| 2003/0034898 A1 | 2/2003 | Shamoon et al. |
| 2003/0042320 A1 | 3/2003 | Decker |
| 2003/0070437 A1 | 4/2003 | Hafner et al. |

(56) References Cited

U.S. PATENT DOCUMENTS

| | | |
|---|---|---|
| 2003/0093186 A1 | 5/2003 | Patterson et al. |
| 2003/0112262 A1 | 6/2003 | Adatia et al. |
| 2003/0150927 A1 | 8/2003 | Rosen |
| 2003/0231001 A1 | 12/2003 | Bruning |
| 2004/0034484 A1 | 2/2004 | Solomita, Jr. et al. |
| 2004/0055446 A1 | 3/2004 | Robbin et al. |
| 2004/0074978 A1 | 4/2004 | Rosen |
| 2004/0095237 A1 | 5/2004 | Chen et al. |
| 2004/0133314 A1* | 7/2004 | Ehlers .................. F24F 11/0012 700/276 |
| 2004/0164238 A1 | 8/2004 | Xu et al. |
| 2004/0225955 A1 | 11/2004 | Ly |
| 2004/0249479 A1 | 12/2004 | Shorrock |
| 2004/0256472 A1 | 12/2004 | DeLuca |
| 2004/0260427 A1* | 12/2004 | Wimsatt .................. G05B 15/02 700/275 |
| 2004/0262410 A1 | 12/2004 | Hull |
| 2005/0040250 A1* | 2/2005 | Wruck .................. C09D 5/4492 236/51 |
| 2005/0043907 A1 | 2/2005 | Eckel et al. |
| 2005/0053063 A1 | 3/2005 | Madhavan |
| 2005/0055432 A1 | 3/2005 | Rodgers |
| 2005/0071780 A1 | 3/2005 | Muller et al. |
| 2005/0090915 A1 | 4/2005 | Geiwitz |
| 2005/0119766 A1 | 6/2005 | Amundson et al. |
| 2005/0119793 A1 | 6/2005 | Amundson et al. |
| 2005/0120012 A1* | 6/2005 | Poth ........................ G05B 15/02 |
| 2005/0128067 A1 | 6/2005 | Zakrewski |
| 2005/0150968 A1 | 7/2005 | Shearer |
| 2005/0159847 A1 | 7/2005 | Shah et al. |
| 2005/0189429 A1 | 9/2005 | Breeden |
| 2005/0192915 A1 | 9/2005 | Ahmed et al. |
| 2005/0194456 A1 | 9/2005 | Tessier et al. |
| 2005/0195757 A1 | 9/2005 | Kidder et al. |
| 2005/0204997 A1 | 9/2005 | Fournier |
| 2005/0280421 A1 | 12/2005 | Yomoda et al. |
| 2006/0123053 A1* | 6/2006 | Scannell, Jr. ..... G06F 17/30035 |
| 2006/0147003 A1 | 7/2006 | Archacki et al. |
| 2006/0186214 A1 | 8/2006 | Simon et al. |
| 2006/0196953 A1* | 9/2006 | Simon .................. G05D 23/1934 236/46 R |
| 2006/0206220 A1 | 9/2006 | Amundson |
| 2006/0283965 A1* | 12/2006 | Mueller ................ G05B 19/042 236/51 |
| 2007/0001830 A1 | 1/2007 | Dagci et al. |
| 2007/0043478 A1 | 2/2007 | Ehlers et al. |
| 2007/0045430 A1 | 3/2007 | Chapman et al. |
| 2007/0045431 A1 | 3/2007 | Chapman, Jr. et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0084941 A1 | 4/2007 | De Pauw et al. |
| 2007/0105252 A1 | 5/2007 | Lee et al. |
| 2007/0114295 A1 | 5/2007 | Jenkins |
| 2007/0115902 A1 | 5/2007 | Shamoon et al. |
| 2007/0127645 A1* | 6/2007 | Bloebaum ......... H04M 3/42076 379/93.09 |
| 2007/0158442 A1 | 7/2007 | Chapman et al. |
| 2007/0158444 A1 | 7/2007 | Naujok et al. |
| 2007/0173978 A1 | 7/2007 | Fein et al. |
| 2007/0205297 A1 | 9/2007 | Finkam et al. |
| 2007/0213876 A1 | 9/2007 | Warren et al. |
| 2007/0225867 A1 | 9/2007 | Moorer et al. |
| 2007/0227721 A1 | 10/2007 | Springer et al. |
| 2007/0228182 A1* | 10/2007 | Wagner ............. G05D 23/1902 236/94 |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0278320 A1 | 12/2007 | Lunacek et al. |
| 2008/0004838 A1 | 1/2008 | Yungkurth et al. |
| 2008/0006709 A1 | 1/2008 | Ashworth et al. |
| 2008/0015740 A1 | 1/2008 | Osann |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0054084 A1 | 3/2008 | Olson |
| 2008/0099568 A1 | 5/2008 | Nicodem et al. |
| 2008/0183335 A1 | 7/2008 | Poth et al. |
| 2008/0191045 A1 | 8/2008 | Harter |
| 2008/0215240 A1 | 9/2008 | Howard et al. |
| 2008/0221737 A1 | 9/2008 | Josephson et al. |
| 2008/0245480 A1 | 10/2008 | Knight et al. |
| 2008/0256475 A1 | 10/2008 | Amundson et al. |
| 2008/0262755 A1 | 10/2008 | Dayton et al. |
| 2008/0273754 A1 | 11/2008 | Hick et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0001181 A1 | 1/2009 | Siddaramanna et al. |
| 2009/0012959 A1 | 1/2009 | Ylivainio et al. |
| 2009/0057427 A1 | 3/2009 | Gaedelmann et al. |
| 2009/0099699 A1 | 4/2009 | Steinberg et al. |
| 2009/0125151 A1 | 5/2009 | Steinberg et al. |
| 2009/0140056 A1 | 6/2009 | Leen |
| 2009/0140057 A1 | 6/2009 | Leen |
| 2009/0140060 A1 | 6/2009 | Stoner et al. |
| 2009/0140064 A1 | 6/2009 | Schultz et al. |
| 2009/0143916 A1 | 6/2009 | Boll et al. |
| 2009/0143918 A1 | 6/2009 | Amundson et al. |
| 2009/0157529 A1 | 6/2009 | Ehlers et al. |
| 2009/0171862 A1 | 7/2009 | Harrod et al. |
| 2009/0194601 A1 | 8/2009 | Flohr |
| 2009/0195349 A1 | 8/2009 | Frader-Thompson et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0263773 A1 | 10/2009 | Kotlyar et al. |
| 2009/0273610 A1 | 11/2009 | Busch et al. |
| 2009/0276714 A1 | 11/2009 | Kandlikar et al. |
| 2009/0283603 A1 | 11/2009 | Peterson et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0058450 A1 | 3/2010 | Fein et al. |
| 2010/0070084 A1 | 3/2010 | Steinberg et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070234 A1 | 3/2010 | Steinberg et al. |
| 2010/0070907 A1 | 3/2010 | Harrod et al. |
| 2010/0084482 A1 | 4/2010 | Kennedy et al. |
| 2010/0104074 A1 | 4/2010 | Yang |
| 2010/0106305 A1 | 4/2010 | Pavlak et al. |
| 2010/0106322 A1 | 4/2010 | Grohman |
| 2010/0107070 A1 | 4/2010 | Devineni et al. |
| 2010/0107076 A1 | 4/2010 | Grohman et al. |
| 2010/0107103 A1 | 4/2010 | Wallaert et al. |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0198425 A1 | 8/2010 | Donovan |
| 2010/0211224 A1 | 8/2010 | Keeling et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0273610 A1 | 10/2010 | Johnson |
| 2010/0276482 A1 | 11/2010 | Raihi et al. |
| 2010/0280667 A1 | 11/2010 | Steinberg |
| 2010/0282857 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0022242 A1 | 1/2011 | Bukhin et al. |
| 2011/0029488 A1 | 2/2011 | Fuerst et al. |

(56) References Cited

U.S. PATENT DOCUMENTS

| | | |
|---|---|---|
| 2011/0046756 A1 | 2/2011 | Park |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054710 A1 | 3/2011 | Imes et al. |
| 2011/0077758 A1 | 3/2011 | Tran et al. |
| 2011/0077896 A1 | 3/2011 | Steinberg et al. |
| 2011/0078675 A1 | 3/2011 | Van Camp et al. |
| 2011/0095897 A1 | 4/2011 | Sutrave |
| 2011/0106328 A1 | 5/2011 | Zhou et al. |
| 2011/0132990 A1 | 6/2011 | Lin et al. |
| 2011/0151837 A1 | 6/2011 | Winbush, III |
| 2011/0160913 A1 | 6/2011 | Parker et al. |
| 2011/0166828 A1 | 7/2011 | Steinberg et al. |
| 2011/0167369 A1 | 7/2011 | Van Os |
| 2011/0184563 A1 | 7/2011 | Foslien |
| 2011/0185895 A1 | 8/2011 | Freen |
| 2011/0257795 A1 | 10/2011 | Narayanamurthy et al. |
| 2011/0282937 A1* | 11/2011 | Deshpande ............ G06F 9/5055 709/203 |
| 2011/0290893 A1 | 12/2011 | Steinberg |
| 2011/0307103 A1 | 12/2011 | Cheung et al. |
| 2011/0307112 A1 | 12/2011 | Barrilleaux |
| 2012/0005590 A1 | 1/2012 | Lombard et al. |
| 2012/0017611 A1 | 1/2012 | Coffel et al. |
| 2012/0036250 A1 | 2/2012 | Vaswani et al. |
| 2012/0046792 A1 | 2/2012 | Secor |
| 2012/0053745 A1 | 3/2012 | Ng |
| 2012/0065783 A1 | 3/2012 | Fadell et al. |
| 2012/0065935 A1 | 3/2012 | Steinberg et al. |
| 2012/0068854 A1 | 3/2012 | Shiflet et al. |
| 2012/0085831 A1 | 4/2012 | Kopp |
| 2012/0086562 A1 | 4/2012 | Steinberg |
| 2012/0089523 A1 | 4/2012 | Hurri et al. |
| 2012/0101637 A1 | 4/2012 | Imes et al. |
| 2012/0116593 A1 | 5/2012 | Amundson et al. |
| 2012/0130513 A1 | 5/2012 | Hao et al. |
| 2012/0130546 A1 | 5/2012 | Matas et al. |
| 2012/0130907 A1 | 5/2012 | Thompson et al. |
| 2012/0131504 A1 | 5/2012 | Fadell et al. |
| 2012/0143536 A1 | 6/2012 | Greaves et al. |
| 2012/0158350 A1 | 6/2012 | Steinberg et al. |
| 2012/0166616 A1 | 6/2012 | Meehan |
| 2012/0221151 A1 | 8/2012 | Steinberg |
| 2012/0252430 A1 | 10/2012 | Imes et al. |
| 2012/0274602 A1 | 11/2012 | Bita |
| 2012/0296488 A1 | 11/2012 | Dharwada et al. |
| 2013/0014057 A1 | 1/2013 | Reinpoldt et al. |
| 2013/0046872 A1* | 2/2013 | Seelman ............ H04L 12/2807 709/223 |
| 2013/0055132 A1 | 2/2013 | Foslien |
| 2013/0116953 A1* | 5/2013 | Pollard ................. G01D 4/002 702/62 |
| 2013/0263034 A1 | 10/2013 | Bruck et al. |
| 2015/0058779 A1 | 2/2015 | Bruck et al. |

FOREIGN PATENT DOCUMENTS

| | | |
|---|---|---|
| EP | 434926 A2 | 7/1991 |
| EP | 196069 | 12/1991 |
| EP | 720077 A2 | 7/1996 |
| EP | 802471 B1 | 8/1999 |
| EP | 1065079 | 1/2001 |
| EP | 1703356 | 9/2006 |
| EP | 1731984 A1 | 12/2006 |
| EP | 2157492 | 2/2010 |
| EP | 2157492 A2 | 2/2010 |
| GB | 2212317 B | 5/1992 |
| JP | 59106311 | 6/1984 |
| JP | 01252850 | 10/1989 |
| JP | 9298780 | 11/1997 |
| JP | 10023565 A | 1/1998 |
| JP | 2002087050 A | 3/2002 |
| JP | 2003054290 A | 2/2003 |
| NL | 1024986 C2 | 6/2005 |
| WO | 248851 A2 | 6/2002 |
| WO | 2008054938 | 5/2008 |
| WO | 2009073496 A2 | 6/2009 |
| WO | 2009073496 | 7/2009 |
| WO | 2010033563 A1 | 3/2010 |
| WO | 2011128416 A2 | 10/2011 |
| WO | 2011149600 A2 | 12/2011 |
| WO | 2012/024534 A2 | 2/2012 |
| WO | 2013/058820 | 4/2013 |
| WO | 2013149210 | 10/2013 |

OTHER PUBLICATIONS

Hai Lin et al., Internet Based Monitoring and Controls for HVAC Applications, Jan. 2002, IEEE, p. 49-54.

International Search Report and Written Opinion dated Jul. 6, 2012 for International Patent Applciation No. PCT/US2012/030084 filed Mar. 22, 2012, all pages.

International Preliminary Report on Patentability dated Apr. 22, 2014 for International Patent Applciation No. PCT/US2012/030084 filed Mar. 22, 2012, all pages.

Aprilaire Electronic Thermostats Model 8355 User's Manual, Research Products Corporation, Dec. 2000, 16 pages.

Braeburn 5300 Installer Guide, Braeburn Systems, LLC, Dec. 9, 2009, 10 pages.

Braeburn Model 5200, Braeburn Systems, LLC, Jul. 20, 2011, 11 pages.

Ecobee Smart Si Thermostat Installation Manual, Ecobee, Apr. 3, 2012, 40 pages.

Ecobee Smart Si Thermostat User Manual, Ecobee, Apr. 3, 2012, 44 pages.

Ecobee Smart Thermostat Installation Manual, Jun. 29, 2011, 20 pages.

Ecobee Smart Thermostat User Manual, May 11, 2010, 20 pages.

Electric Heat Lock Out on Heat Pumps, Washington State University Extension Energy Program, Apr. 2010, pp. 1-3.

Honeywell Installation Guide FocusPRO TH6000 Series, Honeywell International, Inc., Jan. 5, 2012, 24 pages.

Honeywell Operating Manual FocusPRO TH6000 Series, Honeywell International, Inc., Mar. 25, 2011, 80 pages.

Honeywell Prestige THX9321-9421 Operating Manual, Honeywell International, Inc., Jul. 6, 2011, 120 pages.

Honeywell THX9321 Prestige 2.0 and TXH9421 Prestige IAQ 2.0 with EIM Product Data, Honeywell International, Inc., 68/0311, Jan. 2012, 126 pages.

Hunter Internet Thermostat Installation Guide, Hunter Fan Co., Aug. 14, 2012, 8 pages.

Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.

Lennox ComfortSense 5000 Owners Guide, Lennox Industries, Inc., Feb. 2008, 32 pages.

Lennox ComfortSense 7000 Owners Guide, Lennox Industries, Inc., May 2009, 15 pages.

Lennox iComfort Manual, Lennox Industries, Inc., Dec. 2010, 20 pages.

Lux PSPU732T Manual, LUX Products Corporation, Jan. 6, 2009, 48 pages.

NetX RP32-WIFI Network Thermostat Consumer Brochure, Network Thermostat, May 2011, 2 pages.

NetX RP32-WIFI Network Thermostat Specification Sheet, Network Thermostat, Feb. 28, 2012, 2 pages.

RobertShaw Product Manual 9620, Maple Chase Company, Jun. 12, 2001, 14 pages.

RobertShaw Product Manual 9825i2, Maple Chase Company, Jul. 17, 2006, 36 pages.

SYSTXCCUIZ01-V Infinity Control Installation Instructions, Carrier Corp, May 31, 2012, 20 pages.

T8611G Chronotherm IV Deluxe Programmable Heat Pump Thermostat Product Data, Honeywell International Inc., Oct. 1997, 24 pages.

(56) References Cited

OTHER PUBLICATIONS

TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
Ros et al., Multi-Sensor Human Tracking with the Bayesian Occupancy Filter, IEEE, 2009, 8 pages.
Wong et al., Maximum Likelihood Estimation of ARMA Model with Error Processes for Replicated Observations, National University of Singapore, Department of Economics, Working Paper No. 0217, Feb. 2002, pp. 1-19.
Energy Joule. Datasheet [online]. Ambient Devices, No Date Given, [retrieved on Aug. 1, 2012]. Retrieved from the Internet: <URL:http://web.archive.org/web/20110723210421/http://www.ambientdevices.com/products/energyjoule.html>.
Honeywell CT2700, An Electronic Round Programmable Thermostat—User's guide, Honeywell, Inc., 1997, 8 pages.
Honeywell CT8775A,C, The digital Round Non-Programmable Thermostats—Owner's Guide, Honeywell International Inc., 2003, 20 pages.
Honeywell T8700C, An Electronic Round Programmable Thermostat—Owner's Guide, Honeywell International Inc., 2003, 20 pages.
Honeywell T8755 The Digital Round Thermostat, Honeywell, 2003, 2 pages.
Honeywell T8775A, C Digital Round Thermostat Manual No. 69-1679EF-1, www.honeywell.com/yourhome, Jun. 2004, pp. 1-16.
ICY3815TT-001 Timer-Thermostat Package Box, Product Bar Code No. 8717953007902, No Date Given, 2 pages.
SCE Energy$mart Thermostat Study for Southern California Edison—Presentation of Study Results, Population Research Systems, Project #1010, Nov. 10, 2004, 51 pages.
The Clever Thermostat, ICY BV Web Page, http://www.icy.nl/en/consumer/products/clever-thermostat, 2012 ICY BV, 1 page.
The Clever Thermostat User Manual and Installation Guide, ICY BV ICY3815 Timer-Thermostat, 2009, pp. 1-36.
U.S. Appl. No. 60/512,886, Volkswagen Rotary Knob for Motor Vehicle—English Translation of German Application filed Oct. 20, 2003.
Arens, et al., Demand Response Electrical Appliance Manager—User Interface Design, Development and Testing, Poster, Demand Response Enabling Technology Development, University of California Berkeley, Retrieved from dr.berkeley.edu/dream/posters/2005_6GUIposter.pdf, 2005, 1 page.
Arens, et al., Demand Response Enabled Thermostat—Control Strategies and Interface, Demand Response Enabling Technology Development Poster, University of California Berkeley, Retrieved from dr.berkeley.edu/dream/posters/2004_110EC_TstatPoster.pdf, 2004, 1 page.
Arens, et al., Demand Response Enabling Technology Development, Phase I Report: Jun. 2003-Nov. 2005, Jul. 27, P:/DemandRes/UC Papers/DR-Phase1Report-Final Draft April24-26.doc, University of California, Berkeley, pp. 1-108.
Arens, et al., New Thermostat Demand Response Enabling Technology Poster, University of California Berkeley, Jun. 10, 2004.
Auslander, et al., UC Berkeley DR Research Energy Management Group, Power Point Presentation, DR ETD Workshop, State of California Energy Commission, Jun. 11, 2007, pp. 1-35.
Chen, et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.
De Almeida, et al., Advanced Monitoring Technologies for the Evaluation of Demand-Side Management Programs, Energy, Vo.. 19, No. 6, 1994, pp. 661-678.
Gevorkian, Alternative Energy Systems in Building Design, 2009, pp. 195-200.
Green, Thermo Heat Tech Cool, Popular Mechanics Electronic Thermostat Guide, Oct. 1985, pp. 155-158.
Hoffman, et al., Integration of Remote Meter Reading, Load Control and Monitoring of Customers' Installations for Customer Automation with Telephone Line Signaling, Electricity Distribution, 1989, CIRED 1989. 10th International Conference on May 8-12, 1989. pp. 421-424.
Levy, A Vision of Demand Response—2016, The Electricity Journal, vol. 19, Issue 8, Oct. 2006, pp. 12-23.
Lopes, Case Studies in Advanced Thermostat Control for Demand Response, AEIC Load Research Conference, St. Louis, MO, Jul. 2004, 36 pages.
Martinez, SCE Energy$mart Thermostat Program, Advanced Load Control Alliance, Oct. 5, 2004, 20 pages.
Matty, Advanced Energy Management for Home Use, IEEE Transaction on Consumer electronics, vol. 35, No. 3, Aug. 1989, pp. 584-588.
Meier, et al., Thermostat Interface Usability: A Survey, Ernest Orlando Lawrence Berkeley National Laboratory, Environmental Energy Technologies Division, Berkeley California, Sep. 2010, pp. 1-73.
Motegi, et al., Introduction to Commercial Building Control Strategies and Techniques for Demand Response, Demand Response Research Center, May 22, 2007, 35 pages.

(56) References Cited

OTHER PUBLICATIONS

Peffer, et al., A Tale of Two Houses: The Human Dimension of Demand Response Enabling Technology from a Case Study of Adaptive Wireless Thermostat, Abstract, ACEEE Summer Study on Energy Efficiency in Buildings Architecture Dept. and Mechanical Engineering Dept., University of California Berkeley, 2008, pp. 7-242 through 7-253.
Peffer, et al., Smart Comfort At Home: Desgin of a Residential Thermostat to Achieve Thermal Comfort, and Save Money and Peak Energy, University of California Berkeley, Mar. 2007, 1 page.
Salus, S-Series Digital Thermostat Instruction Manual-ST620 Model No. Instruction Manual, www.salus-tech.com, Version 005, Apr. 29, 2010, 24 pages.
Sanford, iPod (Click Wheel) (2004), www.apple-history.com [retrieved on Apr. 9, 2012]. Retrieved from: http://apple-history.com/ipod,2 pages.
Wright, et al., DR ETD—Summary of New Thermostat, TempNode & New Meter (UC Berkeley Project), Power Point Presentation, Public Interest Energy Research, University of California Berkeley. Retrieved from: http://dr.berkeley.edu/dream/presentations/2005_6CEC.pdf, 2005, pp. 1-49.
Non-Final Office Action dated on Dec. 26, 2012, for U.S. Appl. No. 13/624,875, filed Sep. 21, 2012, all pages.
Final Office Action dated Aug. 30, 2013, for U.S. Appl. No. 13/624,875, filed Sep. 21, 2012, all pages.
Notice of Allowance dated Jul. 18, 2014, for U.S. Appl. No. 13/624,875, filed Sep. 21, 2012, all pages.
First Office Action dated Sep. 25, 2015, for Chinese Patent Application No. 201380029046.X, filed Mar. 29, 2013, 8 pages (with English Translation.).
Bourke, Server Load Balancing, O'Reilly & Associates, Inc., Aug. 2001, 182 pages.
Detroitborg, Nest Learning Thermostat: Unboxing and Review, [online], retrieved from the Internet: <URL:http://www.youtube.com/watch?v+Krgc0L4oLzc> [retrieved on Feb. 22, 2013], Feb. 10, 2012, 4 pages.
White, et al., A Conceptual Model for Simulation Load Balancing, Proceedings of the 1998 Spring Simulation Interoperability Workshop, 1998, pp. 1-7.
International Application No. PCT/US2013/034718, International Search Report and Written Opinion dated Sep. 6, 2013, 22 pages.
Non-Final Office Action dated Oct. 20, 2014, for U.S. Appl. No. 13/434,560, filed Mar. 29, 2012, all pages.
Final Office Action dated Apr. 7, 2015, for U.S. Appl. No. 13/434,560, filed Mar. 29, 2012, all pages.
Notification on the Grant of Patent Right for Invention for Chinese Patent Application 201380029046.X dated Jun. 2, 2016, 6 pages. English Translation.
Notice of Allowance and Fee(s) due dated Jun. 7, 2016, for U.S. Appl. No. 14/496,782, 20 pages.
U.S. Appl. No. 15/258,422, filed Sep 7, 2016, Notice of Allowance dated Apr. 11, 2017, all pages.
Non-Final Office Action dated Sep. 6, 2018 in U.S. Appl. No. 15/251,582, all pages.
Notice of Allowance dated Jun. 28, 2018 in U.S. Appl. No. 14/530,497, all pages.

\* cited by examiner

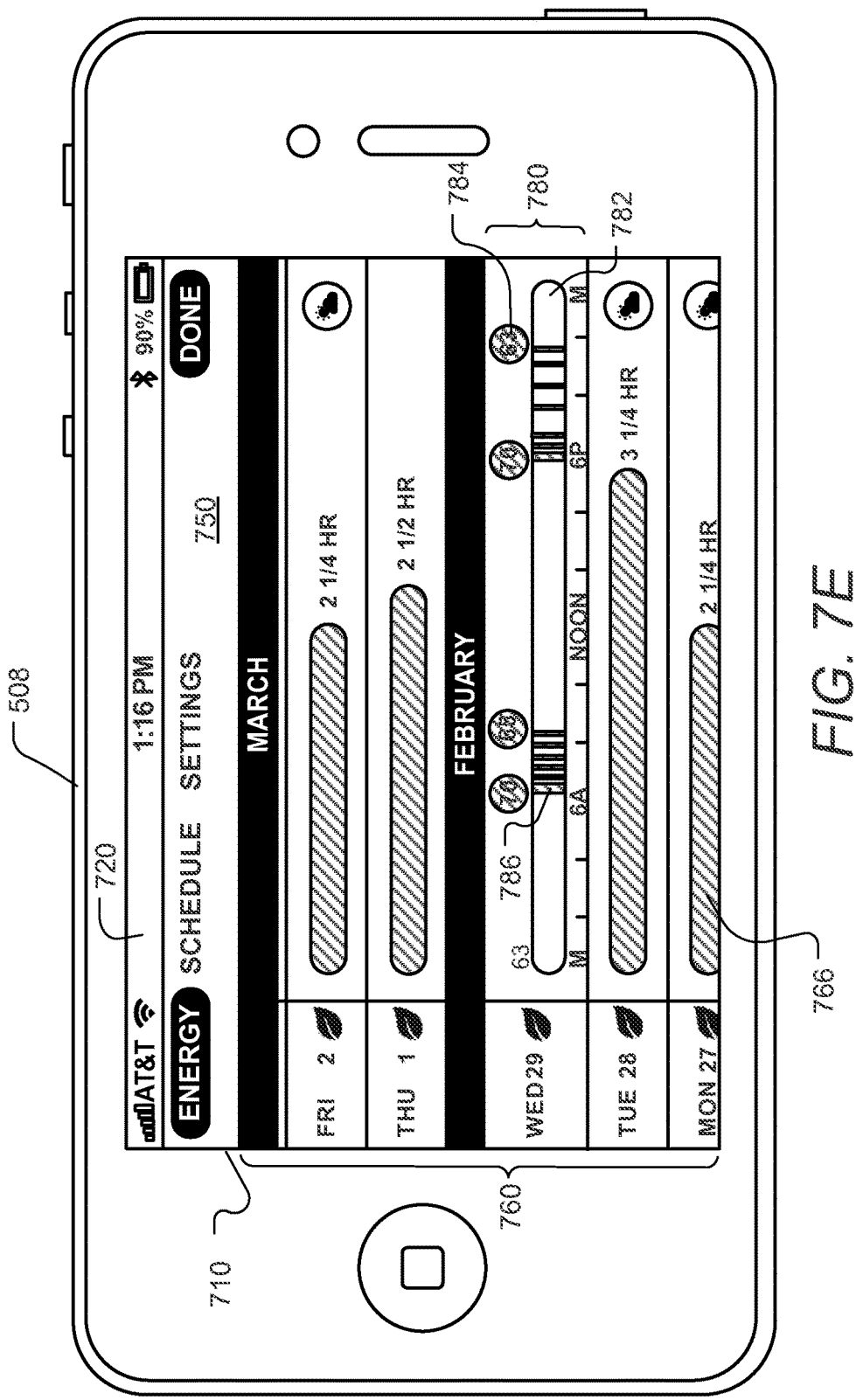

ATTRIBUTING CAUSATION FOR ENERGY USAGE AND SETPOINT CHANGES WITH A NETWORK-CONNECTED THERMOSTAT

CROSS-REFERENCE TO RELATED APPLICATIONS

This patent application is a continuation-in-part of U.S. Ser. No. 13/434,560 filed Mar. 29, 2012. U.S. Ser. No. 13/434,560 is a continuation in part of U.S. Ser. No. 13/269,501 filed Oct. 7, 2011, of U.S. Ser. No. 13/317,423 filed Oct. 17, 2011, of PCT/US11/61437 filed Nov. 18, 2011, and of PCT/US12/30084 filed Mar. 22, 2012. U.S. Ser. No. 13/434,560 furthermore claims the benefit of U.S. Prov. Ser. No. 61/627,996 filed Oct. 21, 2011. U.S. Ser. No. 13/269,501 claims the benefit of: U.S. Provisional No. 61/415,771 filed Nov. 19, 2010; and U.S. Provisional No. 61/429,093 filed Dec. 31, 2010. All of the above-identified applications are incorporated by reference herein.

FIELD

This patent specification relates to systems, methods, and related computer program products for the monitoring and control of energy-consuming systems or other resource-consuming systems. More particularly, this patent specification relates to systems and methods attributing causation for energy usage and setpoint program changes on a network-connected thermostat.

BACKGROUND

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

To encourage users to adopt energy saving operating levels while still maintaining comfort for the occupants, it would be useful to display an attributed causation for energy usage being above or below average, as well as information relating to creation and modification of program setpoints on a network-connected programmable thermostat.

SUMMARY

According to one or more embodiments is a method of attributing a primary causative agent for HVAC system usage being above or below an average is described. The HVAC system is controlled by a self-programming network-connected thermostat. The method includes: using the thermostat to gather information relating to HVAC system usage over a plurality of days, as well as information relating to one or more thermostat setpoints over the plurality of days; calculating an average value for HVAC system usage for the plurality of days based on the gathered information relating to HVAC system usage; determining whether HVAC system usage for a candidate day, being one of the plurality of days, is above or below the calculated average value; hierarchically evaluating a plurality of potential causative agents for the HVAC system usage for the candidate day being above or below average; and attributing a primary causative agent for the HVAC system usage for the candidate day being above or below average based on the hierarchical evaluation.

According to some other embodiments a method is describe for interactively and graphically displaying schedule information to a user of an HVAC system controlled by a network-connected thermostat. The method includes: using the thermostat to gather information relating to HVAC system usage, the thermostat controlling the HVAC system according to a plurality of temperature setpoints, the gathered information including for each temperature setpoint information indicative of a manner in which the temperature setpoint was set; on a display device in a location remote from the thermostat, graphically displaying a plurality of graphical representations each corresponding to one of the plurality of temperature setpoints; and on the display device and based at least in part on the gathered information displaying information indicative of the manner in which a first temperature setpoint was set, the first temperature setpoint being one of the plurality of temperature setpoints.

According to some embodiments, a method is described for interactively and graphically displaying performance information to a user of an HVAC system controlled by a network-connected thermostat. The method includes: using the thermostat to gather information relating to HVAC system usage, the thermostat controlling the HVAC system according to a plurality of temperature setpoints, the setpoints being set by any of a plurality of methods including direct user interaction with the thermostat and remote interaction with the thermostat via network connection; on a display device in a location remote from the thermostat, graphically displaying performance information based on the gathered information, the displayed performance information including a graphical daily summary for each of a plurality of days; graphically displaying on the display device detailed performance information for one of the plurality of days, the information including a plurality of setpoint symbols; receiving user input indicating a selection of one of the plurality of setpoint symbols; and in real time and in response to the received input indicating the selection of one of the plurality of setpoint symbols, displaying on the display device for the selected one of the plurality setpoint symbols, information indicative of a manner in which the selected setpoint was set.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIGS. 7A-7I illustrate aspects of a graphical user interface on a smart phone for performance and other information for an HVAC system controlled by a self-programming network-connected thermostat, according to some embodiments;

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

Figure 1:
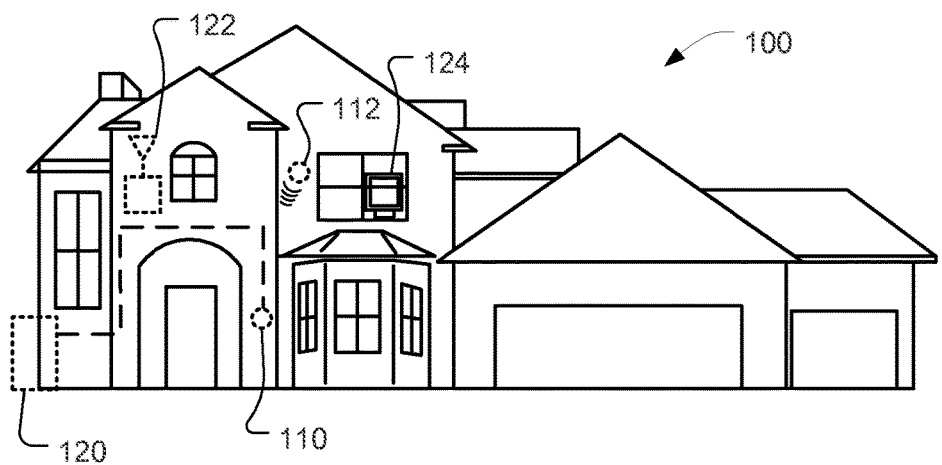
FIG. 1 is a diagram of an enclosure in which environmental conditions are controlled, according to some embodiments.

FIG. 1 is a diagram of an enclosure in which environmental conditions are controlled, according to some embodiments. Enclosure 100 is, in this example, a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input. As used herein, a "primary" thermostat refers to a thermostat that is electrically connected to actuate all or part of an HVAC system, such as by virtue of electrical connection to HVAC control wires (e.g. W, G, Y, etc.) leading to the HVAC system. As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat. In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Other embodiments may instead use multiple discrete switches, routers and other devices (not shown) to perform networking functions equivalent to or in addition to those provided by integrated router 122.

Integrated router 122 further provides network devices access to a public network, such as the Internet, provided enclosure 100 has a connection to the public network generally through a cable-modem, DSL modem and a service provider of the Internet or other public network. The Internet and other public networks are sometimes referred to as a Wide-Area Network or WAN. In one embodiment, integrated router 122 may direct communications to other devices on these networks using a network protocol such as TCP/IP. If the communications are directed to a device or service outside the private network, integrated router 122 may route the communications outside the private network to the public network such as the Internet.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

In accordance with some embodiments, a computer device 124 in enclosure 100 may remotely control thermostat 110 by accessing a thermostat management account through a thermostat management system (not shown in FIG. 1) located on a public network such as the Internet. The thermostat management system passes control information over the network back to thermostat 110 provided the thermostat 110 is also associated or paired to the thermostat management account on the thermostat management system. Data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network and both the thermostat management system and thermostat management account. Further details on accessing the public network, such as the Internet, and a thermostat like thermostat 110 in accordance with embodiments of the present invention is described in further detail later herein.

Figure 2:
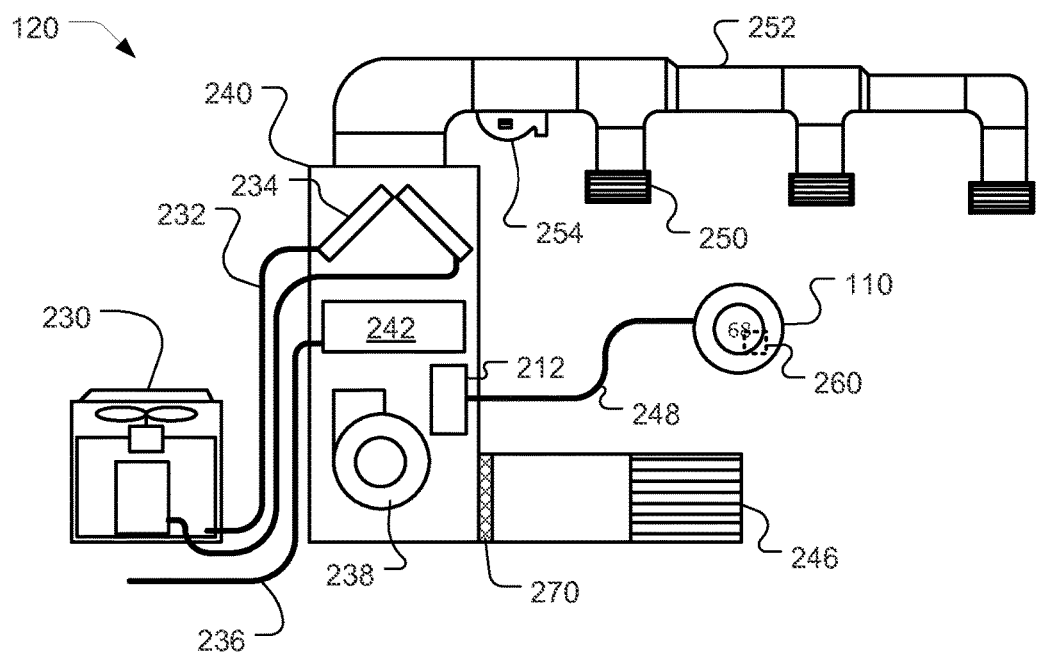
FIG. 2 is a diagram of an HVAC system, according to some embodiments.

FIG. 2 is a schematic diagram of an HVAC system, according to some embodiments. HVAC system 120 provides heating, cooling, ventilation, and/or air handling for the enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils and then through an expansion valve. The gas then goes through line 232 to the cooling coils or evaporator coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3:
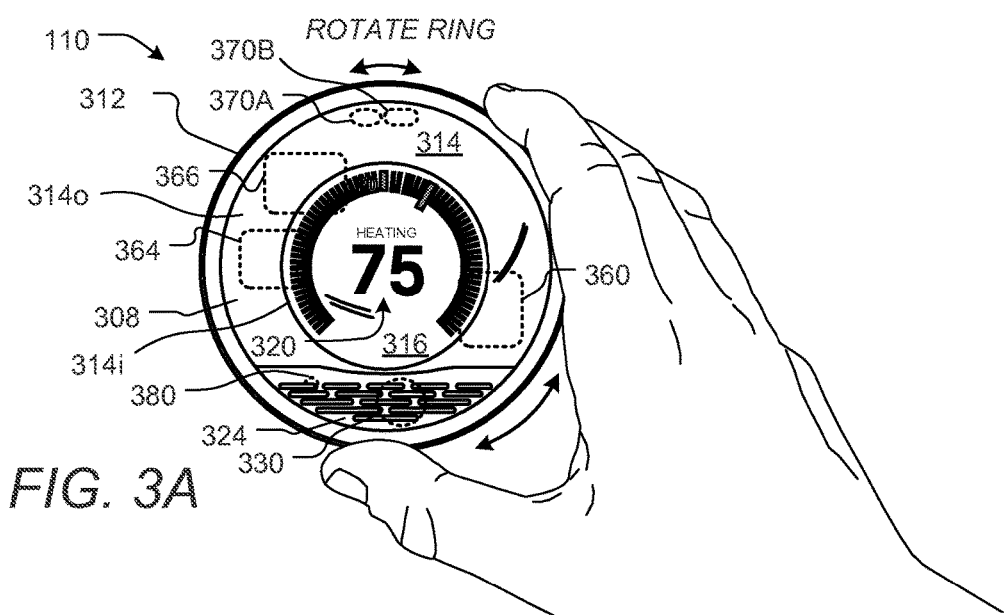
FIGS. 3A-3B illustrate a thermostat having a user-friendly interface, according to some embodiments.
FIG. 3C illustrates a cross-sectional view of a shell portion of a frame of the thermostat of FIGS. 3A-3B.

FIGS. 3A-3B illustrate a thermostat having a user-friendly interface, according to some embodiments. Unlike many prior art thermostats, thermostat 110 preferably has a sleek, simple, uncluttered and elegant design that does not detract from home decoration, and indeed can serve as a visually pleasing centerpiece for the immediate location in which it is installed. Moreover, user interaction with thermostat 110 is facilitated and greatly enhanced over known conventional thermostats by the design of thermostat 110. The thermostat 110 includes control circuitry and is electrically connected to an HVAC system, such as is shown in FIGS. 1 and 2. Thermostat 110 is wall mounted, is circular in shape, and has an outer rotatable ring 312 for receiving user input. Thermostat 110 is circular in shape in that it appears as a generally disk-like circular object when mounted on the wall. Thermostat 110 has a large front face lying inside the outer ring 312. According to some embodiments, thermostat 110 is approximately 80 mm in diameter. The outer rotatable ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. The front face of the thermostat 110 comprises a clear cover 314 that according to some embodiments is polycarbonate, and a metallic portion 324 preferably having a number of slots formed therein as shown. According to some embodiments, the surface of cover 314 and metallic portion 324 form a common outward arc or spherical shape gently arcing outward, and this gentle arcing shape is continued by the outer ring 312.

Although being formed from a single lens-like piece of material such as polycarbonate, the cover 314 has two different regions or portions including an outer portion 314o and a central portion 314i. According to some embodiments, the cover 314 is painted or smoked around the outer portion 314o, but leaves the central portion 314i visibly clear so as to facilitate viewing of an electronic display 316 disposed thereunderneath. According to some embodiments, the curved cover 314 acts as a lens that tends to magnify the information being displayed in electronic display 316 to users. According to some embodiments the central electronic display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information displayed on the electronic display 316 is illustrated in FIG. 3A, and includes central numerals 320 that are representative of a current setpoint temperature. According to some embodiments, metallic portion 324 has a number of slot-like openings so as to facilitate the use of a passive infrared motion sensor 330 mounted therebeneath. The metallic portion 324 can alternatively be termed a metallic front grille portion. Further description of the metallic portion/front grille portion is provided in the commonly assigned U.S. Ser. No. 13/199,108 filed Aug. 17, 2011, which is incorporated by reference herein. The thermostat 110 is preferably constructed such that the electronic display 316 is at a fixed orientation and does not rotate with the outer ring 312, so that the electronic display 316 remains easily read by the user. For some embodiments, the cover 314 and metallic portion 324 also remain at a fixed orientation and do not rotate with the outer ring 312. According to one embodiment in which the diameter of the thermostat 110 is about 80 mm, the diameter of the electronic display 316 is about 45 mm. According to some embodiments an LED indicator 380 is positioned beneath portion 324 to act as a low-power-consuming indicator of certain status conditions. For example, the LED indicator 380 can be used to display blinking red when a rechargeable battery of the thermostat (see FIG. 4A, infra) is very low and is being recharged. More generally, the LED indicator 380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430 filed Sep. 14, 2010, which is incorporated by reference herein. According to some embodiments, occupancy information is used in generating an effective and efficient scheduled program. Preferably, an active proximity sensor 370A is provided to detect an approaching user by infrared light reflection, and an ambient light sensor 370B is provided to sense visible light. The proximity sensor 370A can be used to detect proximity in the range of about one meter so that the thermostat 110 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-onproximity functionality also allows for energy savings within the thermostat by "sleeping" when no user interaction is taking place or about to take place. The ambient light sensor 370B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 110 is controlled by only two types of user input, the first being a rotation of the outer ring 312 as shown in FIG. 3A (referenced hereafter as a "rotate ring" or "ring rotation" input), and the second being an inward push on an outer cap 308 (see FIG. 3B) until an audible and/or tactile "click" occurs (referenced hereafter as an "inward click" or simply "click" input). For the embodiment of FIGS. 3A-3B, the outer cap 308 is an assembly that includes all of the outer ring 312, cover 314, electronic display 316, and metallic portion 324. When pressed inwardly by the user, the outer cap 308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 3A-3B, an inward click can be achieved by direct pressing on the outer ring 312 itself, or by indirect pressing of the outer ring by virtue of providing inward pressure on the cover 314, metallic portion 314, or by various combinations thereof. For other embodiments, the thermostat 110 can be mechanically configured such that only the outer ring 312 travels inwardly for the inward click input, while the cover 314 and metallic portion 324 remain motionless. It is to be appreciated that a variety of different selections and combinations of the particular mechanical elements that will travel inwardly to achieve the "inward click" input are within the scope of the present teachings, whether it be the outer ring 312 itself, some part of the cover 314, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 312 has been found particularly advantageous, since the user's fingers do not need to be lifted out of contact with the device, or slid along its surface, in order to go between ring rotations and inward clicks. Moreover, by virtue of the strategic placement of the electronic display 316 centrally inside the rotatable ring 312, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, U.S. Ser. No. 13/199,108, and U.S. Ser. No. 29/386,021, each of which is incorporated by reference herein FIG. 3C illustrates a cross-sectional view of a shell portion 309 of a frame of the thermostat of FIGS. 3A-B, which has been found to provide a particularly pleasing and adaptable visual appearance of the overall thermostat 110 when viewed against a variety of different wall colors and wall textures in a variety of different home environments and home settings. While the thermostat itself will functionally adapt to the user's schedule as described herein and in one or more of the commonly assigned incorporated applications, infra, the outer shell portion 309 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 309 has the shape of a frustum that is gently curved when viewed in cross-section, and comprises a sidewall 376 that is made of a clear solid material, such as polycarbonate plastic. The sidewall 376 is backpainted with a substantially flat silver- or nickel-colored paint, the paint being applied to an inside surface 378 of the sidewall 376 but not to an outside surface 377 thereof. The outside surface 377 is smooth and glossy but is not painted. The sidewall 376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 3C. The outer ring 312 of outer cap 308 is preferably constructed to match the diameter d2 where disposed near the second end of the shell portion 309 across a modestly sized gap g1 therefrom, and then to gently arc back inwardly to meet the cover 314 across a small gap g2. It is to be appreciated, of course, that FIG. 3C only illustrates the outer shell portion 309 of the thermostat 110, and that there are many electronic components internal thereto that are omitted from FIG. 3C for clarity of presentation, such electronic components being described further hereinbelow and/or in other ones of the commonly assigned incorporated applications, such as U.S. Ser. No. 13/199,108, supra.

According to some embodiments, the thermostat 110 includes a processing system 360, display driver 364 and a wireless communications system 366. The processing system 360 is adapted to cause the display driver 364 and display area 316 to display information to the user, and to receiver user input via the rotatable ring 312. The processing system 360, according to some embodiments, is capable of carrying out the governance of the operation of thermostat 110 including the user interface features described herein. The processing system 360 is further programmed and configured to carry out other operations as described further hereinbelow and/or in other ones of the commonly assigned incorporated applications. For example, processing system 360 is further programmed and configured to maintain and update a thermodynamic model for the enclosure in which the HVAC system is installed, such as described in U.S. Ser. No. 12/881,463 filed Sep. 14, 2010, and in International Patent App. No. PCT/US11/51579 filed Sep. 14, 2011, both of which are incorporated herein by reference. According to some embodiments, the wireless communications system 366 is used to communicate with devices such as personal computers and/or other thermostats or HVAC system components, which can be peer-to-peer communications, communications through one or more servers located on a private network, and/or communications through a cloud-based service.

Figure 4:
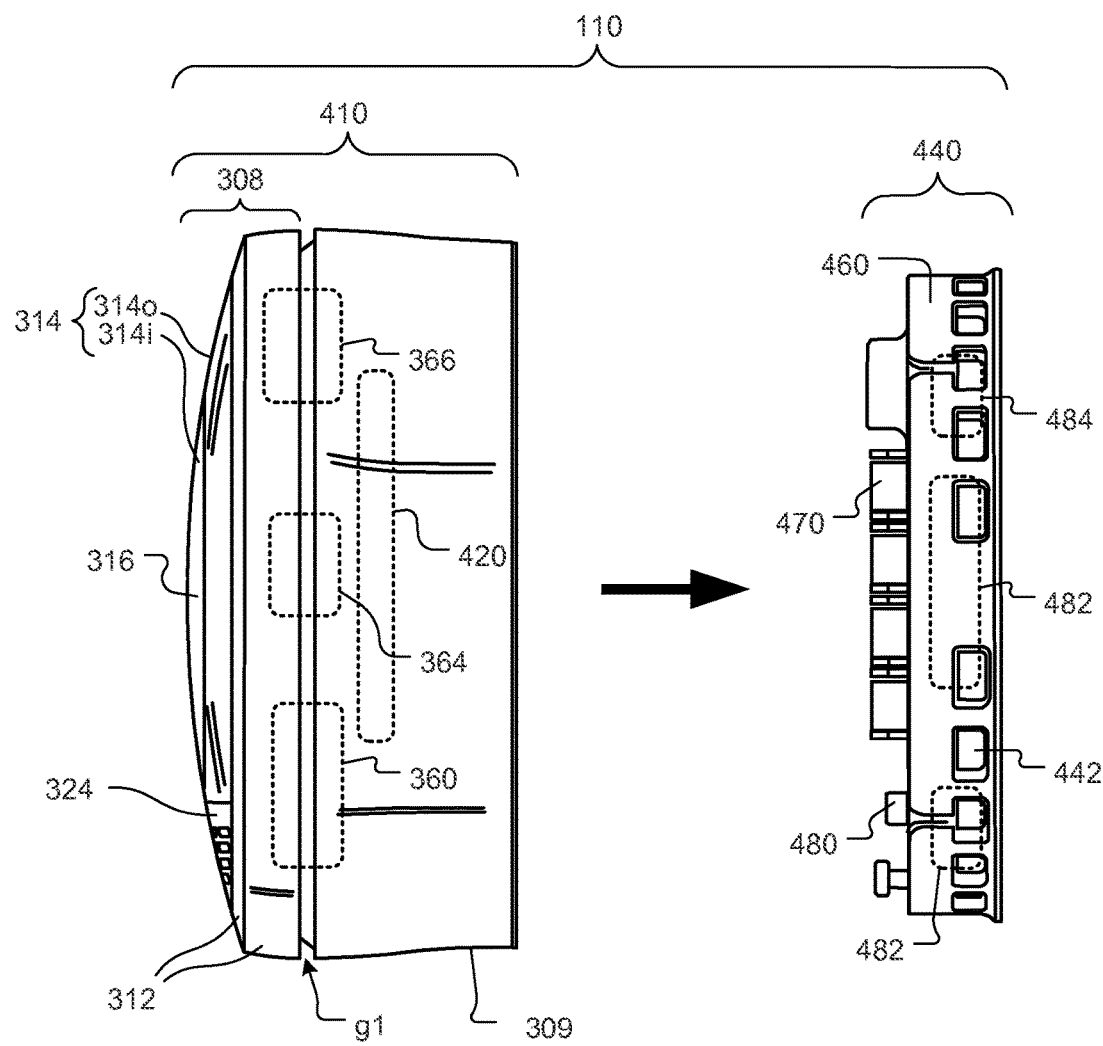
FIG. 4 illustrates a thermostat having a head unit and a backplate (or wall dock) for ease of installation, configuration and upgrading, according to some embodiments.

FIG. 4 illustrates a side view of the thermostat 110 including a head unit 410 and a backplate (or wall dock) 440 thereof for ease of installation, configuration and upgrading, according to some embodiments. As is described hereinabove, thermostat 110 is wall mounted is circular in shape, and has an outer rotatable ring 312 for receiving user input. Head unit 410 includes the outer cap 308 that includes the cover 314 and electronic display 316. Head unit 410 of round thermostat 110 is slidably mountable onto back plate 440 and slidably detachable therefrom. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. No. 13/034,674, and Ser. No. 13/034,678, which are incorporated by reference herein. According to some embodiments, rechargeable battery 420 is a single cell lithium-ion or a lithium-polymer battery.

Backplate 440 includes electronics 482 and a temperature/humidity sensor 484 in housing 460, which are ventilated via vents 442. Two or more temperature sensors (not shown) are also located in the head unit 410 and cooperate to acquire reliable and accurate room temperature data. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry.

Figure 5:
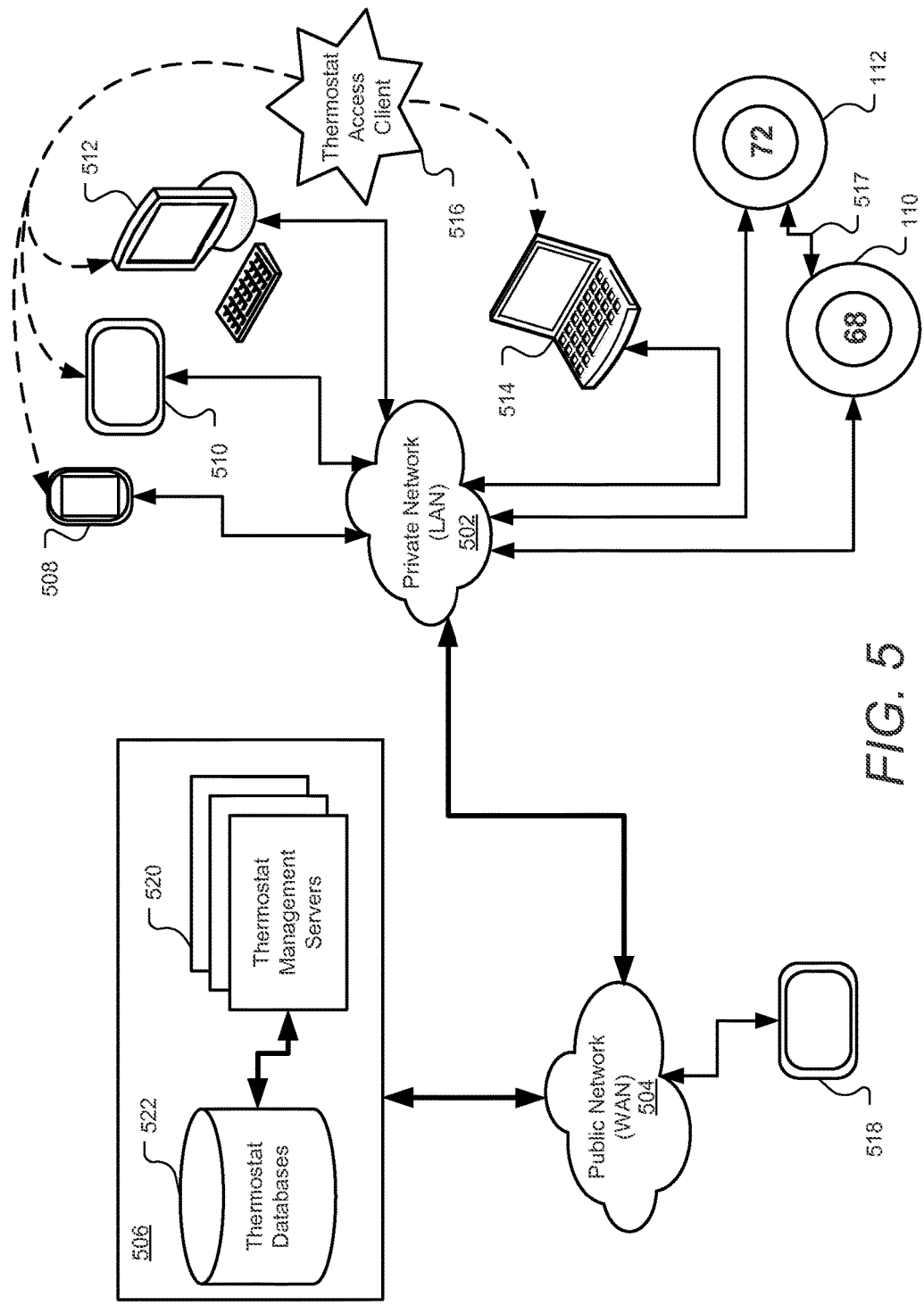
FIG. 5 illustrates thermostats and computers on a private network connected to a cloud-based thermostat management system designed in accordance with some embodiments.

FIG. 5 illustrates thermostats and computers on a private network 502 connected to a cloud-based thermostat management system 506 designed in accordance with some embodiments. In one embodiment, private network 502 is designed to provide network connectivity primarily within and near an enclosure, such as enclosure 100 in FIG. 1. Private network 502 additionally provides network connectivity for various devices such a smartphone 508, tablet 510, computer 512, and laptop 514, as well as the thermostat 110 and remote thermostat 112. A router (not shown) in private network 502, such as integrated router 122 in FIG. 1, may provide wired and wireless connectivity for these devices using a network protocol such as TCP/IP. Preferably, thermostat 110 and remote thermostat 112 are connected wirelessly to private network 502, for at least the reason that wired connections to the locations of the thermostats may not available, or it may be undesirable to incorporate such physical connections in either thermostat 110 or remote thermostat 112. For some embodiments, it is also possible for thermostat 110 and remote thermostat 112 to communicate directly with each other and other devices wireless using an ad hoc network 517 preferably setup directly between the devices and bypassing private network 502.

The embodiments described herein are advantageously configured to be compatible with a large variety of conventional integrated routers that service a large population of homes and businesses. Thus, by way of example only and not by way of limitation, the router (not shown) that services the private network 502 of FIG. 5 can be, for example, a D-Link DIR-655 Extreme N Wireless Router, a Netgear WNDR3700 RangeMax Dual Band Wireless USB Gigabit Router, a Buffalo Technology Nfiniti WZR-HP-G300NH Wireless-N Router, an Asus RT-N16 Wireless Router, Cisco Linksys E4200 Dual Band Wireless Router, or a Cisco Linksys E4200 Dual Band Wireless Router. Without loss of generality, some descriptions further hereinbelow will refer to an exemplary scenario in which the thermostats 110/112 are used in a home environment. However, it is to be appreciated that the described embodiments are not so limited, and are applicable to use of such thermostat(s) in any of a variety of enclosures including residential homes, business, vacation homes, hotels, hotel rooms, industrial facilities, and generally anywhere there is an HVAC system to be controlled.

Thermostat access client 516 is a client application designed in accordance with aspects of the present invention to access the thermostat management system 506 over public network 504. The term "thermostat management system" can be interchangeably referenced as a "cloud-based management server" for the thermostats, or more simply "cloud server", in various descriptions hereinabove and hereinbelow. Because thermostat access client 516 is designed to execute on different devices, multiple client applications may be developed using different technologies based on the requirements of the underlying device platform or operating system. For some embodiments, thermostat access client 516 is implemented such that end users operate their Internet-accessible devices (e.g., desktop computers, notebook computers, Internet-enabled mobile devices, cellphones having rendering engines, or the like) that are capable of accessing and interacting with the thermostat management system 506. The end user machine or device has a web browser (e.g., Internet Explorer, Firefox, Chrome, Safari) or other rendering engine that, typically, is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client. In a web environment, an end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). The server side of the system may comprise conventional hosting components, such as IP switches, web servers, application servers, administration servers, databases, and the like. Where AJAX is used on the client side, client side code (an AJAX shim) executes natively in the end user's web browser or other rendering engine. Typically, this code is served to the client machine when the end user accesses the site, although in the alternative it may be resident on the client machine persistently. Finally, while a web-based application over Internet Protocol (IP) is described, this is not a limitation, as the techniques and exposed user interface technologies may be provided by a standalone application in any runtime application, whether fixed line or mobile. It is to be appreciated that although the TCP/IP protocol is set forth as the network protocol used for communications among the thermostat management system 506, the thermostat access client 514, and other devices for some embodiments, it is set forth by way of example and not by way of limitation, in that any other suitable protocol, such as UDP over IP in particular, may be used without departing from the scope of the present teachings.

In yet another embodiment, thermostat access client 516 may be a stand-alone application or "app" designed to be downloaded and run on a specific device such as smartphone 508 or a tablet 510 device running the Apple iOS operating system, Android operating system, or others. Developers create these stand-alone applications using a set of application programming interfaces (APIs) and libraries provided by the device manufacturer packaged in software development toolkit or SDK. Once completed, the "app" is made available for download to the respective device through an application store or "app" store curated by the app store owners to promote quality, usability and customer satisfaction.

In one embodiment, thermostat management system 506 illustrated in FIG. 5 may be accessed over public network 504 by computer devices on private network 502 running thermostat access client 516. Thermostat access client 516 accesses a thermostat management account (not illustrated) provisioned by thermostat management system 506, on behalf of the computer devices, in order to access or control thermostat 110 or remote thermostat 112. In addition, a computer device on private network 502 such as computer 512 may use the thermostat access client 516 and thermostat management account to gather data from thermostat 110 and remote thermostat 112.

Thermostat 110 and remote thermostat 112 may be accessed remotely from numerous different locations on the private network 502 or public network 504. As will be described in further detail hereinbelow, upon installation a thermostat such as thermostat 110 first registers with the thermostat management system 506 and then requests the thermostat management system create a pairing between the thermostat and a corresponding thermostat management account. Thereafter, a device such as a tablet 518 may be connected to public network 504 directly or through a series of other private networks (not shown) yet still access these thermostats, while outside the private network where they are located, by way of thermostat management system 506. In one embodiment, a tablet 518 running the Apple iOS operating system may remotely access to these thermostats through the thermostat management system 506 and thermostat management account using an iOS "app" version of thermostat access client 516. Pairing thermostats with the thermostat management account allows tablet 518 and other computer devices to remotely control, gather data, and generally interact with thermostats such as thermostat 110 and remote thermostat 112.

In one embodiment, thermostat management system 506 distributes the task of communication and control with the thermostats to one or more thermostat management servers 520. These thermostat management servers 520 may coordinate communication, manage access, process data and analyze results using data produced by thermostats such as thermostat 110 and remote thermostat 112. Intermediate and final results from computations on these servers 520, as well as raw data, may be stored temporarily or archived on thermostat databases 522 for future reference and use. Thermostat management servers 520 may also send a portion of the data along with control information, and more generally any of a variety of different kinds of information, back to thermostat 110 and remote thermostat 112. Results from the thermostat management servers 520 may also be stored in one or more thermostat databases 522 for subsequent access by a device such as tablet 518 running thermostat access client 516.

These thermostat management servers 520 each may perform one or several discrete functions, may serve as redundant fail-over servers for these different discrete functions or may share performance of certain discrete functions in tandem or in a cluster as well as other combinations performing more complex operations in parallel or distributed over one or more clusters of computers. In some embodiments, one of the thermostat management servers 520 may correspond directly to a physical computer or computing device while in other embodiments, the thermostat management servers 520 may be virtualized servers running on one or more physical computers under the control of a virtual machine computing environment such as provided by VMWARE of Palo Alto, Calif. or any other virtual machine provider. In yet another embodiment, the thermostat management servers 520 and thermostat databases 522 are provisioned from a "cloud" computing and storage environment such as the Elastic Compute Cloud or EC2 offering from Amazon.com of Seattle, Wash. In an EC2 solution, for example, the thermostat management servers 520 may be allocated according to processor cycles and storage requirements rather than according to a number of computers, either real or virtual, thought to be required for the task at hand.

Figure 6:
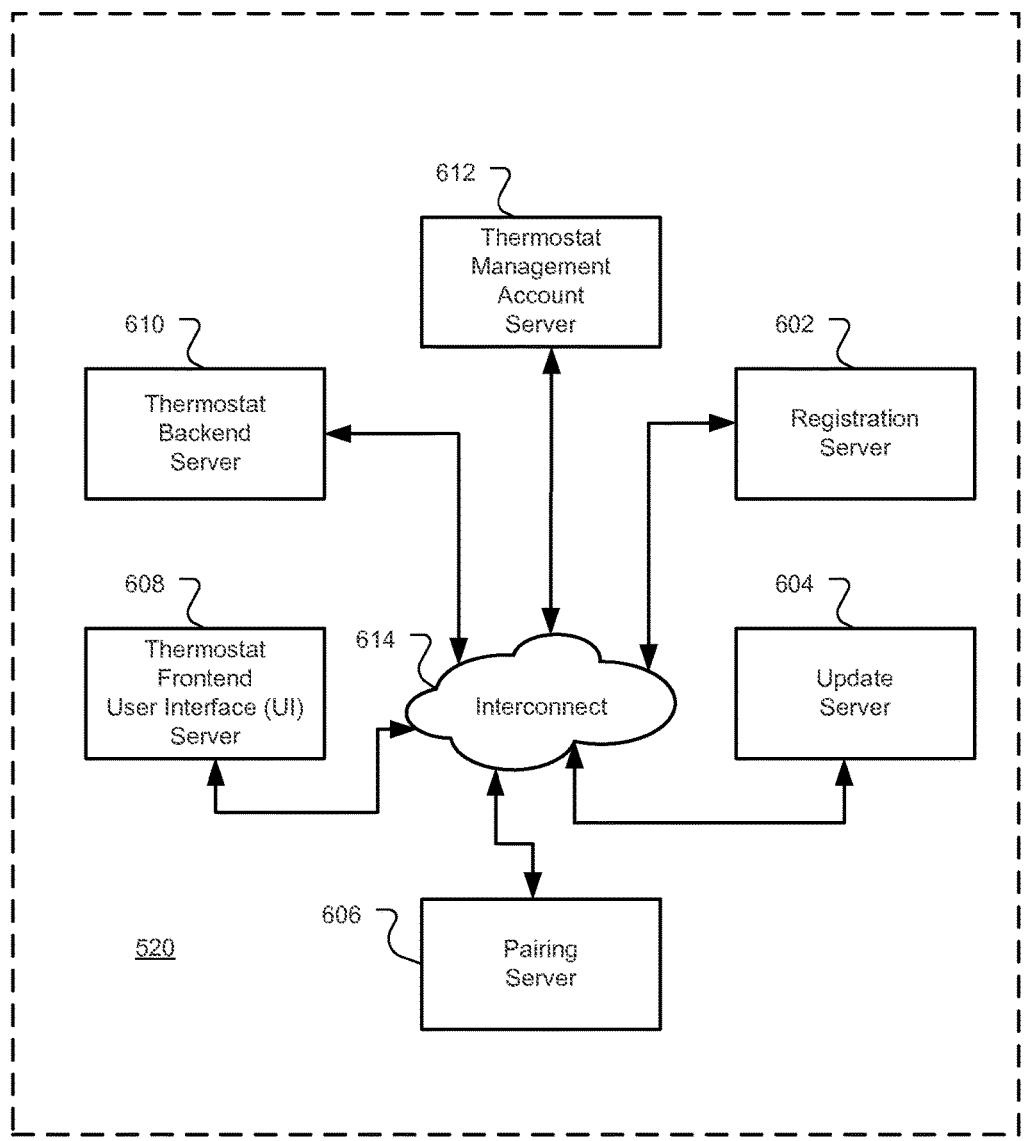
FIG. 6 illustrates one combination of thermostat management servers used to implement a thermostat management system in accordance with some embodiments.

FIG. 6 illustrates one combination of thermostat management servers 520 used to implement a thermostat management system 506 in accordance with some embodiments. In one embodiment, the thermostat management system 506 includes a registration server 602, an update server 604, a pairing server 606, a thermostat frontend user interface (UI) server 608, a thermostat backend server 610, and a thermostat management account server 612. Interconnect 614 may connect servers using one or more high-speed network connections, a shared back plane, a combination of local and remote high-speed connections as well as one or more virtualized connections. While the configuration of thermostat management servers 520 is exemplary, it is should not be considered limiting in any way and it is contemplated that the distribution of functions may be handled through a different combination of servers and distribution of function over those servers.

In some embodiments, the thermostat management servers 520 making up this thermostat management system 506 may manage thermostats located in multiple enclosures across various geographic locations and time zones. Each enclosure may use one or several thermostats in accordance with embodiments of the present invention to control one or several HVAC systems, such as HVAC system 120 in FIG. 1. In some cases, there may be an increased need from the thermostat management system 506 for certain functions and therefore more servers to deliver these functional capabilities. It may be appreciated that the design of thermostat management system 506 and use of the thermostat management servers 520 may be scaled to meet these demands on the system and efficiently track and organize the data from these multiple enclosures and thermostats for processing, analysis, control and machine-learning purposes.

One embodiment of registration server 602 provides a number of services related to registering a thermostat on the thermostat management system 506 and preparing it for pairing with a thermostat management account. In operation, the registration server 602 may be first accessed by a thermostat when the thermostat is wired to the HVAC of an enclosure and then connected to the Internet through a private network. To make the thermostat known on system 520, the thermostat sends thermostat metadata from the private network to the public network, such as the Internet, and then onto processing by registration server 602. Preferably, the thermostat metadata includes a unique thermostat identifier, such as one that is assigned at the time of manufacturing. As the communication that sends the thermostat metadata passes through the network address translator (NAT) of the router (not shown) that serves private network 502, it is appended with the public network address of that router, which is thus the public address that is "used" by the thermostat to communicate over the public network. The thermostat identifier is used to identify the thermostat from other thermostats being registered by registration server 602 and may be based, in part or in whole, on a media access control (MAC) address assigned to the NIC of the thermostat. As one security measure against registering unauthorized devices, registration server 602 may compare the MAC address in the thermostat metadata against a list of valid MAC addresses provided by the manufacturer of the thermostat or NIC component. In accordance with one embodiment, the thermostat registration is complete when the registration server 602 provisions an entry in a thermostat registration pool and marks the thermostat entry ready to be paired with a thermostat management account. Entries in the thermostat registration pool may be referenced by their unique thermostat identifier, the public network address that they used (or, more particularly, the public address of the private network router through which they connect to the Internet), and optionally other relevant metadata associated with the thermostat.

In some embodiments, update server 604 attempts to update software, firmware and configuration updates to each of the thermostats registered in the thermostat registration pool. If metadata from entries in the registration pool exclude versioning information, update server may need to further query each thermostat for current versions installed. Update server 604 may access entries in the registration pool and then use corresponding network addresses in each entry to connect to the associated thermostat over the public network or private network, or both.

If newer software versions exist than currently used on a thermostat, update server 604 proceeds to send software updates to the thermostat over the public network. For example, update server may use file transfer protocols such as ftp (file transfer protocol), tftp (trivial file transfer protocol) or more secure transfer protocols when uploading the new software. Once uploaded, installation and update of the software on the thermostat may occur immediately through an auto-update option on the thermostat or manually through the interface of the thermostat as requested by a user.

One embodiment of pairing server 606 facilitates the association or "pairing" of a thermostat with a thermostat management account on thermostat management account server 612. The term "thermostat management account" can be used interchangeably with "user account" herein unless specified otherwise. Once the thermostat is paired with a user account, a rich variety of network-enabled capabilities are enabled as described further herein and in one or more of the commonly assigned incorporated applications, infra. For example, once pairing has been achieved, a person with access to the thermostat management account may access the thermostat (through the thermostat management system 506 using the thermostat access client 516) for a variety of purposes such as seeing the current temperature of the home, changing the current setpoint, changing the mode of the thermostat between "home" and "away", and so forth. Moreover, the thermostat management system 506 can then start tracking the various information provided by the thermostat which, in turn, enables a rich variety of cloud-based data aggregation and analysis that can be used to provide relevant reports, summaries, updates, and recommendations to the user either through the thermostat display itself, through the thermostat access client 516, or both. A variety of other capabilities, such as demand-response actions in which the thermostat management server sends an energy alert and/or sends energy-saving setpoint commands to the thermostats of users who have enrolled in such programs, can be carried out.

In view of the importance of establishing a pairing between the thermostat and a thermostat management account, there is provided an ability for a fallback method of pairing, which can be termed a "manually assisted" method of pairing, that can take effect and be carried out in the event that the convenient auto-pairing methods described further hereinbelow cannot be securely and reliably carried out for a particular installation. The manually assisted method may use an alphanumeric "passcode" to pair the thermostat to the thermostat management account. Typically, the passcode is sent to the thermostat over a public network, like the Internet, and displayed on the display area of the thermostat. Authorization to access the thermostat is provided if the user obtaining the passcode from the display on the thermostat then enters it into a pairing dialog presented when the user logs into their thermostat management account. Pairing server 606 pairs the thermostat with the user's thermostat management account if the user enters that same passcode that was displayed on their thermostat display.

According to a preferred "auto-pairing" method, the pairing server 606 may automatically pair or "auto-pair" a thermostat management account to a thermostat if both are located on the same private network. If the thermostat and thermostat management account are associated with the same private network, embodiments of the present invention presume the thermostat is at the user's home, office, or other area where the user should also have control of the device. To make this determination automatically, the pairing server 606 compares the public network address that was used to register the thermostat over the Internet with the public network address used by the computer device that has most recently been used to access the thermostat management account. Since the thermostat and computer device only have private network addresses, the router on the private network they share inserts the same public network address into their packets thus allowing the two devices to access servers, services, and other devices on the Internet. "Auto-pairing" takes advantage of this fact and automatically pairs devices sharing the same public network address. This is particularly advantageous from a user standpoint in that the user is not bothered with the need to enter a passcode or other alphanumerical identifier in order to achieve the pairing process, and avoids the concern that a user may inadvertently enter incorrect codes or identifiers into the system. Details on auto-pairing and manually assisted pairing are described in further detail later herein.

Thermostat front end user-interface (UI) server 608 facilitates the generation and presentation of intuitive, user-friendly graphical user-interfaces that allow users to remotely access, configure, interact with, and control one or more of their network-connected thermostats 110/112 from a computer web browser, smartphone, tablet, or other computing device. The user-friendly graphical user-interfaces can also provide useful tools and interfaces that do not necessarily require real-time connectivity with the thermostats 110/112 with examples including, for some embodiments, providing user interfaces for displaying historical energy usage, historical sensor readings and/or occupancy patterns, allowing the user to learn about and/or enroll in demand-response programs, provide social networking forums that allow users to interact with each other in informative, competitive, fun ways that promote energy savings, provide access to local information including weather, public safety information, neighborhood calendar events, and local blogs, and more generally provide services and information associated with a comprehensive "energy portal" functionality. Examples of intuitive, user-friendly graphical user-interfaces provided by the UI server 608 according to one or more preferred embodiments are described further in co-pending U.S. patent application Ser. No. 13/317,423.

In some embodiments, a thermostat access client user-interface displays an image of a house representing a primary enclosure paired to the thermostat management account in the thermostat management system. Thermostat front end UI server 608 may further instruct the thermostat access client, such as thermostat access client 516 in FIG. 5, to display images visually representative of one or more thermostats 110/112 inside the primary enclosure. By default, each of the one or more thermostat images may also display a current temperature measurement in the enclosure. In some embodiments, the user-interface may also further display an image of an additional house, or houses, representing a secondary enclosure having additional thermostats that are also paired to the thermostat management account. The image of the additional house may appear smaller, out of focus or generally deemphasized visually in relationship to the image of the house representing the primary enclosure. Additional enclosures beyond the secondary enclosure can also be displayed in the user interface and should also appear visually deemphasized compared with the image displayed for the primary enclosure. Further information on the thermostat access client and user-interface are described in more detail in co-pending U.S. patent application Ser. No. 13/317,423.

Thermostat backend server 610 manages the storage of data used by various thermostat management servers in the thermostat management system 506. In some embodiments, thermostat backend server 610 may manage storage of the thermostat registration pool data used by the registration server 602 or may organize and store new software updates and releases for the update server 604. In another embodiment, thermostat backend server 610 may also store heating and cooling related data (i.e., date and time HVAC system was in either heating or cooling mode within the enclosure), sensor information, battery-level data, alarms, etc. associated with an enclosure that was sent to the thermostat management system 506 by thermostats registered therewith, and in some embodiments and provide pre-computed heating and cooling schedules, applications, and other data for download over the public network for use by the thermostats.

In some embodiments, thermostat management account server 612 is used to create new accounts and update existing accounts on thermostat management system 506. To access their thermostat over a thermostat access client 516 and enjoy the benefits of thermostat connectedness, the user is first required to create of a thermostat management account ("user account") on thermostat management account server 612 using their thermostat access client 516. Accordingly, users execute the thermostat access client 516 on a computer or other computer device to access the thermostat management account server 612. The thermostat management account server 612 should receive at least the zip code and/or city and state for the enclosure in which the thermostat is (or will be) installed, such that weather information provided by a weather service can be accessed and downloaded to the thermostat, which can be used as part of its optimal enclosure characterization and HVAC control algorithms. Optionally, a variety of other information including a user's contact information, enclosure street addresses, and so forth can also be received. Primary options associated with the thermostat management account server 612 include pairing one or more thermostats to the correct thermostat management account through pairing operations provided by pairing server 606. However, even if the account is not yet paired with a thermostat, the user may use the thermostat management account to access local information including weather, public safety information, neighborhood calendar events, local blogs and more information based upon the user's contact information, locale and other interests.

Figure 7A:
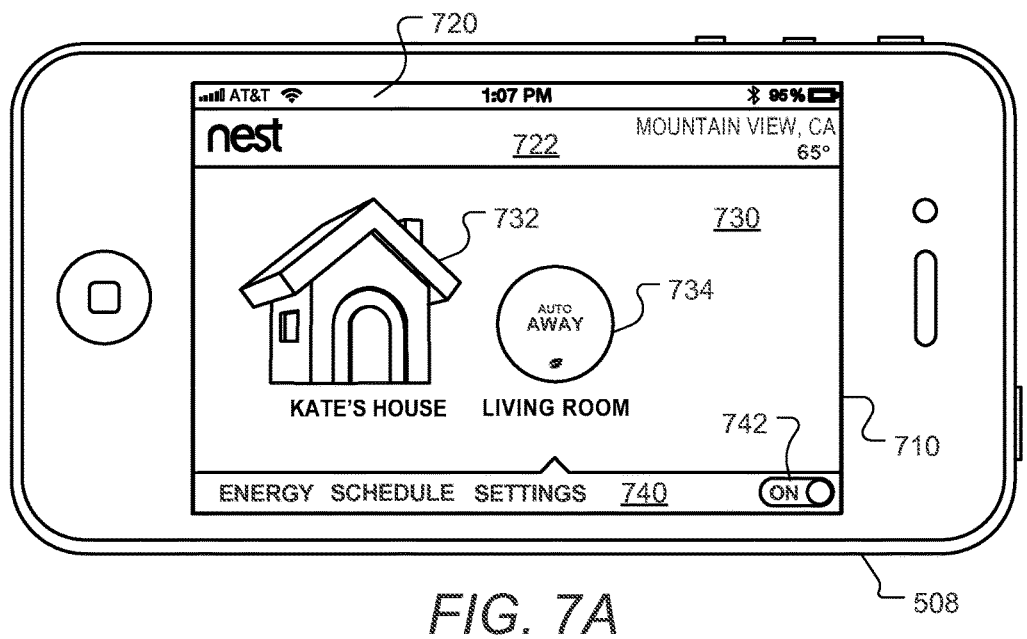
Figure 7B:
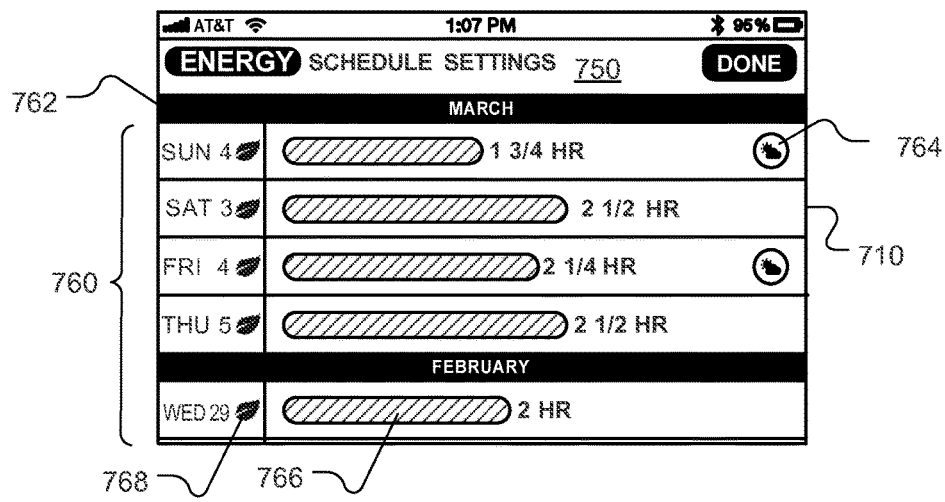

FIGS. 7A-7I illustrate aspects of a graphical user interface on a smart phone for performance and other information for an HVAC system controlled by a self-programming network-connected thermostat, according to some embodiments. In FIG. 7A, smartphone 508 is shown as an iPhone running the Apple iOS operating system, although according to other embodiments the smartphone 508 could be a different device running a different operating system such as Android, Symbian, RIM, or Windows operating systems. Smart phone 508 has a large touch sensitive display 710 on which various types of information can be shown and from which various types of user input can be received. The display area shows a top information bar 720 that is generated by and is standard to the operating system of the phone 508. An upper banner are 722 includes information such as the thermostat manufacture's logo, as well as the city name and current outdoor temperature for the location where the user's thermostat is installed. A main window area 730 shows a house symbol 732 with the name assigned in which thermostat is installed. A thermostat symbol 734 is also displayed along with the name assigned to the thermostat. For further details of user interfaces for remote devices such as smartphone 508, see co-pending U.S. patent application Ser. No. 13/317,423, which is incorporated herein by reference. The lower menu bar 740 has an arrow shape that points to the symbol to which the displayed menu applies. In the example shown in FIG. 7A, the arrow shape of menu 740 is pointed at the thermostat symbol 734, so the menu items, namely: Energy, Schedule, and Settings, pertain to the thermostat named "living room." Menu 740 also includes an on/off toggle button 742 from which the user can turn off or on the thermostat. When the "Energy" menu option of selected from menu 740 in FIG. 7A by the user, the display 710 transitions to that shown in FIG. 7B. An upper menu area 750 mimics the menu 740 in FIG. 7A and provides the user location information within the menu structure as well as provides a convenient means for the user to navigate within the menu structure. The central display area 760 shows energy related information to the user in a calendar format. The individual days of the month are shown below the month banners, such as banner 762, as shown. The user can gesture on the touch screen to scroll up and down through different days. Also shown is a leaf logo, such as logo 768 for Wednesday February 29$^{th}$, in cases where a leaf logo has been awarded for that day. Further details of awarding the leaf logo are provided herein. For each day, a horizontal bar, such as bar 766, is used to graphically indicate to the user the amount of energy used on that day for heating and/or cooling. In the case of FIG. 7B, heating was the only HVAC function used. The bars are colored to match the HVAC function such as orange for heating and blue for cooling. In cases where there is multi-stage heating different shades or hues such as salmon and orange can be used. Also shown next to each bar is the number hours, rounded to nearest quarter of an hour during which the HVAC function, in this case heating, was activated. According to some embodiments, the relative length of each bar represents the number of hours that the HVAC function was active. Since the number of hours of activity for an HVAC function is closely related to the energy usage by that function, the number hours is found to be a useful metric for displaying energy usage information to thermostat users. According to some embodiments, the lengths of the bars are normalized wherein day having the greatest amount of usage in the dataset has a full length bar. Also shown on the far right side of each day is a responsibility symbol 764 which indicates the determined primary cause for either over or under average energy usage for that day. According to some embodiment, a running average is used for the past seven days for purposes of calculating whether the energy usage was above or below average. According to some embodiments, three different responsibility symbols are used: weather (such as shown in symbol 764), users (people manually making changes to thermostat's set point or other settings), and away time (either due to auto-away or manually activated away modes).

Figure 7C:
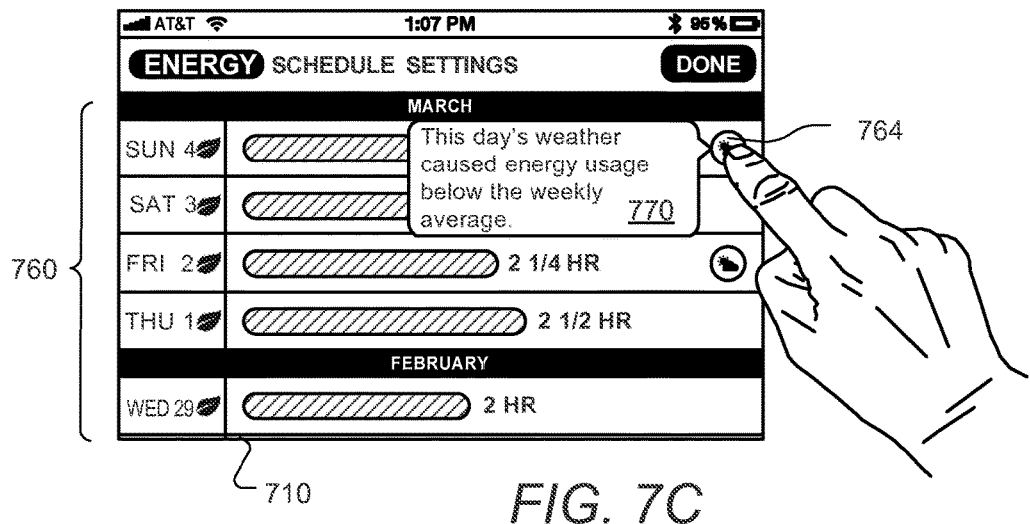

FIG. 7C shows the screen of FIG. 7B where the user is asking for more information regarding the responsibility symbol 762. The user can simply touch the responsibility symbol to get more information. In the case shown in FIG. 7C the pop up message 770 indicates to the user that the weather was believed to be primarily responsible for causing energy usage below the weekly average.

Figure 7D:
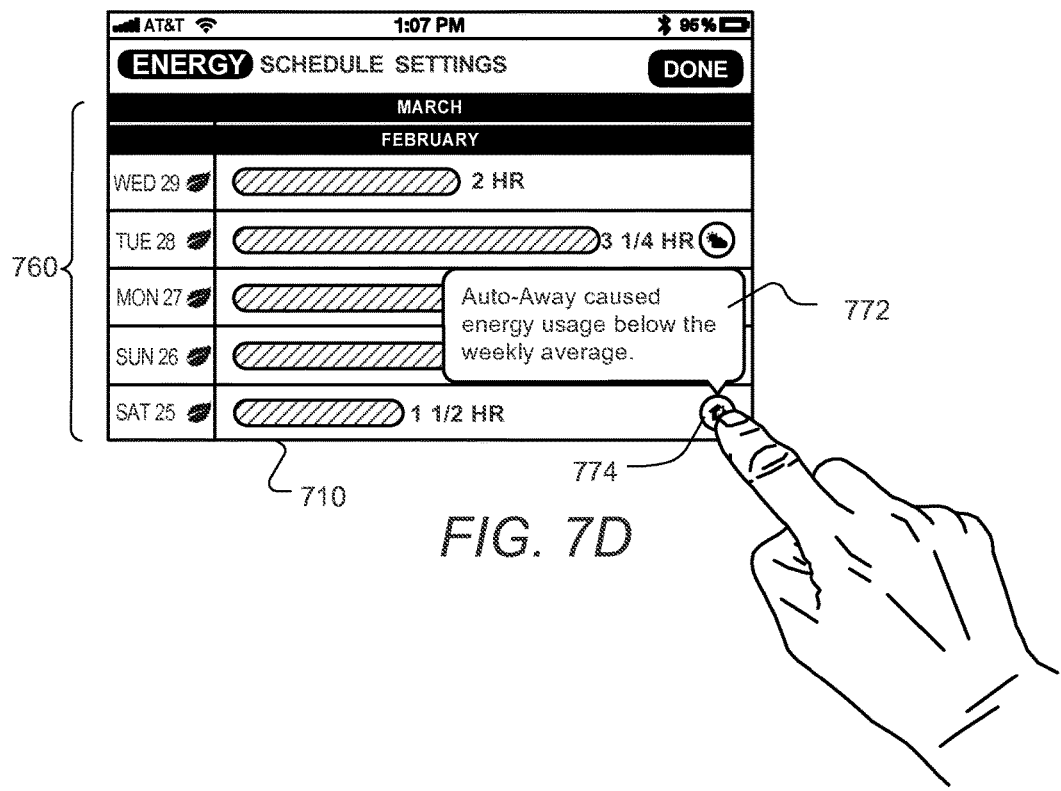

FIG. 7D shows another example of a user inquiring about a responsibility symbol. In this case, the user has selected an "away" symbol 774 which causes the message 772 to display. Message 772 indicates that the auto-away feature is primarily responsible for causing below average energy use for that day.

According to some embodiments, further detail for the energy usage throughout any given day is displayed when the user requests it. When the user touches one of the energy bar symbols, or anywhere on the row for that day, a detailed energy usage display for that day is activated. In FIG. 7E the detailed energy information 780 for February 29$^{th}$ is displayed in response to the user tapping on that day's area. If the user taps on the detailed area 780 again the display will toggle back to the simple daily display (such as shown by the other days in FIG. 7E). The detailed display are 780 includes a time line bar 782 for the entire day with hash marks or symbols for each two hours. The main bar 782 is used to indicate the times during the day and duration of each time the HVAC function was active (in this case single stage heating). The color of the horizontal activity bar, such as bar 786 matches the HVAC function being used, and the width of the activity bar corresponds to the time of day during which the function was active. Above the main timeline bar are indicators such as the set temperature and any modes becoming active such as an away mode (e.g. being manually set by a user or automatically set by auto-away). The small number on the far upper left of the timeline indicates the starting set point temperature (i.e. from the previous day). The circle symbols such as symbol 784 indicate the time of day and the temperature of a set point change. The symbols are used to indicate both scheduled setpoints and manually change setpoints.

Figure 7F:
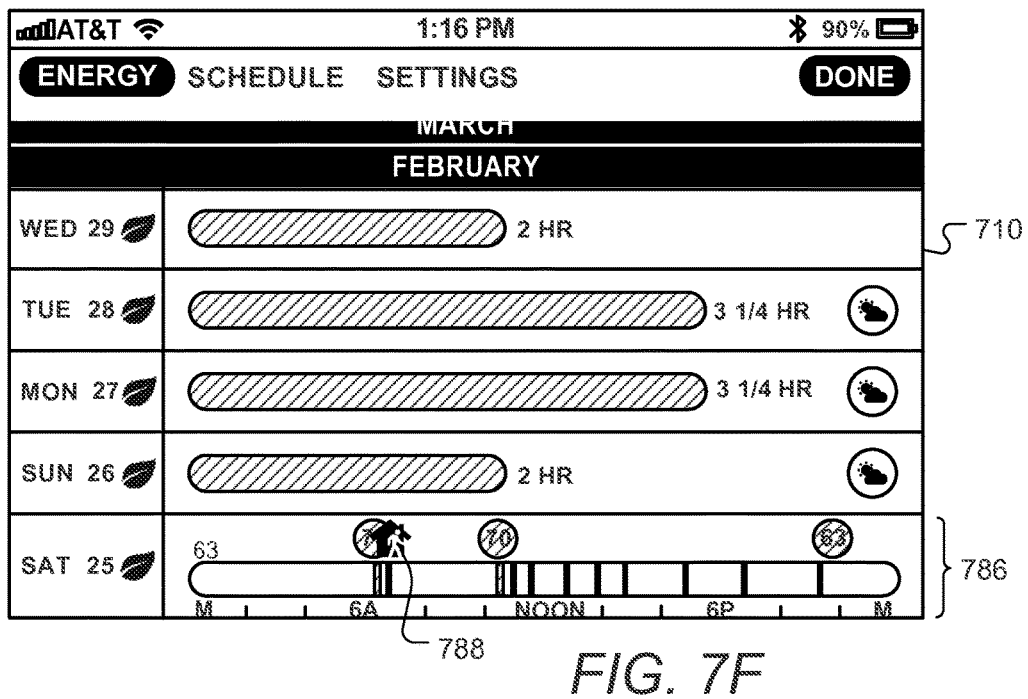

FIG. 7F shows another example of a detailed daily display, according to some embodiments. In this case detailed energy information 786 is shown for Saturday, February 25$^{th}$. As in the case shown in FIG. 7E, the user has selected this day by tapping on the day's area to reveal a detailed timeline bar showing HVAC function activity as well as events such as triggering an away mode and changes in setpoint temperatures. In this case the away symbol 788 is used to indicate that the thermostat went into an away mode (either manually or under auto-away) at about 7 AM.

Figure 7G:
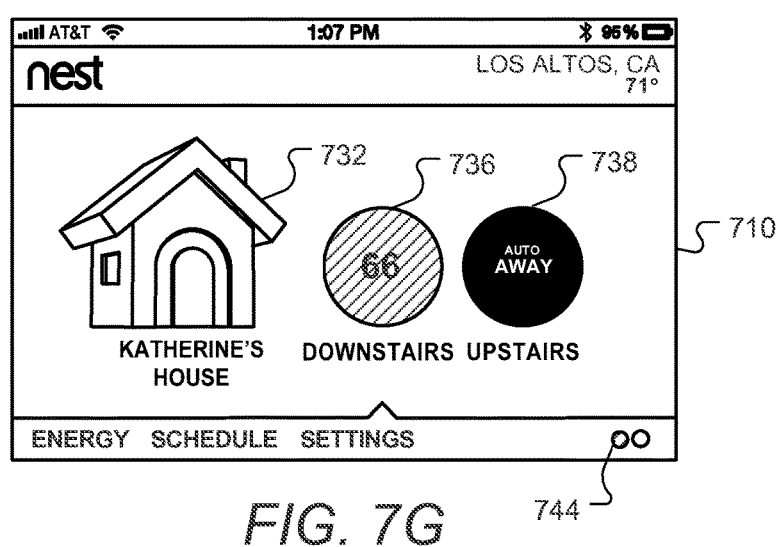

FIG. 7G shows an example of smartphone display area 710 for a different structure, according to some embodiments. In this case the structure is named Katherine's House shown by the house symbol 732 and includes two thermostats named "Downstairs" and "Upstairs" shown by thermostat symbols 736 and 738 respectively. At the time shown in FIG. 7G, the downstairs thermostat is heating to a set point temperature of 66 degrees while the upstairs thermostat is in an auto away mode as shown in the symbols 736 and 738. The arrow on the lower menu bar points to the downstairs thermostat, which controls both heating and cooling as shown by the two small circles on the right side of the lower menu bar. The HVAC function heating is currently active as shown by an orange color fill on the left circle while the right symbol has no colored fill (and so is shown with a white center). If the user selects the "energy" selection on the lower menu then detailed energy information for the downstairs thermostat is shown such as shown in FIG. 7H.

Figure 7H:
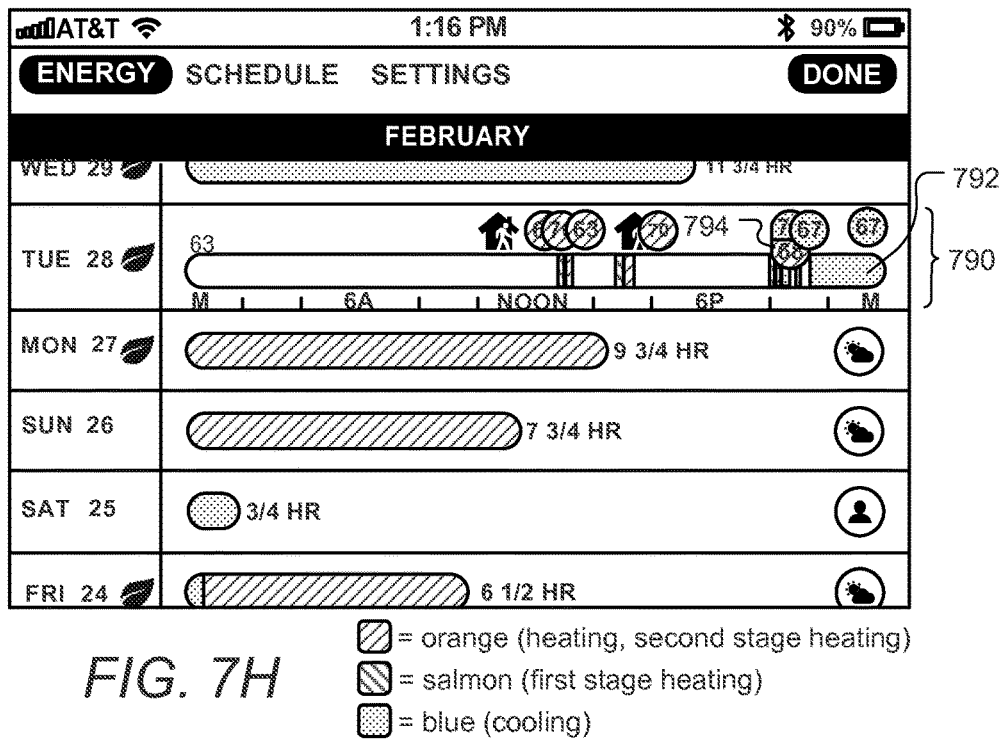
Figure 7I:
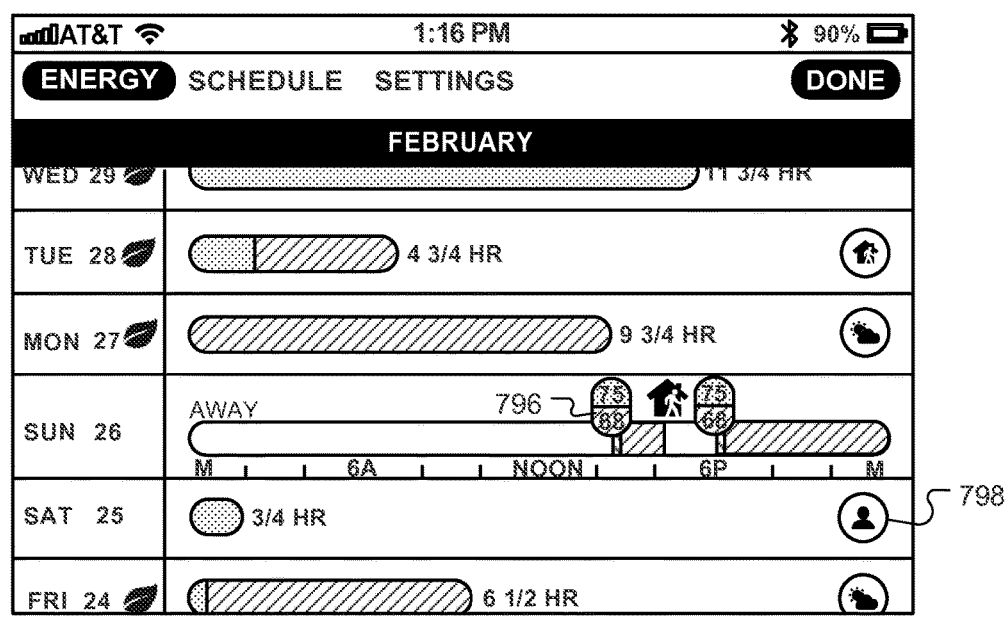

In FIG. 7H, the colors of the horizontal energy use bars for each day are shaded in different colors to indicate the HVAC function or functions that were active for that day. For example, for Sunday, February 26$^{th}$ only heating was used as indicated by the color of the bar which is shaded orange. On Saturday, February 25$^{th}$, only cooling was used as indicated by the color of the bar which is shaded blue. On Friday, February 24$^{th}$, both heating and cooling where used and their relative amounts are shown by the colored shading, in this case a small amount of cooling and larger amount of heating. The user has toggled a detailed energy view for Tuesday, February 28$^{th}$ as shown by detailed information 790. In this particular HVAC system, the heating system includes two stages of heating, which is indicated by two different shades of orange shading in the small energy usage bars. For example, close to about 1 PM the first stage heating was used, indicated by a salmon colored shading, followed by the second stage of heating, indicated by a more saturated orange colored shading. In this example cooling was used after about 9:30 PM as indicated by a blue colored shading. On this day setpoint range was used as indicated by the oval symbol 794. The range setpoint is used to maintain the temperature within a range by using both heating and cooling. According to some embodiments, other colors and/or patterns can be used. For example for relatively expensive and/or energy consuming heating cycles such as heat-pump secondary heat strips a bright red or bright red and black striped fill can be used. Also in cases of two-stage cooling, darker and lighter colors of blue can be used. Details of the range setpoint symbols are also shown in FIG. 7I. The range setpoint symbol 796 indicates that range setpoint of 75 degrees for cooling and 68 degrees for heating. FIG. 7I also shows an example of an user responsibility symbol 798 indicating that lower than average energy usage for that day was due to user settings (e.g. the user setting a lower than average setpoint).

Figure 8A:
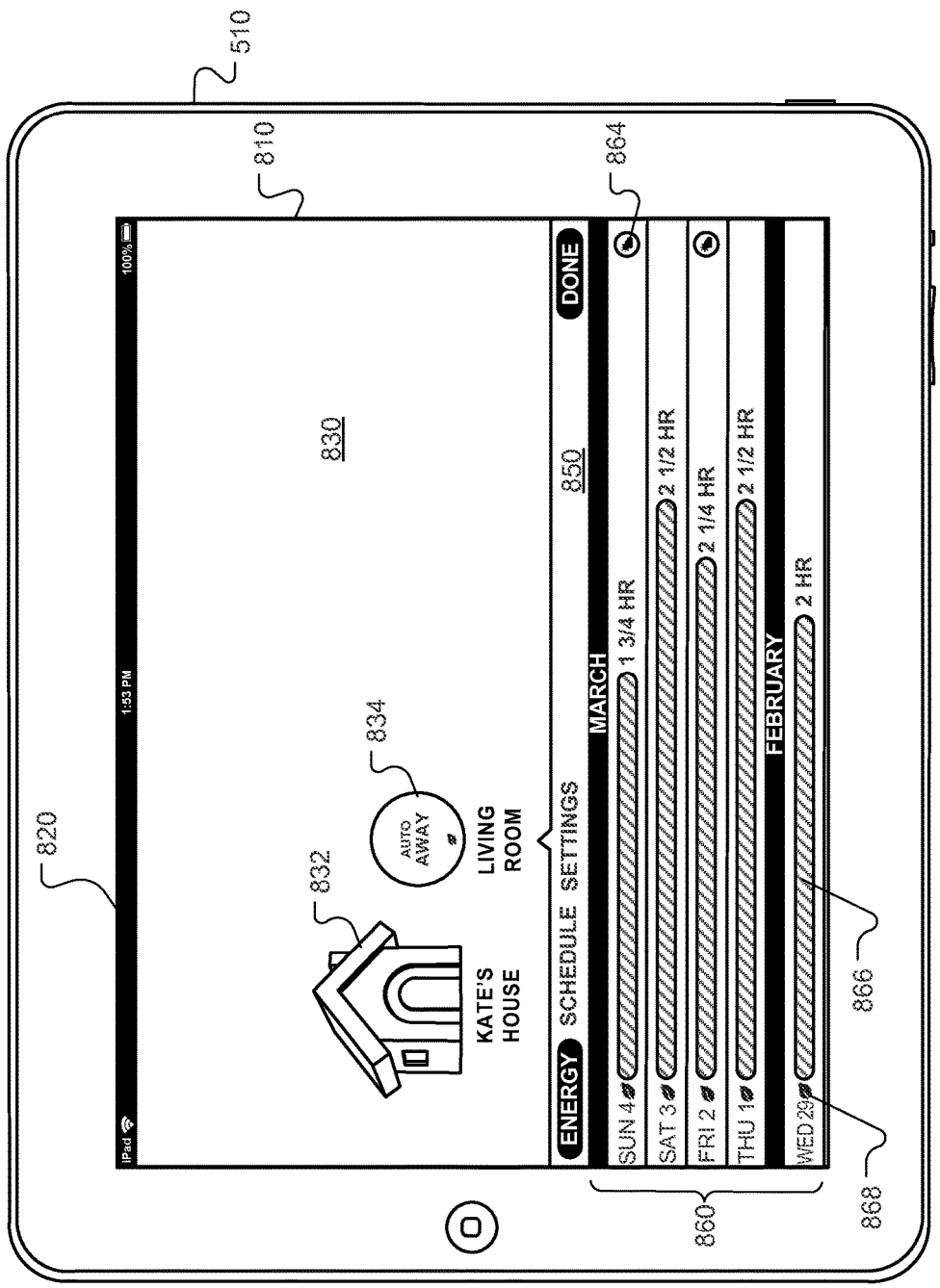
FIGS. 8A-8K illustrate aspects of a graphical user interface on a tablet computer for performance and other information for an HVAC system controlled by a self-programming network-connected thermostat, according to some embodiments.

FIGS. 8A-8K illustrate aspects of a graphical user interface on a tablet computer for performance and other information for an HVAC system controlled by a self-programming network-connected thermostat, according to some embodiments. In FIG. 8A, tablet computer 510 is shown as an iPad running the Apple iOS operating system, although according to other embodiments the tablet 510 could be a different device running a different operating system such as the Android, Blackberry or Windows operating systems. Tablet 510 has a large touch sensitive display 810 on which various types of information can be shown and from which various types of user input can be received. The display area shows a top information bar 820 that is generated by and is standard to the operating system of the tablet 510. A main window area 830 shows a house symbol 832 with the name assigned in which thermostat is installed. A thermostat symbol 834 is also displayed along with the name assigned to the thermostat. For further details of user interfaces for remote devices such as tablet 510, see co-pending U.S. patent application Ser. No. 13/317,423, which is incorporated herein by reference. The lower menu bar 850 has an arrow shape that points to the symbol to which the displayed menu applies. In the example shown in FIG. 8A, the arrow shape of menu 850 is pointed at the thermostat logo 834, so the menu items, namely: Energy, Schedule, and Settings, pertain to the thermostat named "living room." IN the example shown in FIG. 8A, the "Energy" menu option of selected from menu 850 and so there is a lower display area 860 that provides the user with energy related information in a calendar format. The individual days of the month are shown below the month banners as shown. The user can gesture on the touch screen to scroll up and down through different days. Also shown is a leaf logo, such as logo 868 for Wednesday February $29^{th}$, in cases where a leaf logo has been awarded for that day. Further details of awarding the leaf logo are provided herein. For each day, a horizontal bar, such as bar 866, is used to graphically indicate to the user the amount of energy used on that day for heating and/or cooling. In the case of FIG. 8A, heating was the only HVAC function used. The bars are colored to match the HVAC function such as orange for heating and blue for cooling. In cases where there is multi-stage heating different shades or hues such as salmon and orange can be used. The shading indications follow those such as shown in FIG. 7H. Also shown next to each bar is the number hours, rounded to nearest quarter of an hour during which the HVAC function, in this case heating, was activated. Also shown on the far right side of each day is a responsibility symbol 864 which indicates the determined primary cause for either over or under average energy usage for that day. According to some embodiment, a running average is used for the past seven days for purposes of calculating whether the energy usage was above or below average. According to some embodiments, three different responsibility symbols are used: weather (such as shown in symbol 864), users (people manually making changes to thermostat's set point or other settings), and away time (either due to auto-away or manually activated away modes).

Figure 8B:
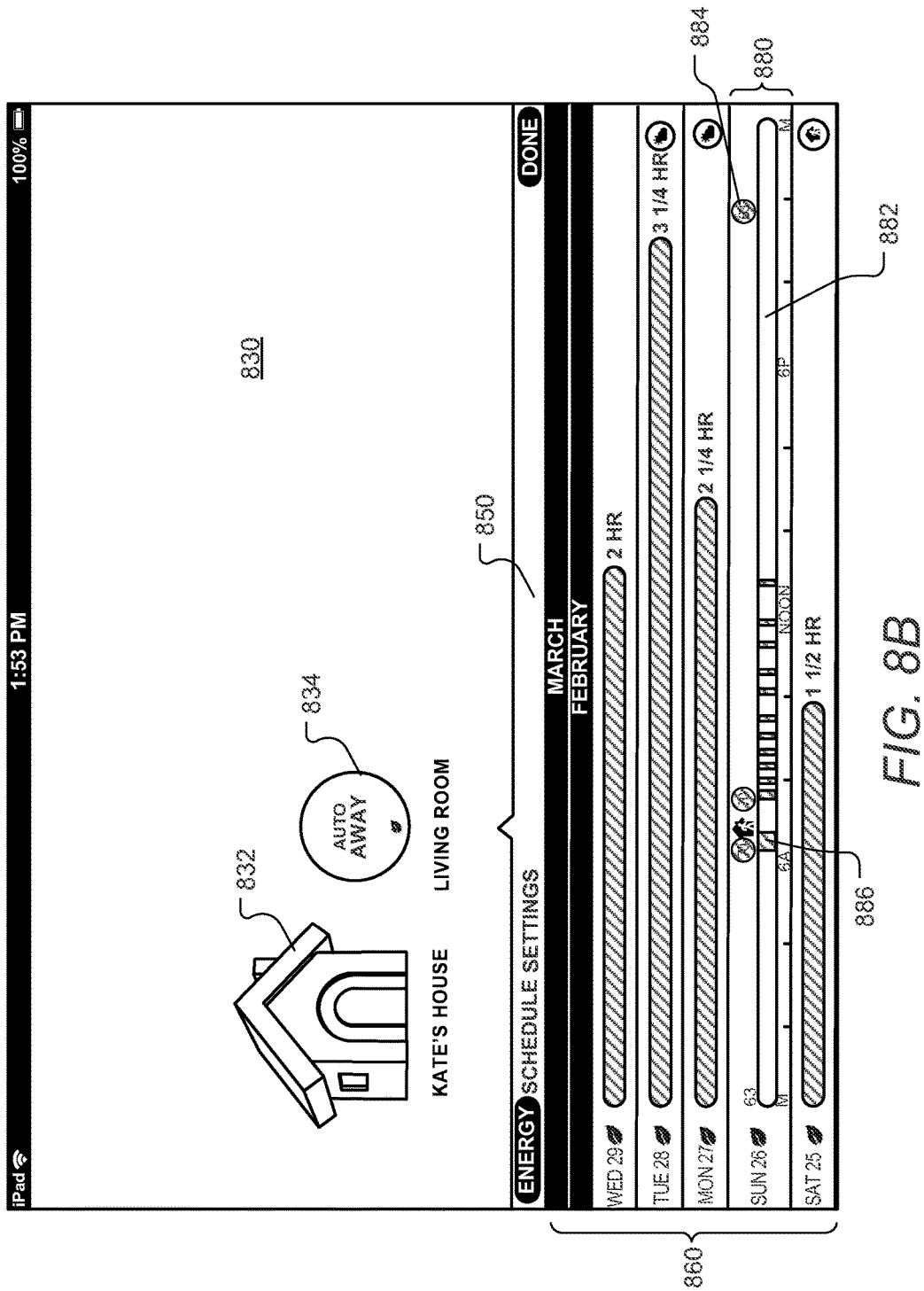

Further detail for the energy usage throughout any given day is displayed when the user requests it. When the user touches on the row for a day, a detailed energy usage display for that day is activated. In FIG. 8B the detailed energy information 880 for February $26^{th}$ is displayed in response to the user tapping on that day's area. If the user taps on the detailed information 880 again the display will toggle back to the simple daily display. The detailed display information 880 includes a main time line bar 882 for the entire day with hash marks or symbols for each two hours. The main bar 882 is used to indicate the times during the day and duration of each time the HVAC function was active (in this case single stage heating). The color of the horizontal activity bar, such as bar 886 matches the HVAC function being used, and the width of the activity bar corresponds to the time of day during which the function was active. Above the main timeline bar are indicators such as the set temperature and any modes becoming active such as an away mode (e.g. being manually set by a user or automatically set by auto-away). The small number on the far upper left of the timeline indicates the starting set point temperature (i.e. from the previous day). The circle symbols such as symbol 884 indicate the time of day and the temperature of a set point change. The symbols are used to indicate both scheduled setpoints and manually changed setpoints.

Figure 8C:
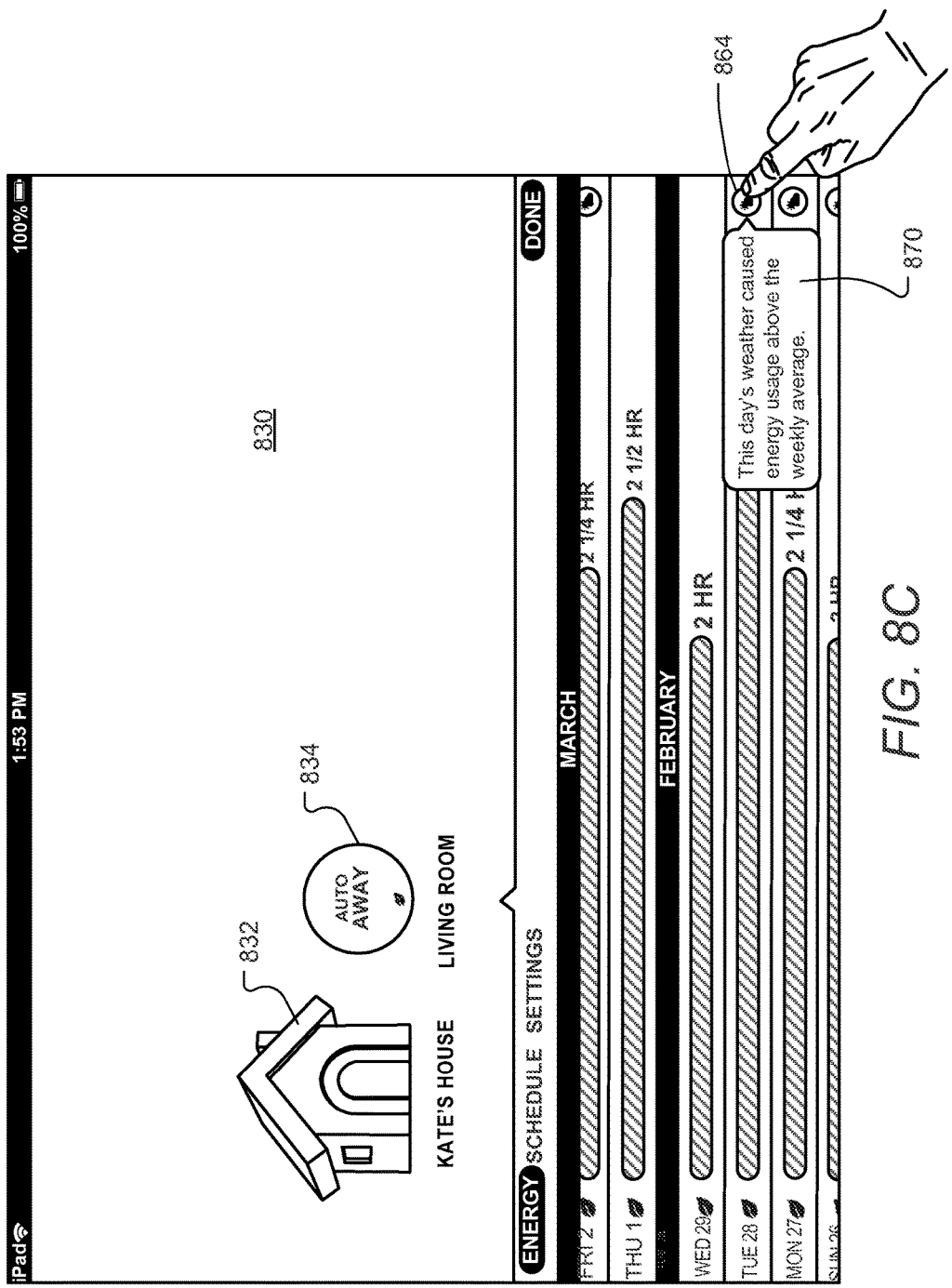

FIG. 8C shows a screen where the user is asking for more information regarding the responsibility symbol 864. The user can simply touch the responsibility symbol to get more information. In the case shown in FIG. 8C the pop up message 870 indicates to the user that the weather was believed to be primarily responsible for causing energy usage below the weekly average.

Figure 8D:
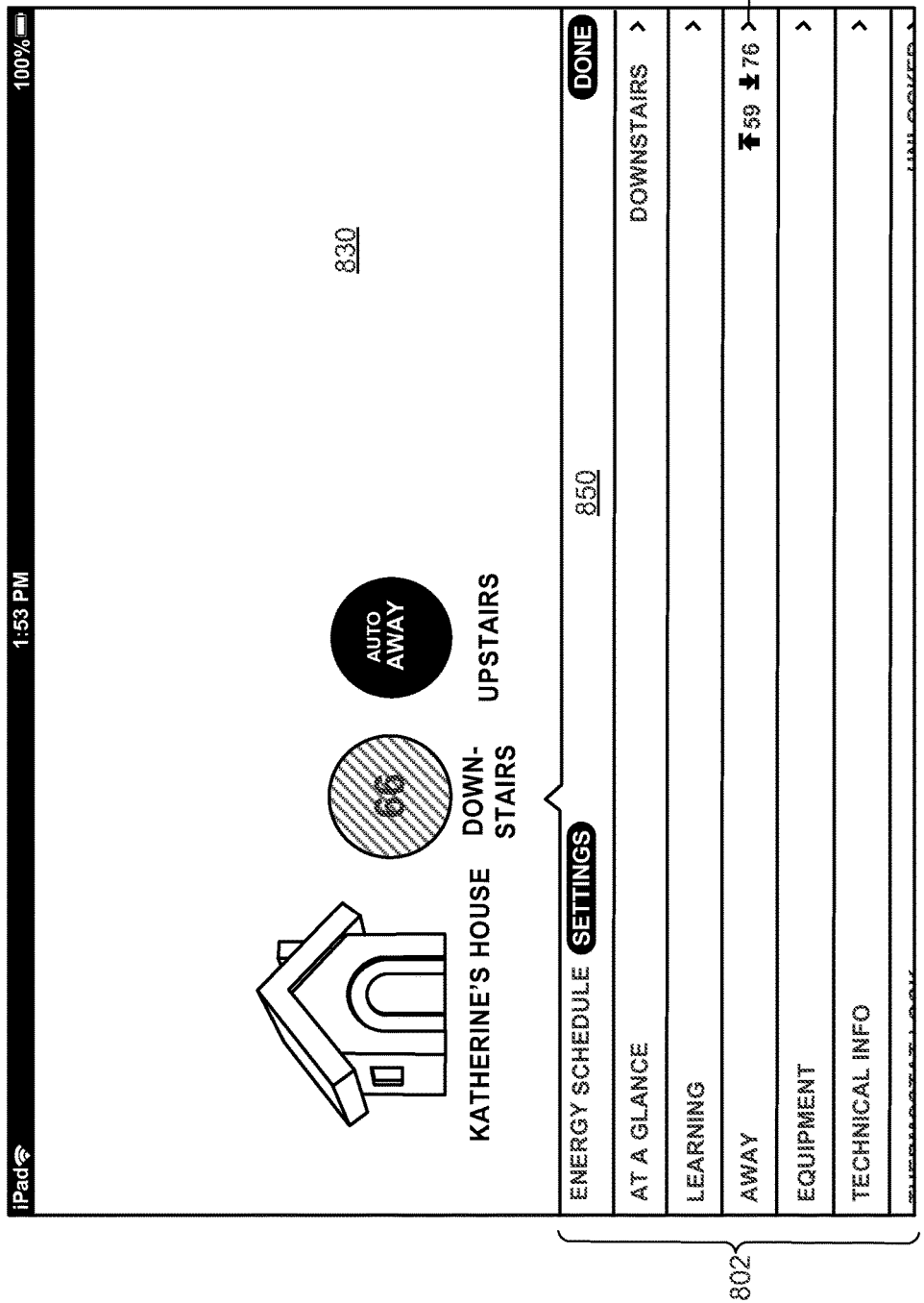
Figure 8E:
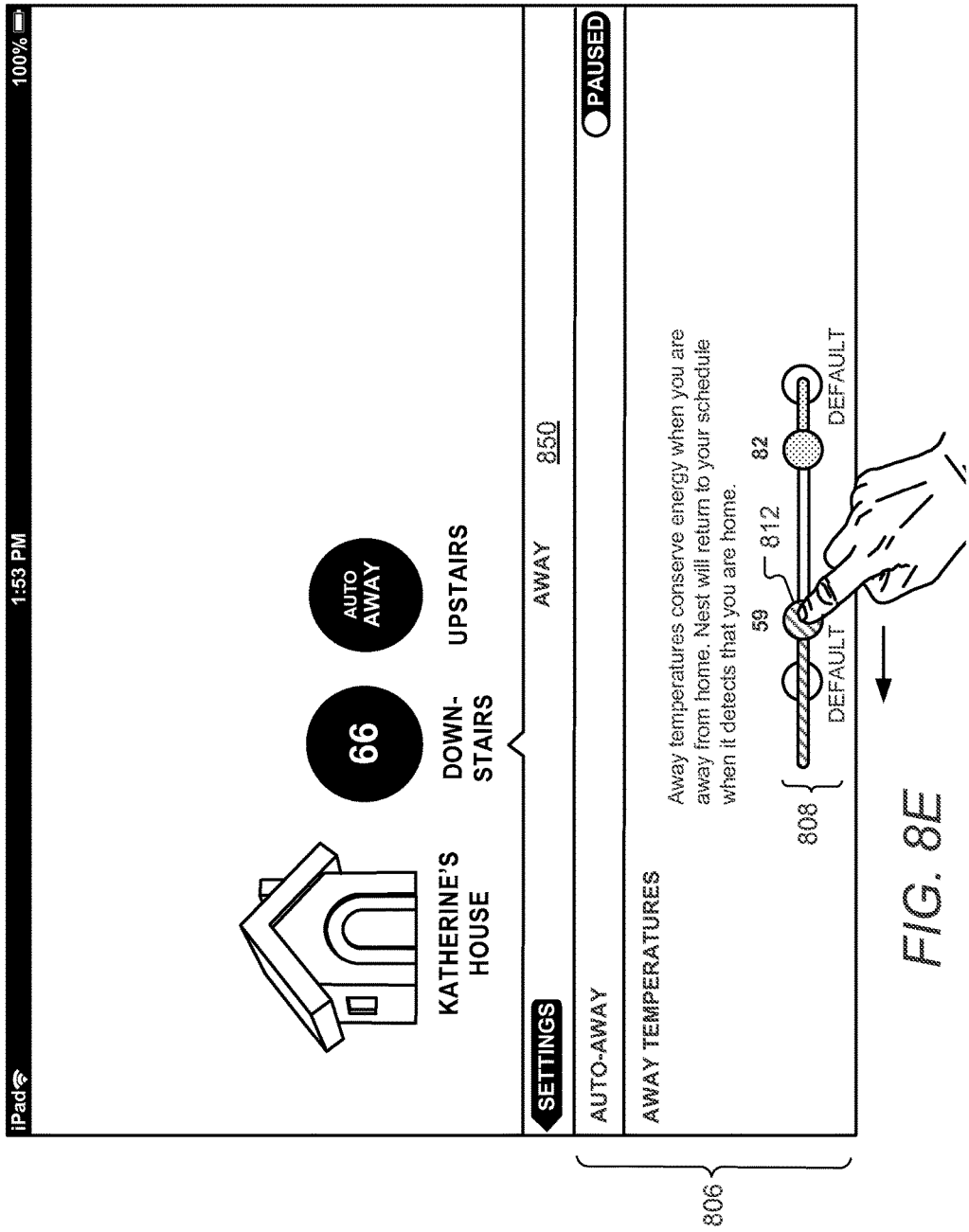

FIGS. 8D-8J show various settings screens on the tablet 510, according to some embodiments. The setting menu for a thermostat is accessed by selecting the option "Settings" from menu 850 such as shown in FIG. 8A. FIG. 8D shows the settings main menu for the downstairs thermostat. Various settings categories are shown in area 802 and the user can scroll up and down through the list using a touch screen gesture according to the particular operating system of the tablet 510. Each of the settings options shown in the rows in area 802 have a right arrow marker such as marker 804. If the marker is selected by the user one or more detailed screens are displayed for that option. If marker 804 is selected, for example, more detailed information for the away settings are displayed, which is shown in FIG. 8E. In FIG. 8E the menu area 850 indicates to the user that a detailed view of the "away" settings are being shown. Also, the user can easily navigate back to the main settings menu by selecting the "Settings" option in menu area 850. The detailed away settings information area 806 includes an auto-away feature toggle (currently the feature is paused, as indicated), and a lower area for showing and setting the away temperatures. A message explains information regarding the away temperature settings to the user. In settings slider 808 the user can view the current away temperature settings, as well as the default. Also, the user can easily set the away temperature by touching and dragging the circular symbol as shown in the case of away heating temperature symbol 812.

Figure 8F:
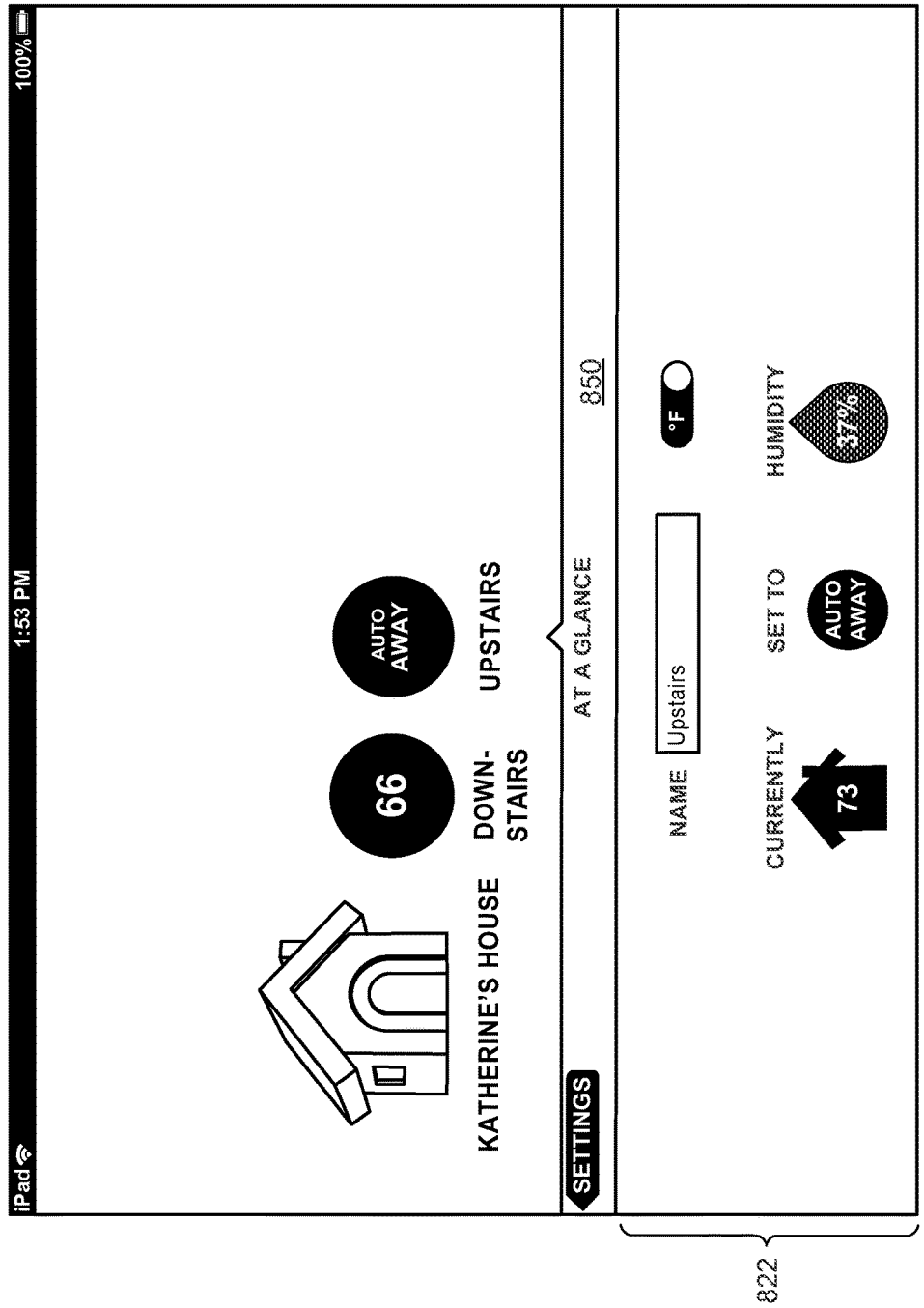

FIG. 8F shows further detail of the "at a glance" information in the settings menu. The area 822 shows the current name of the thermostat which can be changed by the user in the box shown. The current setting for Fahrenheit or Celsius is shown which the user can also change. Also displayed is the current temperature. The current setpoint (in this case the thermostat "upstairs" is set to auto-away, so the auto away temperature will be used as the set point), and the relative humidity.

Figure 8G:
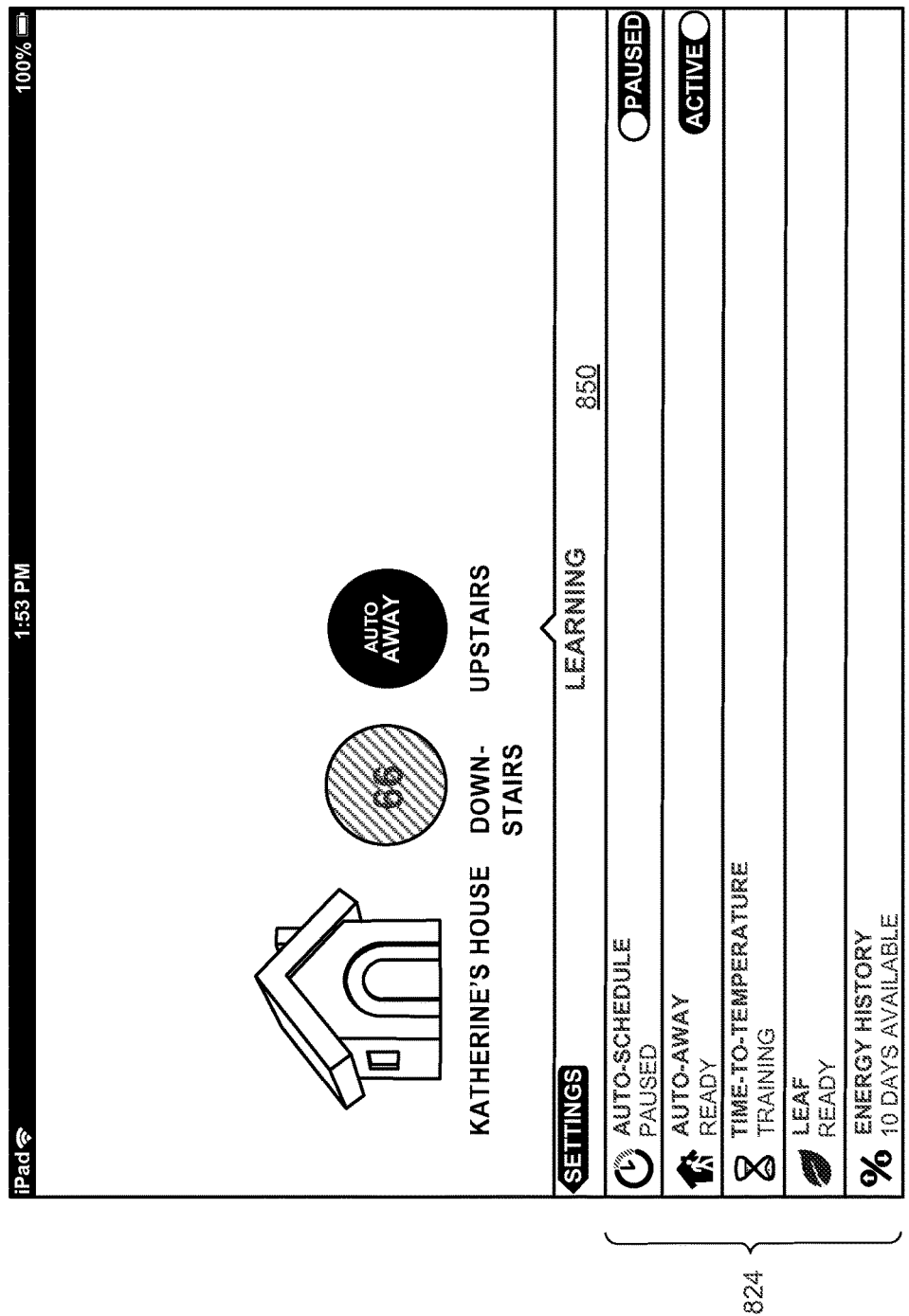

FIG. 8G. shows further detail of the "learning" information are 824 which is accessed from the settings menu shown in FIG. 8D. The learning information area 824 shows the status of various learning algorithms and features such as Auto-schedule (which can be paused or activated); Auto-away (which can also be paused or activated); Time-to-temperature; Leaf and Energy history available.

Figure 8H:
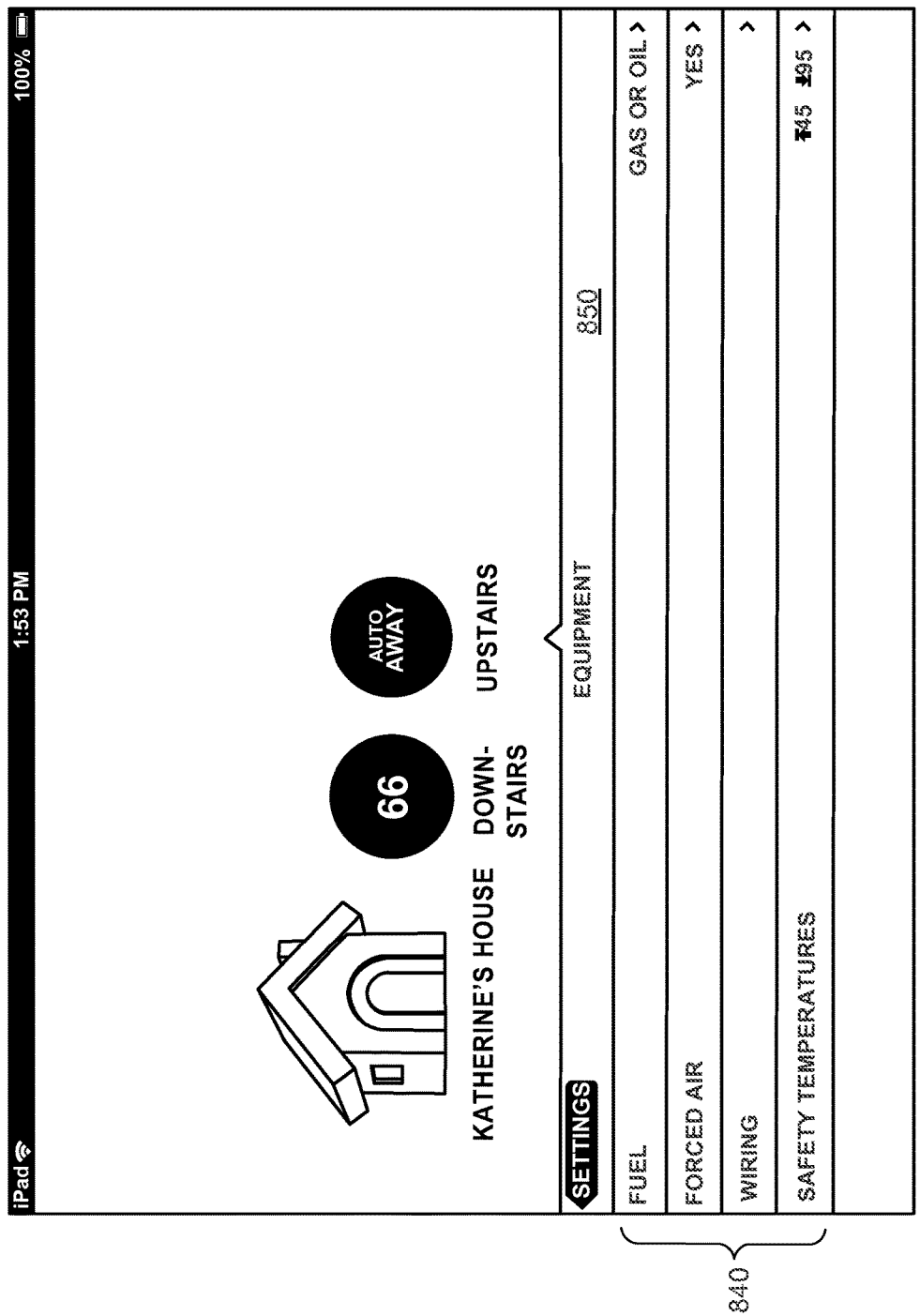

FIG. 8H shows further detail of the "equipment" sub menu which is accessed from the settings menu shown in FIG. 8D. The equipment submenu 840 includes selections for Fuel type, Forced Air, Wiring and Safety Temperatures.

Figure 8I:
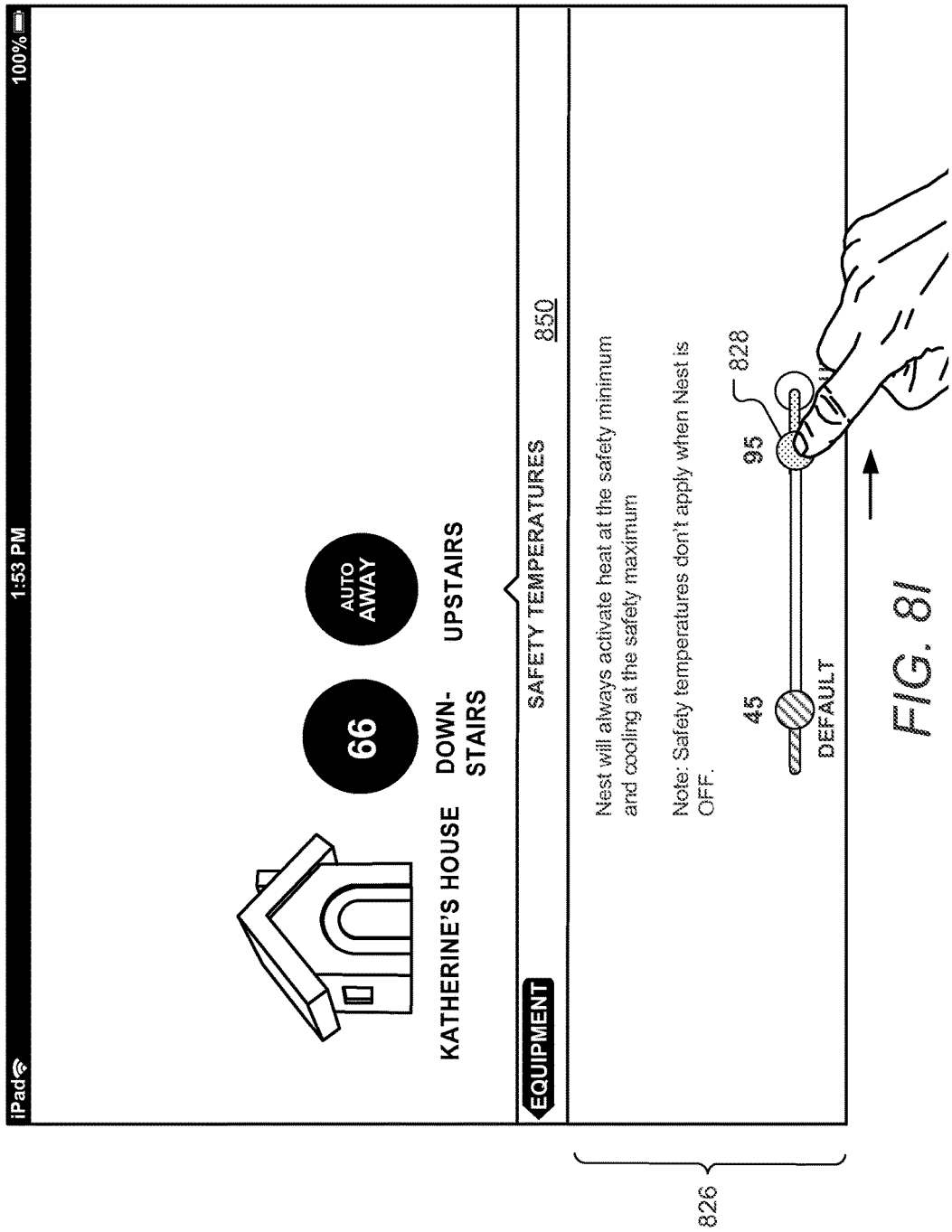

FIG. 8I shows further detail of the safety temperatures, which accessed from the equipment submenu shown in FIG. 8H. The safety temperatures are the minimum (or heating) and maximum (for cooling) temperatures that the thermostat will always attempt to maintain so long as it is switched on. The safety temperature information area 826 includes a message explaining the safety temperature settings. In settings slider the user can view the current safety temperature settings, as well as the default. Also, the user can easily set the safety temperatures by touching and dragging the circular symbol as shown in the case of cooling safety temperature symbol 828. The user is also reminded of the default safety temperature settings as shown.

Figure 8J:
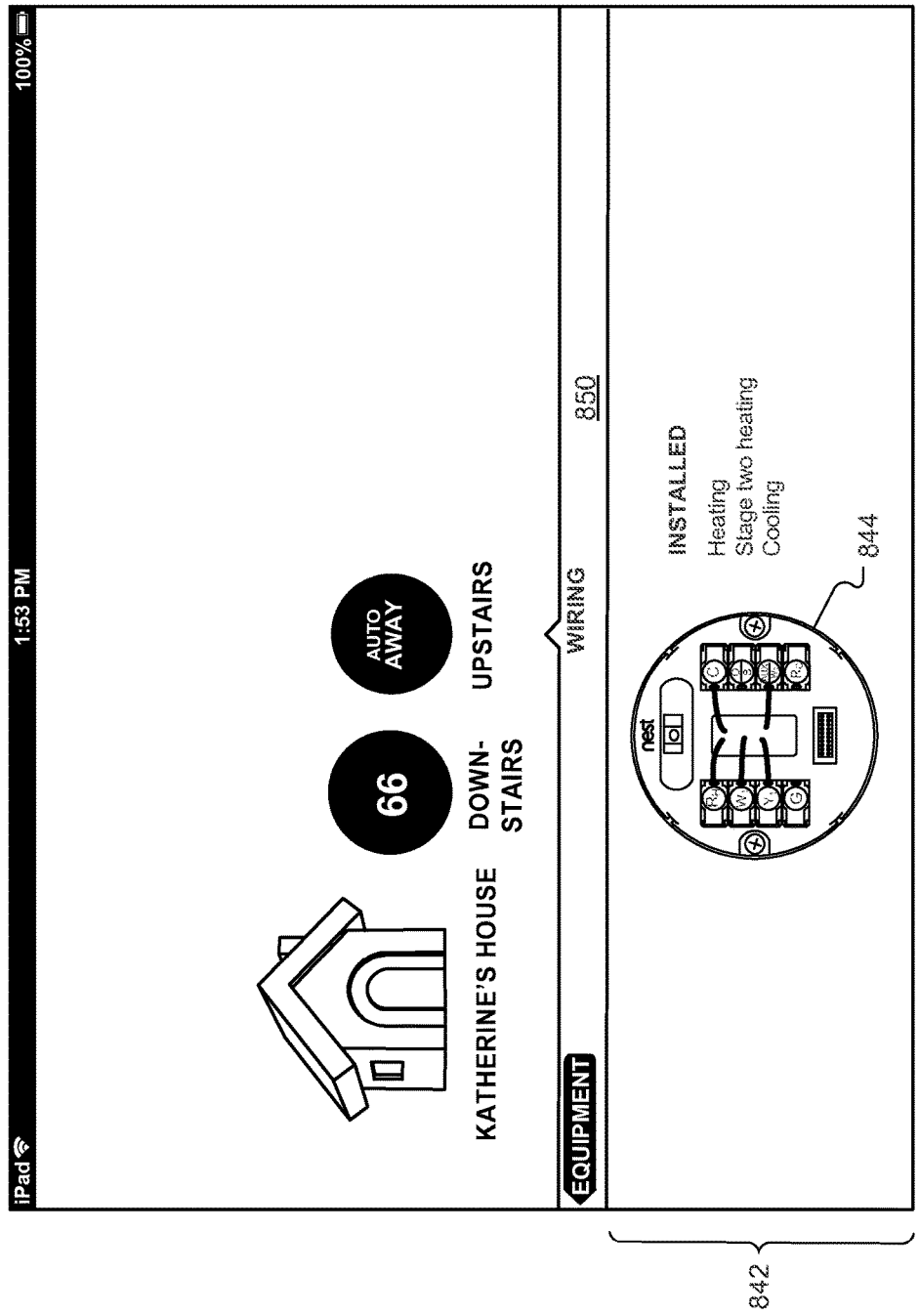
Figure 8K:
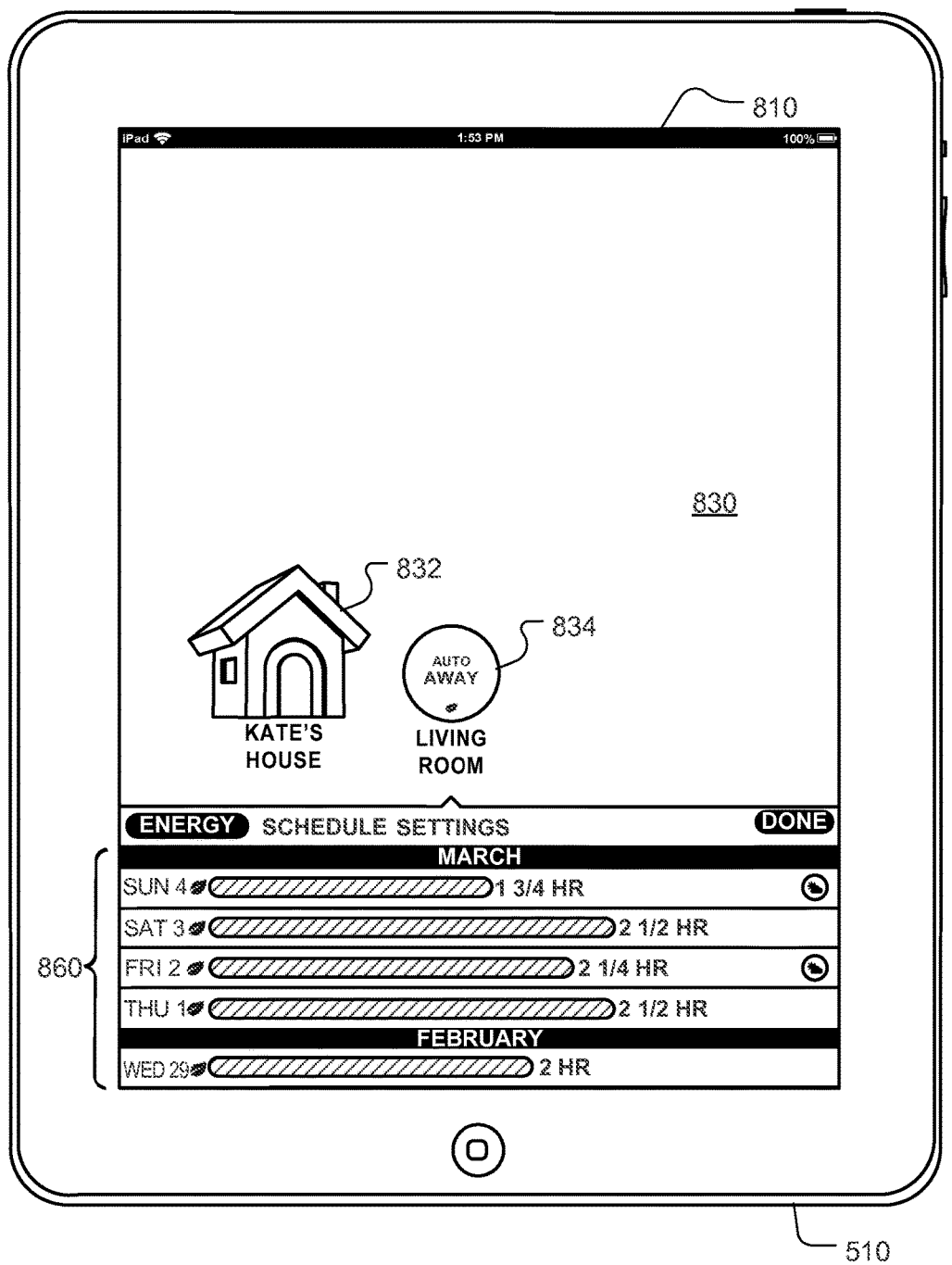

FIG. 8J shows further detail of the wiring information which accessed from the equipment submenu shown in FIG. 8H. The wiring information area 824 shows an image 844 of the thermostat backplate, which indicates which wires are connected to the various wiring connector terminals. According to some embodiments, the wires are shown in colors that match the conventional standard colors used for thermostat wiring. Also shown in area 824 are the HVAC functions that are installed. In the case shown in FIG. 8J, the HVAC installed functions are: Heating, Stage two heating, and Cooling.

FIG. 8J an example of the tablet 510 in a portrait orientation. The information displayed is similar to the information displayed in FIG. 8A.

Figure 9A:
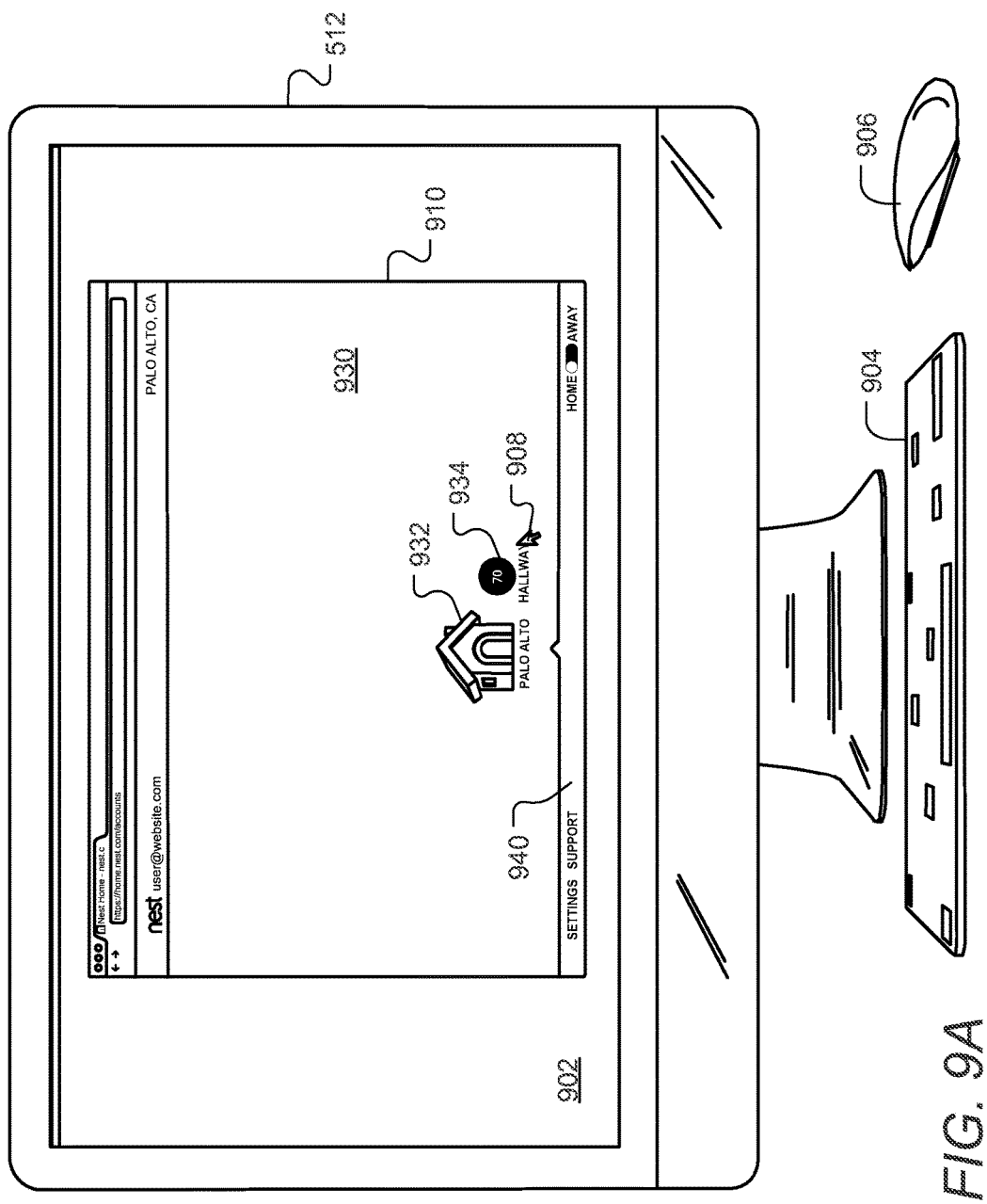
FIGS. 9A-G illustrate aspects of a graphical user interface on a personal computer for performance and other information for an HVAC system controlled by a self-programming network-connected thermostat, according to some embodiments.

FIGS. 9A-G illustrate aspects of a graphical user interface on a personal computer for performance and other information for an HVAC system controlled by a self-programming network-connected thermostat, according to some embodiments. In FIG. 9A, computer 512 is shown as an iMac desktop computer running an Apple OS operating system, although according to other embodiments the computer 512 could be a different type of computer (such as laptop) and/or running a different operating system such as a Windows operating system. Computer 512 has a display 902 on which various types of information can be shown, including window 910. The computer 512 includes a keyboard 904 and pointing device, such as mouse 906 that is used to direct the on-screen pointer 908. The window 910 includes shows an url address area near the top of the window 910 as well as an upper banner area includes information such as the thermostat manufacture's logo, the user's on-line account name, as well as the city name and current outdoor temperature for the location where the user's thermostat is installed. A main window area 930 shows a house symbol 932 with the name assigned in which thermostat is installed. A thermostat symbol 934 is also displayed along with the name assigned to the thermostat. For further details of user interfaces for computing devices relating to thermostats, see co-pending U.S. patent application Ser. No. 13/317,423, which is incorporated herein by reference. The lower menu bar 740 has an arrow shape that points to the symbol to which the displayed menu applies. In the example shown in FIG. 9A, the arrow shape of menu 740 is pointed at the house symbol 932, so the menu items, namely: Settings and Support, pertain to the structure named "Palo Alto." Menu 740 also includes an on/off toggle button on the far right side from which the user can change the status of the structure between "home" and "away."

Figure 9B:
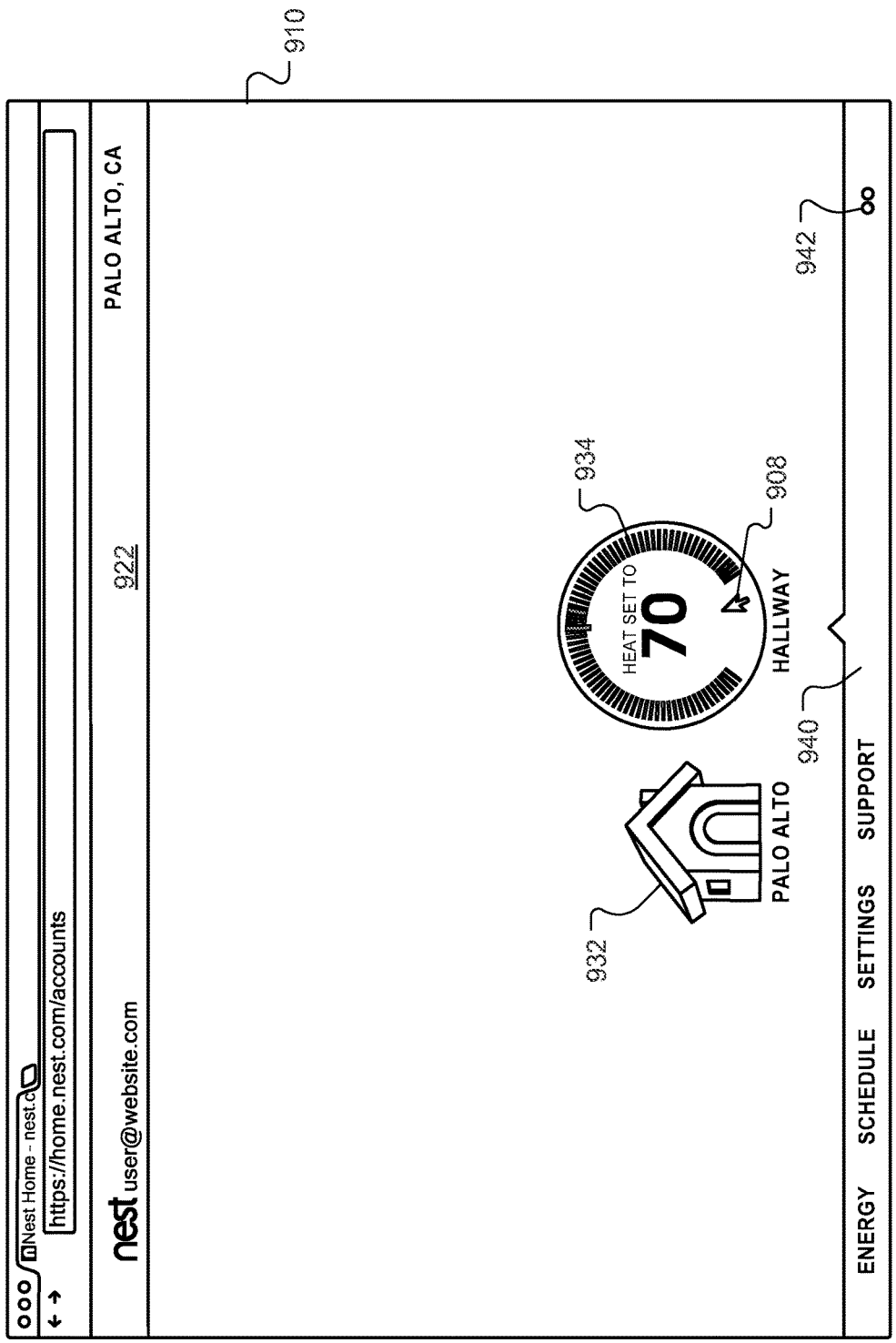

FIG. 9B shows an example of window 910 when the user has selected the thermostat symbol 934 using the pointing device 908. Thermostat symbol 934 enlarges so as to be similar or identical to the thermostat's own display, such that it shows more information such as the current temperature on the tick marks. The menu 940 now displays options that apply to the thermostat named "Hallway." The menu 940 also shows two circle symbols to indicate the currently active HVAC function. In this case the right circle 942 is shaded orange which indicates that the heating HVAC function is currently active. The user can also use the circular symbols to select which function is active or turn the thermostat off, according to some embodiments.

Figure 9C:
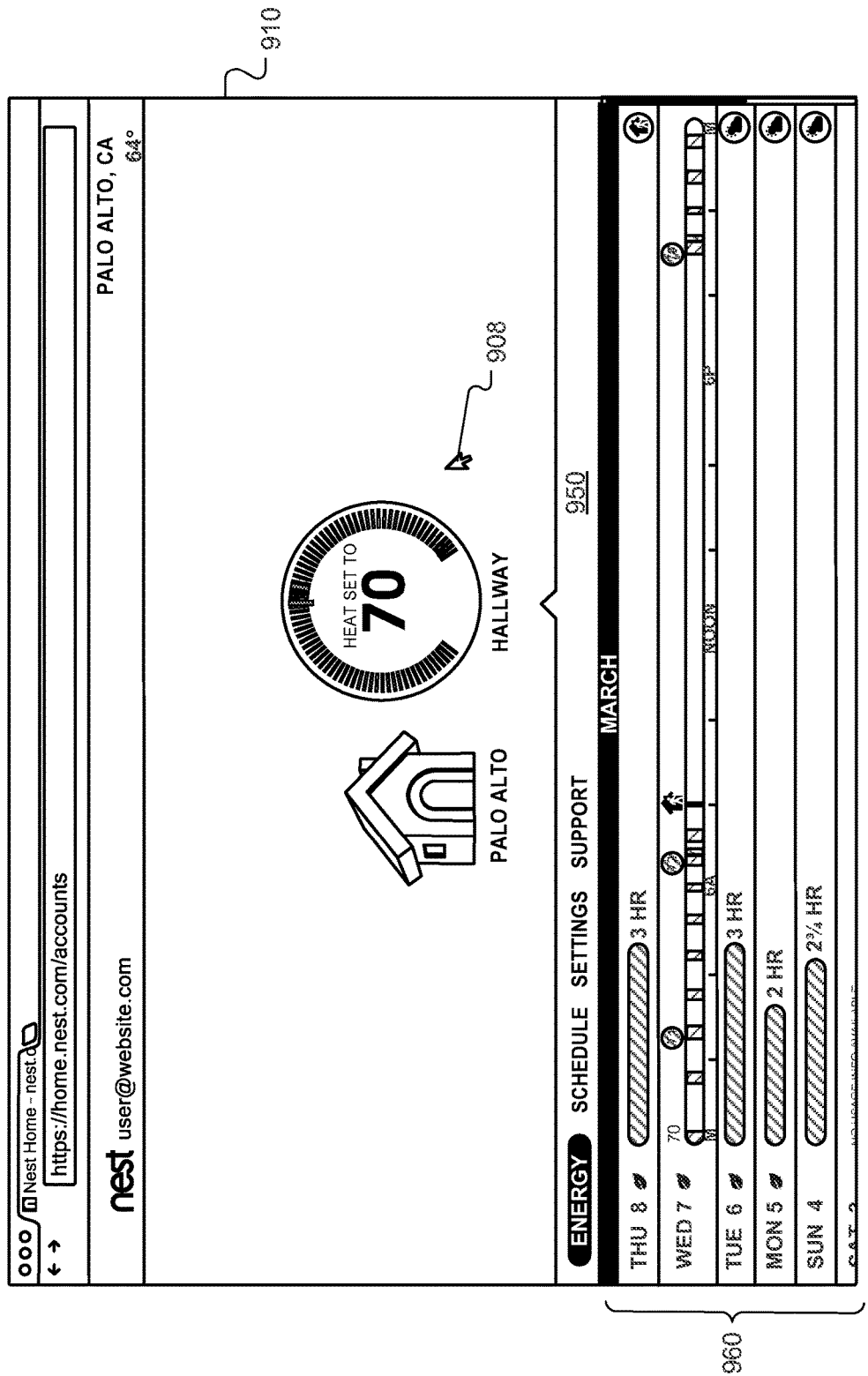
Figure 9D:
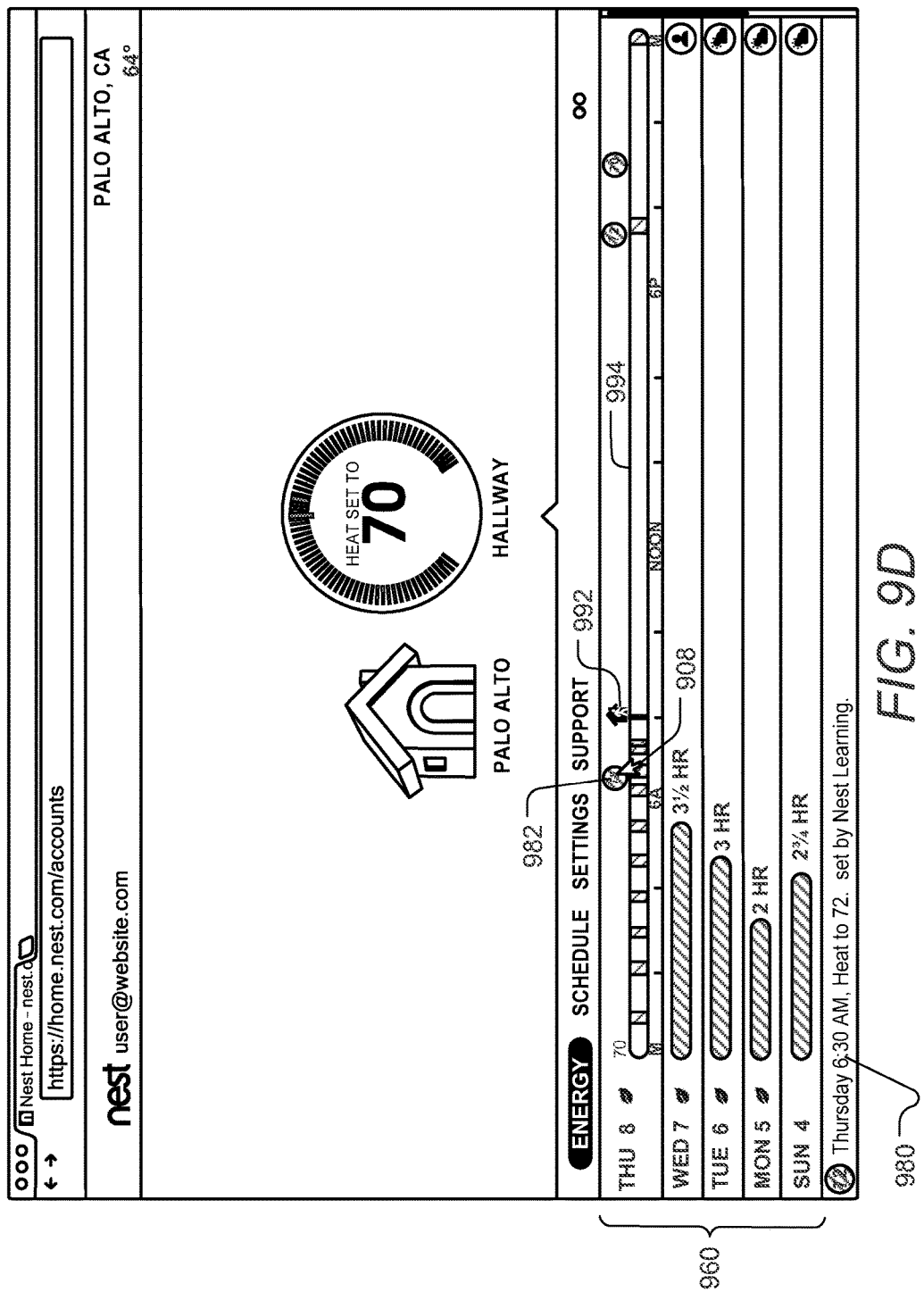
Figure 9E:
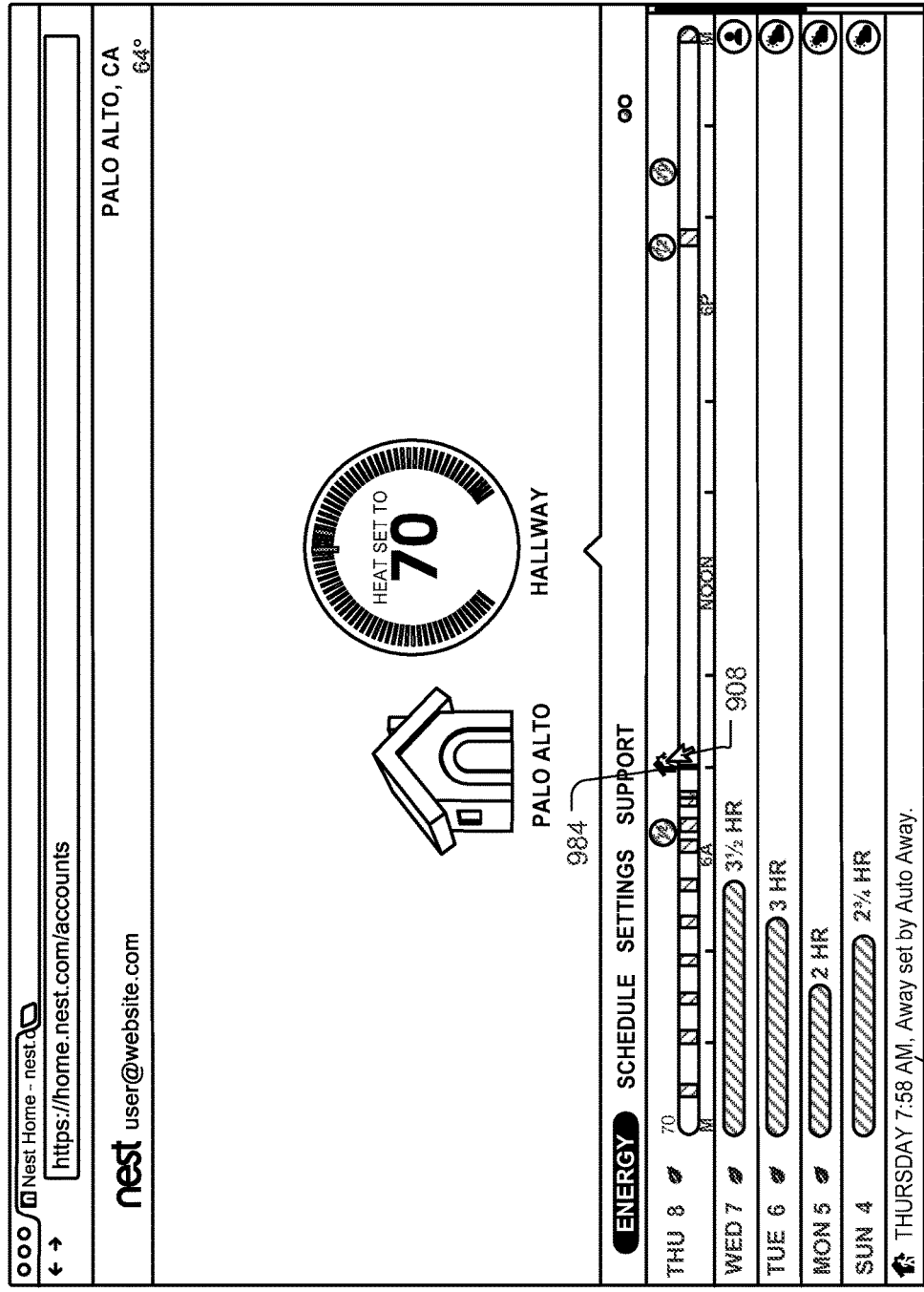
Figure 9F:
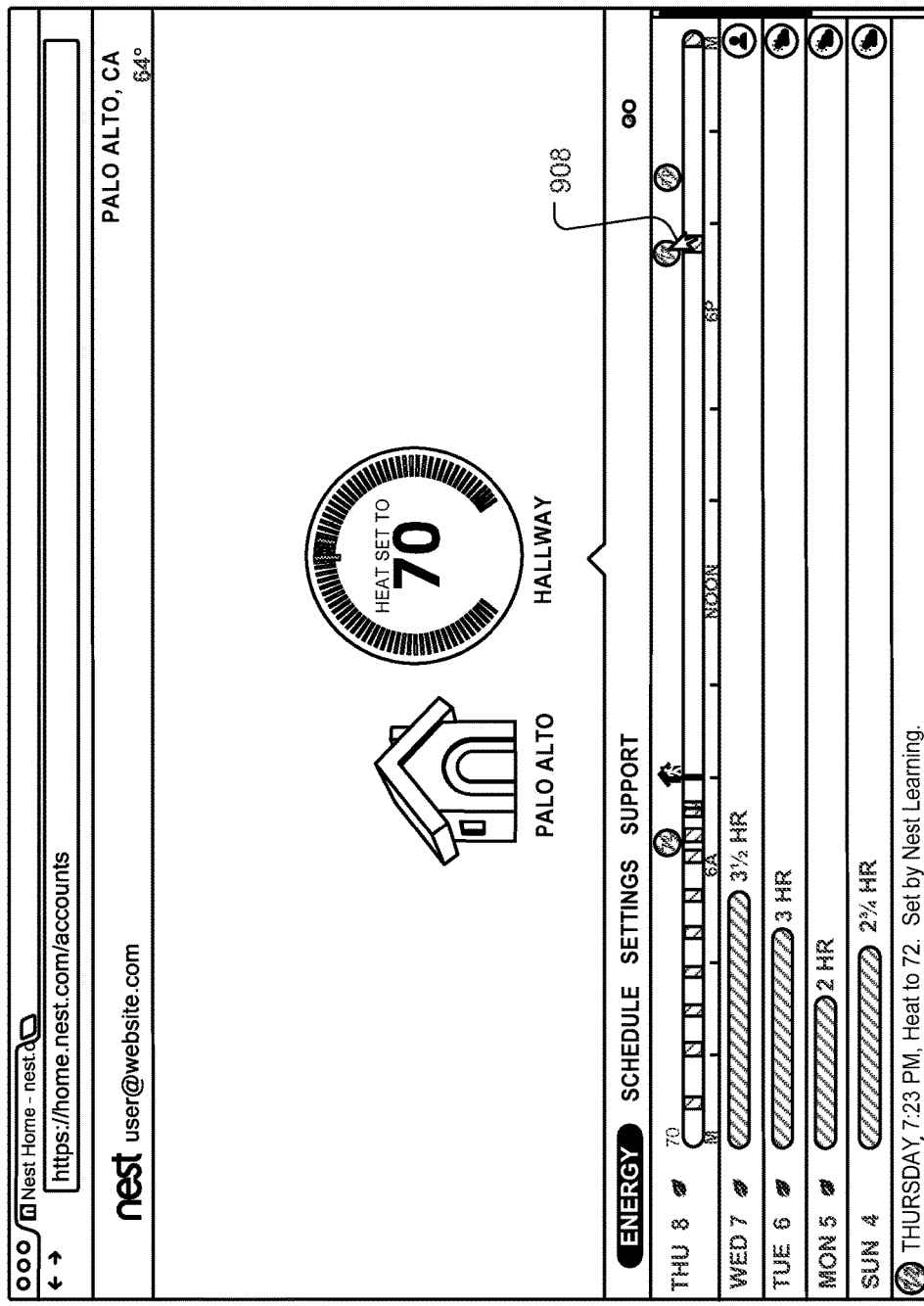
Figure 9G:
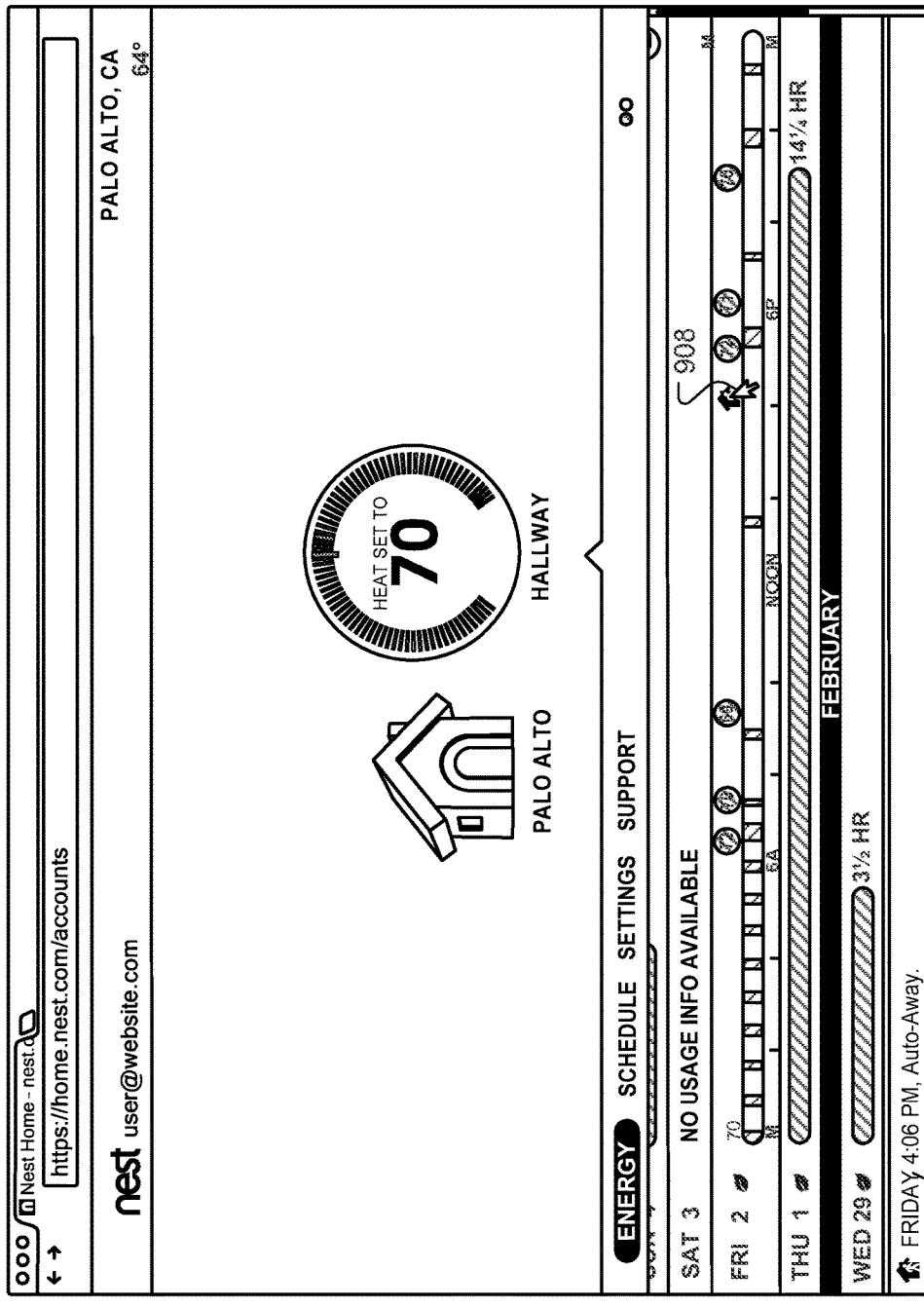

When the "Energy" menu option of selected from menu 740 in FIG. 9B by the user, the window 910 transitions to that shown in FIG. 9C. An upper menu area 750 mimics the menu 940 in FIG. 9B and provides the user location information within the menu structure as well as provides a convenient means for the user to navigate within the menu structure. The lower window area 960 shows energy related information to the user in a calendar format. The individual days of the month are shown below the month banners as shown. The user can use the pointer and the scrolling control area on right side of area 960 to scroll up and down through different days. If a scrolling control and/or gestures are provided on the pointing device (such as a scroll wheel) and other input device (such as a track pad) then it can also be used by the user to scroll through energy data for different days. A leaf logo is displayed in cases where a leaf logo has been awarded for that day. Further details of awarding the leaf logo are provided herein. For each day, a horizontal bar is used to graphically indicate to the user the amount of energy used on that day for heating and/or cooling. In the case of FIG. 9C, multi stage heating was used, and the same shading patterns are used to indicate colors as shown in FIG. 7H. The other aspects of the energy display, including the detailed daily information such as shown for Wednesday, March $7^{th}$ are similar or identical to those shown and described in the forgoing smartphone and tablet computer examples. One difference, however, is that on a computer interface information can be displayed by a user hovering the pointer in certain locations. FIGS. 9D-9G show various example of displaying such information. In FIG. 9D, the user is hovering (but not clicking) the pointer 908 over the setpoint symbol 982. In response, an information banner 980 is displayed which indicates to the user that the symbol represents a setpoint for heating to 72 degrees on Thursday at 6:30 AM. Also indicated is how the setpoint originated—in this case set by Nest Learning, an automatic-learning feature. FIG. 9E shows an example of the user hovering pointer 908 over the away symbol 984, which caused the information banner 986 to display. In this case at 7:58 AM the thermostat was manually (i.e. by a user either directly on the thermostat or remotely) set to an away mode. FIG. 9F shows another example of hovering pointer 908 over a setpoint symbol. Banner 988 indicates that the setpoint at 7:23 PM was set by Nest Learning. FIG. 9G shows another example of hovering pointer 908 over an away symbol. In this case, banner 990 shows that the away mode was triggered by the auto-away feature.

Further description will now be provided for assigning a primary responsibility or causation for either over or under average energy usage, according to some embodiments. Such responsibility information can be used, for example to display the responsibility symbols on the energy user interface screens, such as "weather" symbol 764 in FIG. 7C, "away" symbol 774 in FIG. 7D, and "user" symbol 798 in FIG. 7I. By determining and displaying the primary responsibility to the user, the user can learn to make better choices in order to conserve both energy and costs. Further description of methods for assigning responsibility or causation for above or below average energy usage is also provided infra, with respect to FIGS. 17A-C, according to some other embodiments.

Figure 10:
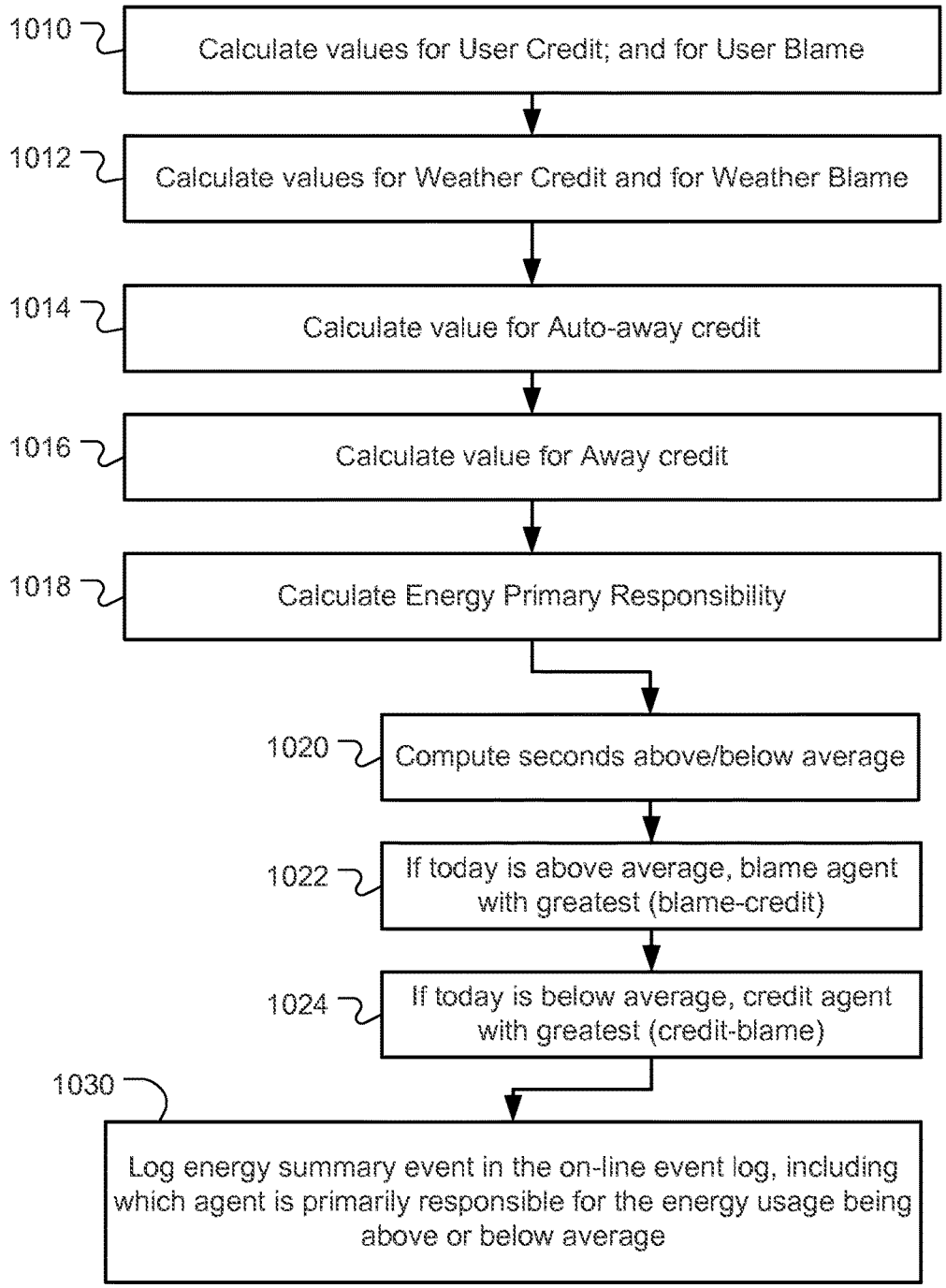
FIG. 10 is a flowchart illustrating a method for determining primary responsibility for above and below average energy usage, according to some embodiments.

FIG. 10 is a flowchart illustrating a method for determining primary responsibility for above and below average energy usage, according to some embodiments. According to these embodiments energy usage is assigned to the User, Weather, Auto-Away, or Away, which are referred to herein as "agents." According to some embodiments, other "agents" can be used instead of or in addition to these, such as thermostat features such as automatic dehumidification, and an automatic schedule adjustment feature, as well as other sources such usage changes due to demand response or other mechanisms used to manage utility consumption. The term blame as used herein refers to a time that a particular agent causes an increase in energy usage. The term credit refers to a decrease in energy usage. The terms blame and credit are equal and opposite, so when determining the overall effect an agent has on energy usage, the affect on energy usage is equal to credit minus blame. If this effect is positive, the agent is responsible for saving energy and if the affect is negative, the agent is responsible for using more energy. In determining primary responsibility among the various agents, the agent that has the largest overall affect on energy usage is considered to be the primary responsible agent. It is assumed that if the usage is above average, that this agent will have a net negative affect on usage, and vice versa. The method shown in FIG. 10, according to some embodiments, is carried out every midnight (local time). According to some embodiments, calculations are made in degree-seconds so that the magnitude of temperature changes as well as the duration is preserved. According to some alternate embodiments the calculations can be made in degree-hours to avoid overflow of fixed point numbers.

In step 1010, values for user credit and user blame are calculated. Note that in this example the user only gets credited or blamed for times when the thermostat is not in Away or Auto-Away mode. For heating, for every 30-second bucket the target temperature and the scheduled temperature at that time are compared. If the system is in OFF mode and ambient temperature is less than the scheduled temperature, the user avoided an inefficient setpoint, so the user is credited 30 seconds times difference between the scheduled temperature and the ambient temperature. If the target and scheduled temperatures are the same, the difference is zero, meaning that the device is running the scheduled setpoint, so the user is neither credited nor blamed. If the target temperature is less than the ambient temperature, and the ambient temperature is less than the scheduled temperature, then the user conserved energy, and the user is credited for 30 seconds times the difference between the ambient temperature and target temperature. If the scheduled temperature is less than the ambient temperature, and the ambient temperature is less than the target temperature, then the user consumed more energy, so we blame the user for 30 seconds times the difference between the ambient temperature and the scheduled temperature.

For cooling, for every 30-second bucket, the target temperature and the scheduled temperature at that time are compared. If the system is in OFF mode and the scheduled temperature is less than the ambient temperature, then the user avoided an inefficient setpoint, so user is credited 30 seconds time the difference between the ambient temperature and the scheduled temperature. If the temperatures are the same, the difference is zero, meaning that the device is running the scheduled setpoint, so the user is neither credited nor blamed. If the scheduled temperature is less than the ambient temperature, and the ambient temperature is less than the target temperature, the user conserved energy, so the user is credited for 30 seconds times the difference between the target temperature and the ambient temperature. If the target temperature is less than the ambient temperature, and the ambient temperature is less than the scheduled temperature, the user consumed more energy, so the user is blamed for 30 seconds times the difference between the ambient temperature and the target temperature.

In step 1012, the values for the weather credit and weather blame are calculated. Note that according to some embodiments, this weather values are averaged when finding the primary responsible agent, so that constant weather patterns are ignored. For every 30-second bucket, a calculation is made for the difference between the outside temperature and the scheduled temperature times 30 seconds (the size of bucket). If weather is in the more energetic direction in temperature (e.g. colder in the case of heating or warmer in the case of cooling), the weather is blamed by this amount. If weather is in the less energetic direction in temperature, the weather credited by this amount.

In step 1014, the values for auto-away credit are calculated. Note according to these embodiment Away or Auto-Away are not blamed in any case; they can only be credited. In heating mode, if the heating away temperature is less than the ambient temperature, and the ambient temperature is less than the scheduled target temperature, than away is credited for 30 seconds times the difference between the target temperature and the ambient temperature. In cooling mode, if the cooling away temperature high is greater than the ambient temperature, and the ambient temperature is greater than the scheduled target temperature, then away is credited 30 seconds times the difference between the ambient temperature the target temperature.

In step 1016, the values for away credit are calculated which is the same as described above for step 1014 except for manually initiated away times.

In step 1018 the primary responsible agent is calculated using the method of steps 1020, 1022 and 1024. In step 1020, the seconds above/below average is calculated by summing total activity (heating, cooling, aux) over days in the past week that have enough data (e.g. missing no more than 2 hours) and divide that by the number of valid days. Then the seconds above weekly average is equal to the total activity today minus the average activity. In step 1022, if today is above average, then blame the agent with the greatest (blame−credit). If all values are less than zero, then set the blame to unknown. In step 1024, if today is below average, then credit the agent with the greatest (credit−blame). If all values are less than zero, then set the credit to unknown. Note that according to some embodiments, the weather can only be blamed/credited when at least 18 hours of weather data is available. In step 1030, the energy summary is logged with an event including which agent (user, weather, auto-away, or manual-away) is deemed to be primarily responsible for the above or below average energy usage.

Figure 11A:
FIGS. 11A-B show an example of an email that is automatically generated and sent to users to report energy performance-related information, according to some embodiments.
Figure 11B:
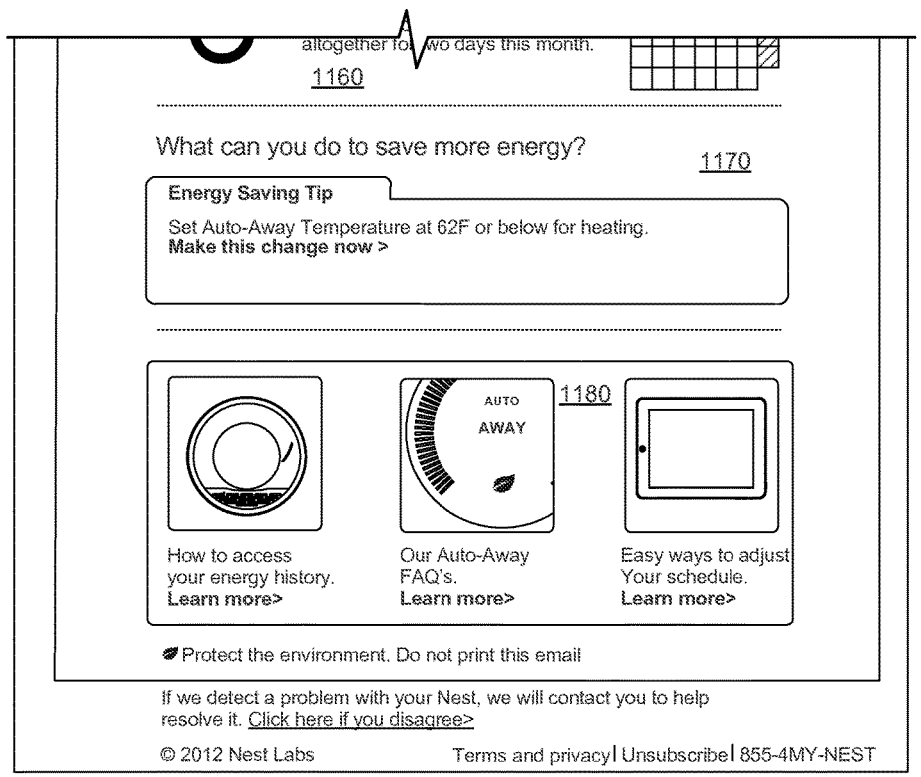

FIGS. 11A-B show an example of an email that is automatically generated and sent to users to report energy performance-related information, according to some embodiments. FIGS. 11A and 11B show the upper part and lower part of the example email 1110 respectively. According to some embodiments the a monthly energy summary email is sent to the user to inform the user of various energy-related data and also provide the user with recommendations so as to enable the user to make better choices in terms of improving comfort and/or conserving energy and costs.

Area 1120 of email 1110 includes the manufacturer's logo, along with the user's account name, location and the dates for which the information pertains. Area 1130 gives the user an energy usage summary for the month. In this calculations indicate that 35% more energy was used this month versus last month. Bar symbols are included for both cooling and heating for the current month versus the past month. The bars give the user a graphical representation of the energy, including different shading for the over (or under) user versus the previous month.

Area 1140 indicates leaf award information. In this case the user has earned a total of 46 leafs overall (since the initial installation). A message indicates how the user compares to the average user. A calendar graphic 1142 shows the days (by shading) in which a leaf was earned. In this case leafs were earned on 12 days in the current month. Details of the leaf algorithm are given in FIGS. 12-15. According to some embodiments, a leaf is awarded for the day, if the leaf is displayed (or would be displayed) for at least one hour during that day.

Area 1150 shows information relating to the auto-away and manual-away features. The calendar symbols 1152 and 1154 show the days that auto-away and/or manual-away was triggered. Also provided in area 1150 is information about the number of hours auto-away was used, recommendations for saving energy and cost, as well as information about averages among other users.

Area 1160 shows information during which the thermostat was switched to "off," and includes a month calendar symbol 1162. Area 1170 provides tips the aid the user in saving more energy. The tips can be customized for the particular user. For example, if the user has set the away temperature for heating to greater than the default 62 degrees, a message can be displayed suggesting a change. A link is also provided to further aid the user in conveniently making the suggested settings change.

Area 1180 provides further assistance such as how to use certain features and obtain further information, along with links for further information and assistance.

Figure 12:
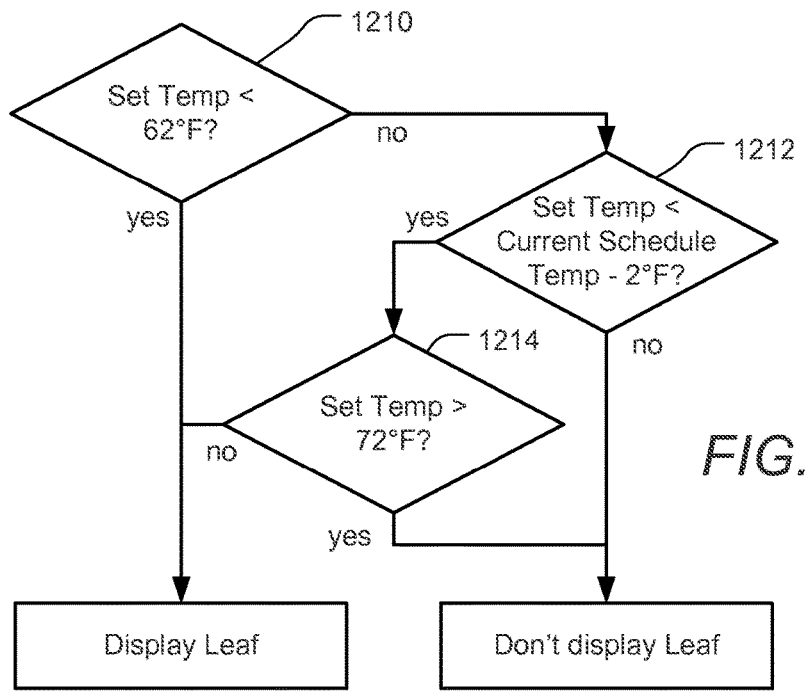
FIGS. 12-15 are flow charts showing steps in determining when a leaf will be displayed, according to some embodiments.

FIGS. 12-15 are flow charts showing steps in determining when a leaf will be displayed, according to some embodiments. FIG. 12 shows the algorithm for displaying the leaf when heating is active. In step 1210, the leaf always shows when the setpoint is below 62° F. In step 1212, if the setpoint is manually changed to 2° F. or more below the current schedule setpoint then the leaf is displayed, except that a leaf is not displayed if the setpoint is above 72° F., according to step 1214.

Figure 13:
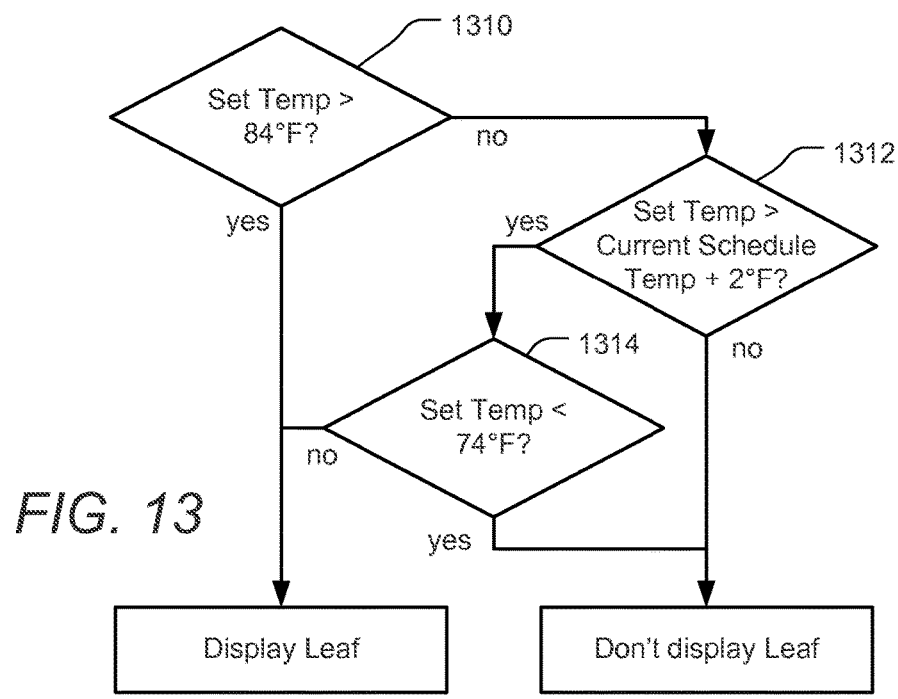

FIG. 13 shows the algorithm for displaying the leaf when cooling is active. In step 1310, a leaf is always displayed if the setpoint is above 84° F. In stop 1312 the leaf is displayed if the setpoint is manually set to 2° F. or more above the current schedule setpoint, except that according to step 1314 t the leaf is not displayed if the setpoint is below 74° F. For purposes of earning a leaf to the day, which is used for example in the energy displays and the energy email shown herein, a leaf is awarded when the leaf has displayed for at least one hour during that day.

Figure 14:
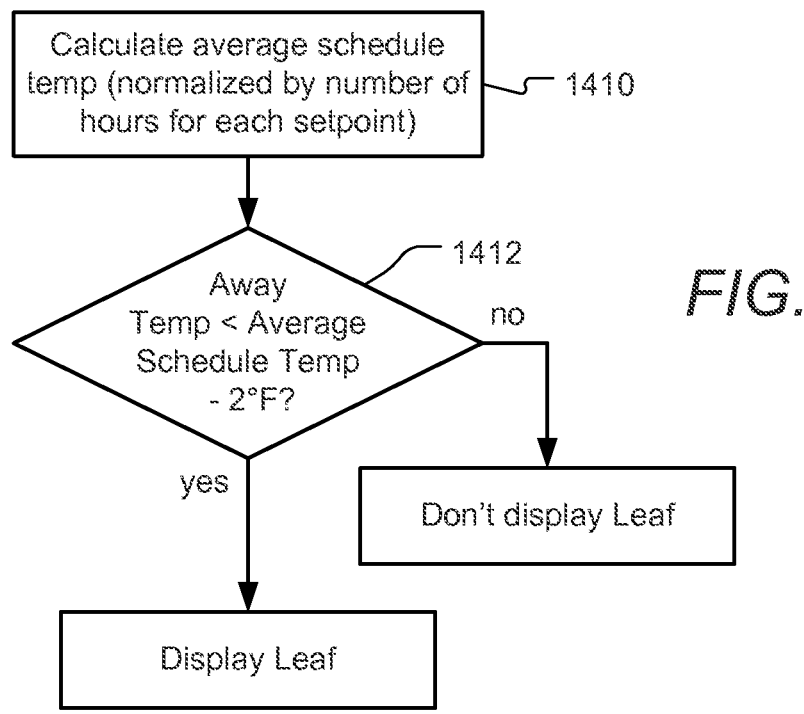
Figure 15:
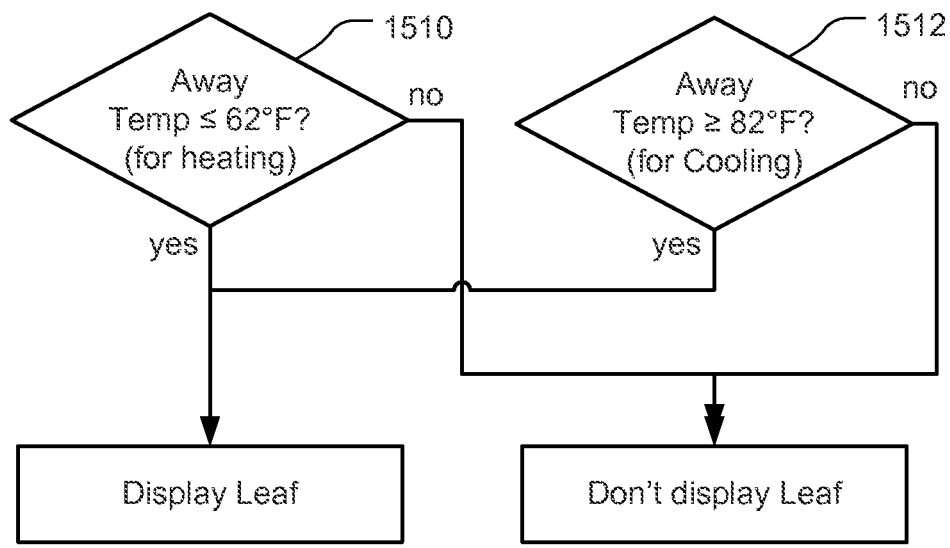

FIGS. 14 and 15 show the algorithms for displaying the leaf when selecting the away temperatures. FIG. 14 shows the general algorithm. In step 1410 an average schedule temperature is calculated by normalizing the setpoints by the number hours for each setpoint. In step 1412, the leaf is displayed if the away temperature is set to 2° F. or more below the average schedule temperature, in the case of heating. The same algorithm can be used for cooling displaying a leaf if the away temperature was 2° F. or more above the average schedule temperature. Furthermore, absolute thresholds for displaying and/or not displaying the leaf such as in FIGS. 12 and 13 can also be implemented in the away temperature algorithm, according to some embodiments. If there is no schedule, e.g. if the thermostat has just been installed, then the algorithm in FIG. 15 is used. In step 1510, the leaf is displayed if the away temperature is set at or below 62° F. for heating. In step 1512, the leaf is displayed if the away temperature is set at or above 82° F. for cooling.

Figure 16:
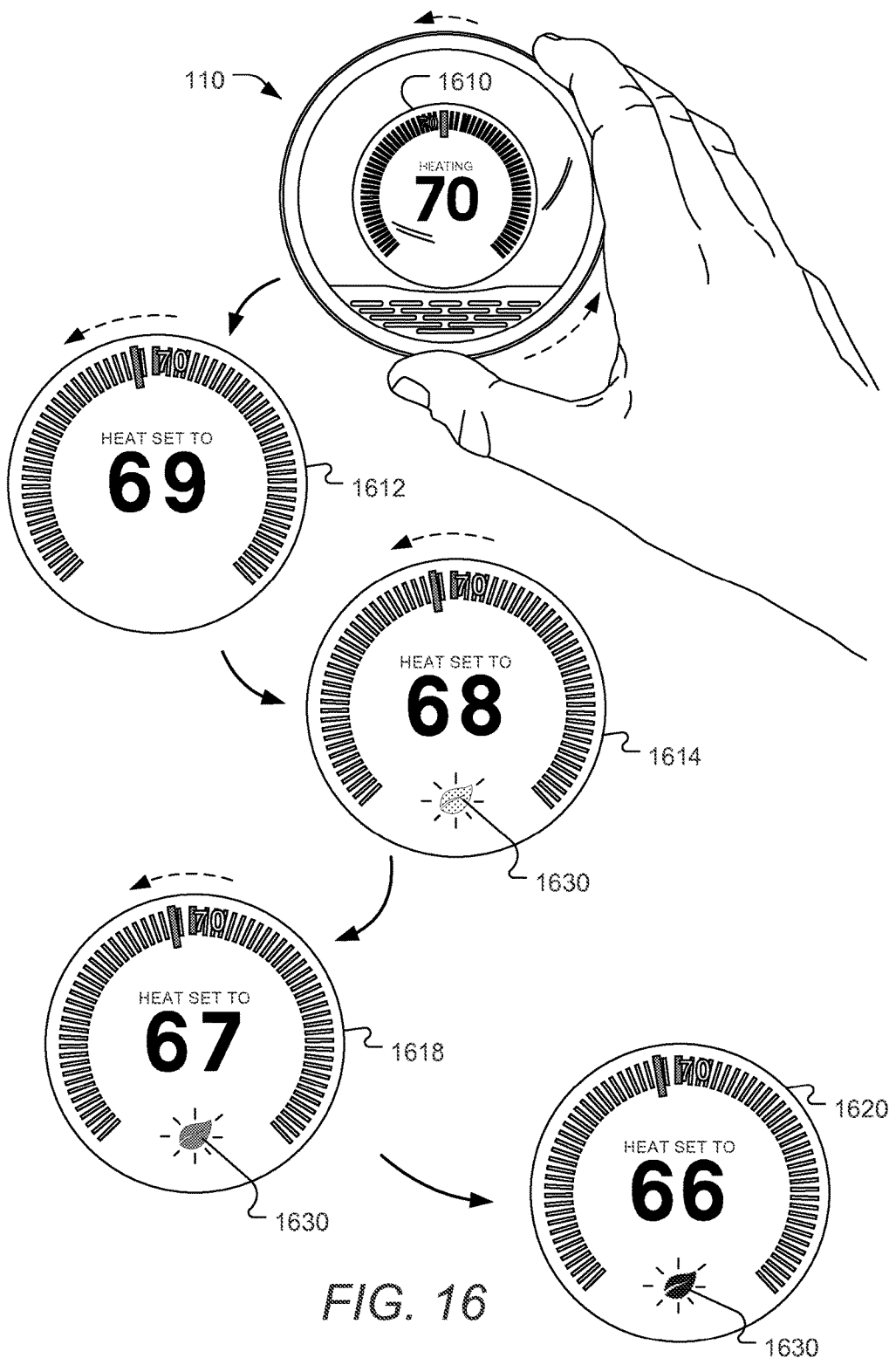
FIG. 16 is a series of display screens on a thermostat in which a leaf icon is slowly faded to on or off, according to some embodiments.

FIG. 16 is a series of display screens on a thermostat in which a leaf icon is slowly faded to on or off, according to some embodiments. Thermostat 110 is shown with at a current setpoint of 70 degrees and a current ambient temperature of 70 degrees in screen 1610. The user begins to rotate the outer ring counter clockwise to lower the setpoint. In screen 1612, the user has lowered the setpoint to 69 degrees. Note that the leaf is not yet displayed. In screen 1614 the user has lowered the setpoint to 68 degrees and according to the algorithm (for example as shown in FIG. 12), the leaf symbol 1630 is displayed. According to these embodiments, however, the leaf is first shown in a faint color (i.e. so as to blend with the background color). In screen 1618, the user continues to turn down the setpoint, now to 67 degrees. Now the leaf symbol 1630 is shown in a brighter more contrasting color (of green, for example). Finally, if the user continues to turn set the setpoint to a lower temperature (so as to save even more energy), in the case of screen 1620 the setpoint is now 66 degrees, the leaf symbol 1630 is displayed in full saturated and contrasting color. In this way the user is given useful and intuitive feedback information that further lowering of the heating setpoint temperature provides greater energy savings.

Figure 17A:
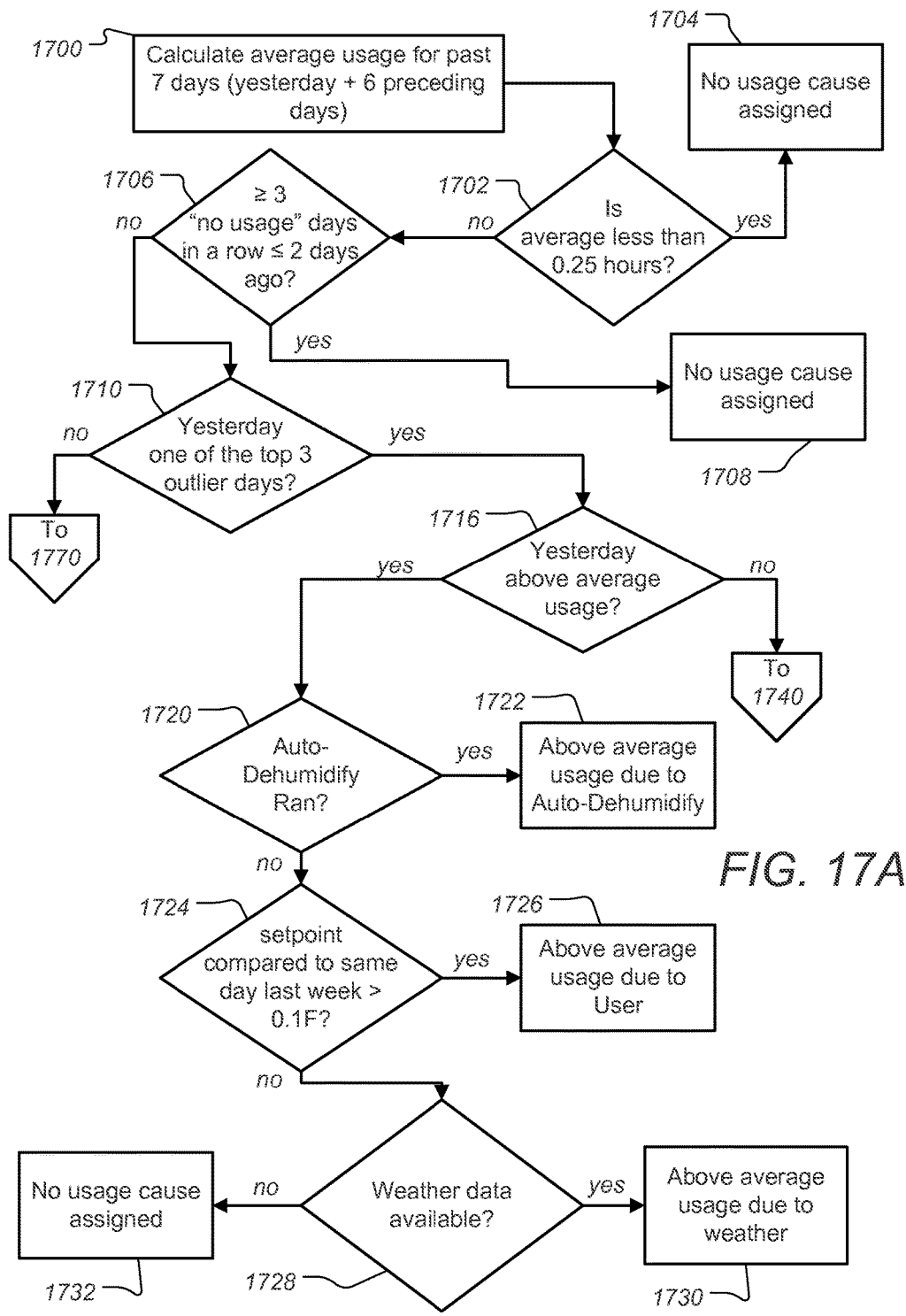
FIGS. 17A, 17B and 17C are flow charts illustrating aspects of assigning a primary causative agent for HVAC energy usage to be above or below average, according to some embodiments.
Figure 17B:
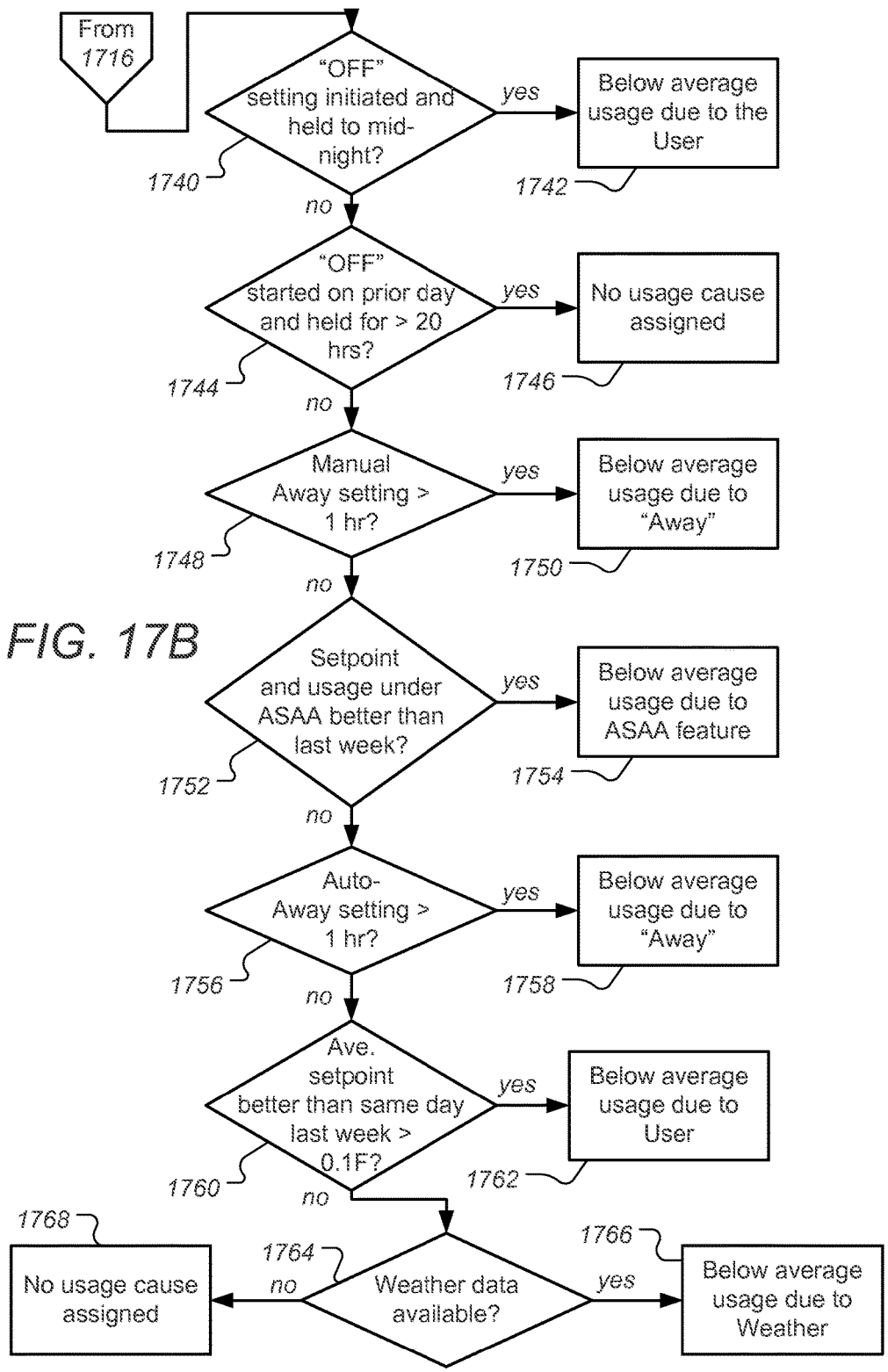
Figure 17C:
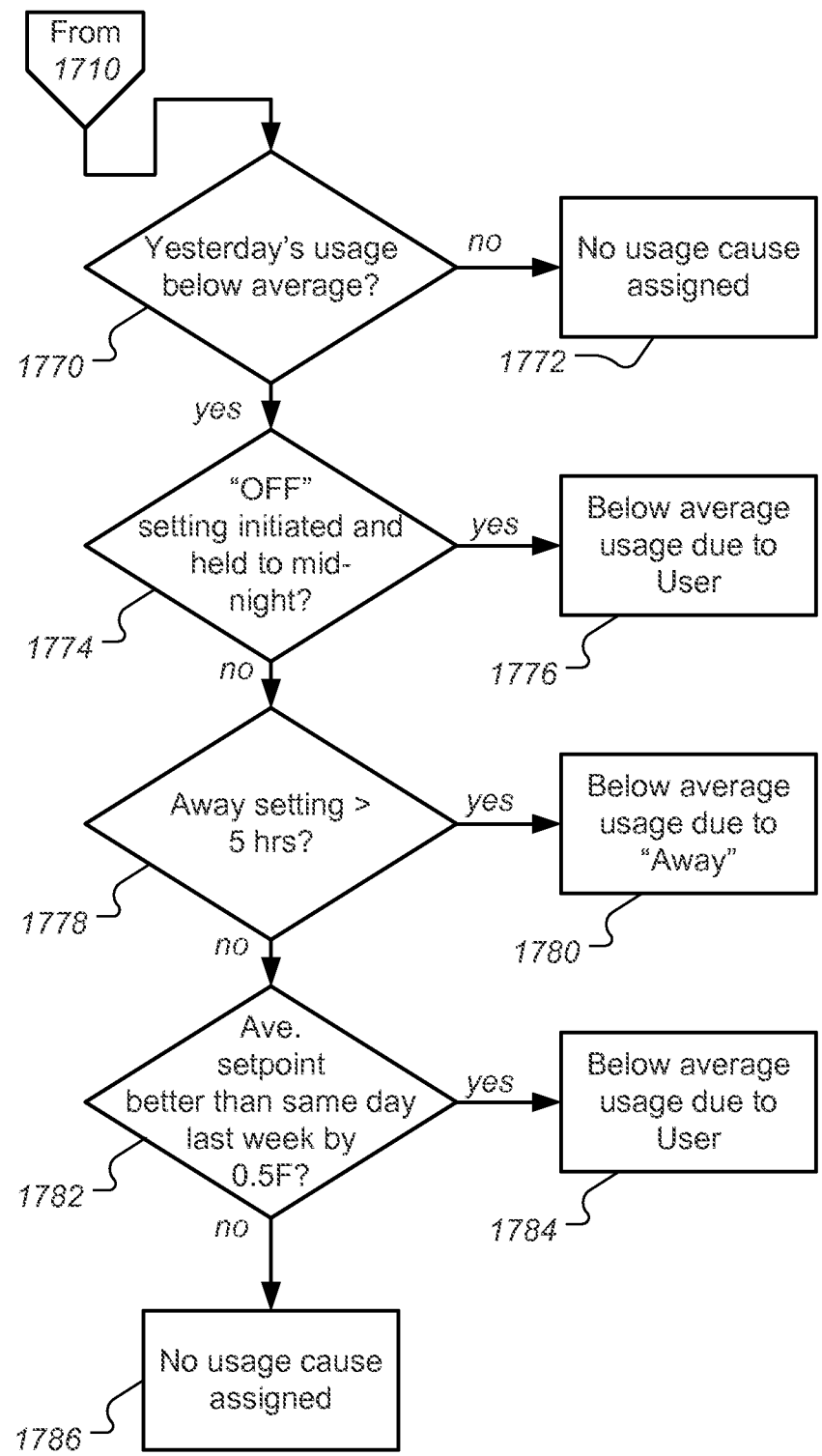

Further description will now be provided for assigning a primary causative agent, that can be used alternatively or in combination with those shown and described supra with respect to FIG. 10. FIGS. 17A, 17B and 17C are flow charts illustrating aspects of assigning a primary causative agent for HVAC energy usage to be above or below average, according to some embodiments. In particular, the flow charts show aspects a process for assigning a primary causative agent for a candidate day being the immediately preceding day (candidate day=yesterday).

In block 1700, average HVAC usage is calculated for the preceding 7 days. According to some embodiments, the HVAC usage is calculated based on the number of hours during that day the HVAC system was operating. For example, during the winter when a heating system is the primary HVAC function, the average number of hours per day the heating system was turned "on" is calculated. In decision 1702, if the average usage is less than 15 minutes per day, then in block 1704 no usage causation is assigned the candidate day (yesterday), since it has been found that such assignments are likely to be inaccurate. In decision 1706, if there are at least three days in a row without any HVAC usage (i.e. a "no usage" day), and the string of no usage days included yesterday or the day before yesterday, then in block 1708 no usage cause is assigned. If the answer to decision 1706 is "no" then control passes to decision 1710.

It has been found that it is particularly useful to for users to be informed as to the primary cause of HVAC energy use being above of below average in cases where the departure from the average is relatively great. In decision 1710 the top three outlier days of the preceding seven days is determined. The degree of "outlier-ness", according to some embodiments, is calculated simply by the distance from the 7-day average calculated in block 1700. If the candidate day, in this case yesterday, is not one of the top three outlier days then control passes to decision 1770 on FIG. 17C. If yesterday is one of the top three outliers then a process is carried out to find a primary cause by passing control to decision 1716. Note that in the example shown in FIGS. 17A-C, the algorithm is run once per day, to attribute a cause for the immediately preceding day. It is possible for there to be more or less than three days in a seven-day period that are considered the top three "outlier" days, since each day is compared with a slightly different seven-day average.

In block 1716, if yesterday's usage was below average then control passes to decision 1740 in FIG. 17B. In cases of above average usage, It has been found that certain usage-intensive HVAC functions when operative, tend to very likely be the cause. One such usage-intensive feature has been found to be automatic dehumidification. In decision 1720, if yesterday's usage was above average, and the automatic dehumidification ran then in block 1722 it is assigned as the causation for the above average usage. In decision 1724 yesterday's setpoints are compared to the same day of the week for the previous week. When comparing setpoints, according to some embodiments, the average setpoint for the day is calculated by multiplying each setpoint in degrees by the number of hours it was active, summing all the setpoints and then dividing by 24. So if the thermostat was set at 65F till 7 am, 70F from 7 am to 8 pm, and then 68F from 8 pm-12 am, the calculation for the average daily setpoint would be: (65*7/24)+(70*13/24)+(68*4/24)=68.21 F. If the average setpoint for the day is not more than 0.1 F in the direction of greater energy usage (i.e. higher temperature when using heating, and lower temperature when using cooling) than the average setpoint for the same day one week prior then control passes to decision 1728. If real weather data is available, such as from the internet or directly sensed outdoors, then in block 1730 the above average usage causation is attributed to the weather. If no weather data is available, then in block 1732 no cause is assigned.

Referring to FIG. 17B, in the case yesterday's usage was below average, and it was one of the top three outlier days of the past week, then in decision 1740 the thermostat's "Off" setting is evaluated. If the thermostat was initially turned "Off" sometime during yesterday, and it stayed "Off" through midnight then in block 1742 the below average usage cause is attributed to the "Off" setting (or to the user's setting of the thermostat to "Off". In decision 1744, if the "Off" setting was initiated on a prior day, and held for more than 20 hours in the "Off" state during yesterday, then in block 1746 no usage cause is assigned. If neither decision 1740 or 1744 are true (e.g. the thermostat was not set to "Off" at all), then control passes to decision 1748 where if the thermostat was set to "Away" for more the one hour during yesterday, then in block 1750 the below average usage is attributed to the Away setting. According to some embodiments and automated schedule adjustment algorithm (ASAA) can be used in which, responsive to a user consent at an outset of a schedule period, the thermostat automatically changes the user schedule toward more energy efficient settings, by slowly relaxing setpoint temperatures over a period of time. In one example the setpoint temperatures are changed over a period (e.g. 1 week), by small amounts (e.g., ½ F) each day. It to be appreciated that other automated schedule change algorithms can be used and them identified as a causative agent. In decision 1752, the ASAA feature is assigned as the cause of the energy savings (in block 1754) if the following are all true (1) the ASAA feature has been in effect; (2) yesterday's average setpoint was at least 0.1 F more efficient than the same day one week earlier; (3) the ASAA feature has not received any "punishing" corrections (i.e. the user manually changes the setpoint in a less efficient direction); and (4) the energy usage for the time window during which the ASAA feature was effective is less than the energy usage during the same time window one week earlier. If one or more of the conditions are not met, then control passes to decision 1756. If the auto-away feature triggered an away status for longer than 1 hour yesterday, then in block 1758, "away" is assigned as the cause for the below average energy usage. In decision 1760, if the daily average setpoint for yesterday is more than 0.1 F in the direction of less energy use, then in block 1762, the below average usage is attributed to the user's settings. If not, then in decision 1764 if weather data is available then in block 1766 the below average usage is attributed to the weather. If weather data is not available, then in block 1768 no cause is assigned to yesterday's below average usage.

FIG. 17C, show the case where yesterday's usage was not one of the top three outlier days of the past week. It has been found that even in such days, if energy usage was below average, it is useful to inform the user of a primary cause in some cases. In decision 1770, if yesterday's usage was not below average, in block 1772 no usage cause is assigned. If usage was below average, the "Off" setting is considered in decision 1774. If the thermostat was set to "Off" initially during yesterday and remained "Off" through midnight, then in block 1776 the below average usage is attributed to the users settings (in this case turning the thermostat off). In decision 1778, if an away setting was effective for longer than 5 hours during yesterday, then in block 1780 the below average usage is attributed to the "away" setting. In decision 1782, the average setpoint for yesterday was more than 0.5 F in the direction of less energy use, then in block 1784 the below average usage is attributed to the user's settings. If not, then in block 1786 no usage causation is attributed. Note that the thresholds in decisions 1778 and 1782 are greater than in decisions 1756 and 1760, since those thresholds were for days where yesterday was one of the top three outlier days of the past week.

According to some embodiments, other types of causative agents can be evaluated and if appropriate assigned at the primary cause of thermostat usage being above and/or below average in manner analogous to that described herein. For example, if the thermostat is responsive to demand response requests from a utility supplier which cause changes in the energy usage, then demand response can be incorporated into the causation algorithm. In this example in FIG. 17B, an additional decision can be made following the "no" branch of decision 1752. If the thermostat responded to one or more demand response during that day, for example, the below average usage can be attributed to user's accepting the demand response request. Another example, is the inclusion of time-of-use features that take into account different pricing per KWH based on time of use of electric energy, which can be incorporated as a causative agent in a similar fashion in the flowchart shown in FIG. 17B.

Figure 18A:
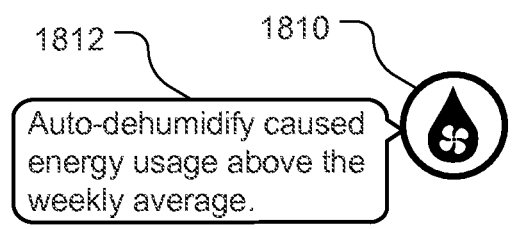
FIGS. 18A and 18B show symbols and textual messages for other types of causative agents that can be assigned to above or below average usage, according to some embodiments.
Figure 18B:
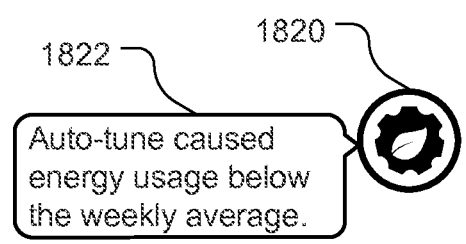

According to some embodiments, the user is notified of the attributed cause for energy usage above and below average using a responsibility symbol appropriate for the attributed type. For example, when weather is attributed as the primary cause for below average energy usage, symbols such as symbol 764 shown in FIG. 7B and symbol 864 in FIG. 8A are displayed. When an auto-away feature or manual away setting are attributed for primarily causing below average energy usage, such as the case in blocks 1750 and 1758 respectively of FIG. 17B, or in block 1780 of FIG. 17C, then a symbol such as symbol 774 in FIG. 7C are displayed to the user. In the case where a user's settings are attributed to below average energy usage, such as in blocks 1742 and 1762 in FIG. 17B, and 1776 and 1784 in FIG. 17C, then a symbol such as symbol 798 in FIG. 7I is displayed. Additionally, according to some embodiments, a textual message is displayed when the user selects the symbol to obtain more detailed information, for example with pop up messages 770 in FIG. 7C; 772 in FIG. 7D, and 870 in FIG. 8C. According to some embodiments the textual message can take the form of "X caused energy usage above/below the weekly average," where "X" is the particular causative agent assigned using the algorithms shown in FIG. 10 or in FIGS. 17A-C. FIGS. 18A and 18B show symbols and textual messages for other types of causative agents that can be assigned to above or below average usage. In FIG. 18A a symbol 1810 and textual message 1812 can be displayed in response to an attribution of an auto-dehumidify feature causing above energy usage, such as in block 1722 of FIG. 17A. In FIG. 18B, a symbol 1820 and textual message 1822 can be displayed in response to an attribution of an ASAA feature causing below average energy usage such as in block 1754 of FIG. 17A.

Figure 19:
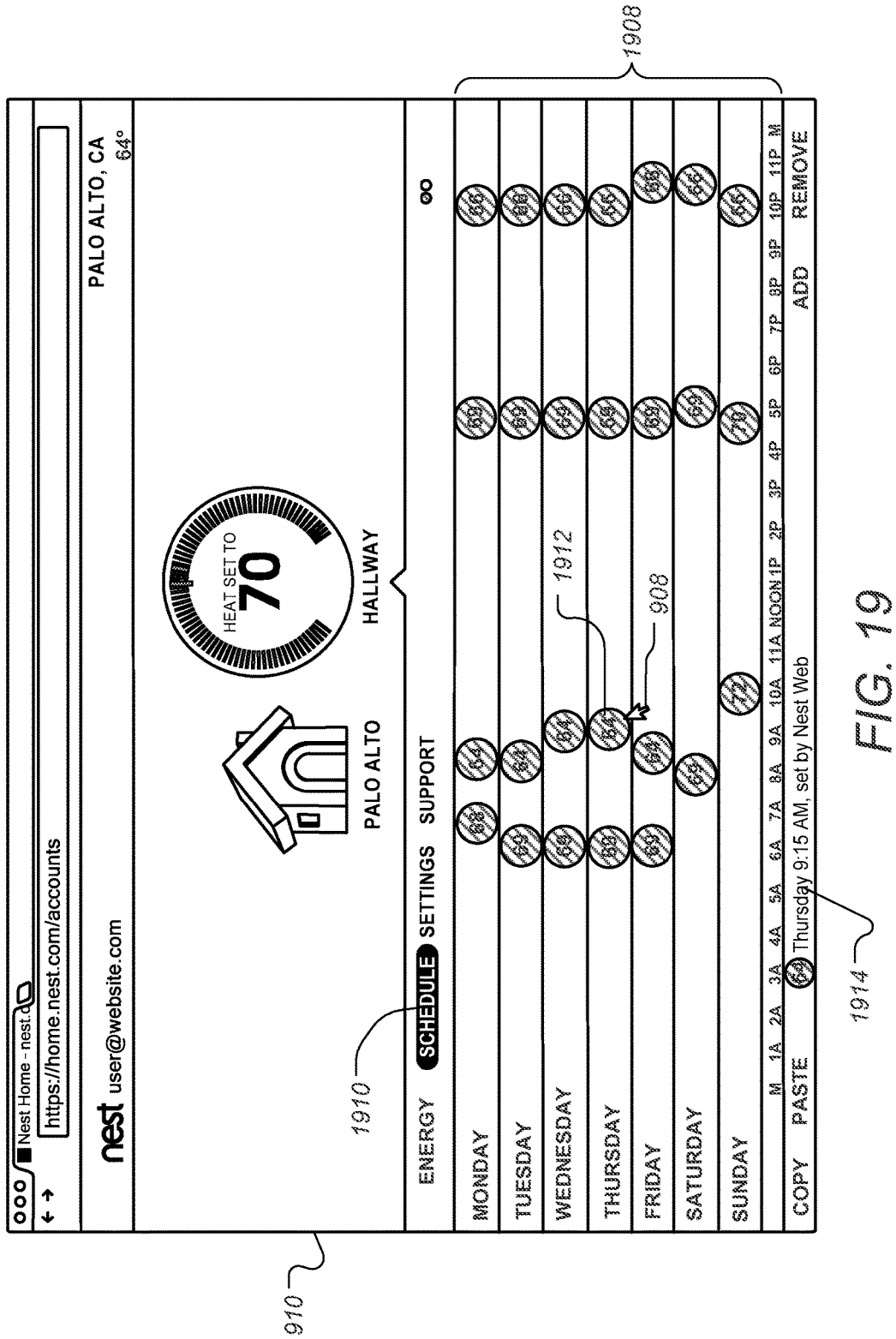
FIG. 19 illustrates aspects of a graphical user interface for interactively displaying schedule information on a personal computer for an HVAC system controlled by a self-programming network-connected thermostat, according to some embodiments.

FIG. 19 illustrates aspects of a graphical user interface for interactively displaying schedule information on a personal computer for an HVAC system controlled by a self-programming network-connected thermostat, according to some embodiments. Window 910, as discussed supra with respect to FIG. 9A, can be displayed on a personal computer running an operating system such as Windows or Apple OS, and can be on any of several types of computers such as desk top, laptop, tablet, etc. In this case, window 910 is displaying schedule information as can be seen by the schedule tab 1910 being highlighted. The schedule area 1908 shows the weekly schedule with the days of the week being shown in separate rows of Monday through Sunday. For each day of the week, the time of day in the horizontal direction as shown by the time of day scale at the bottom of area 1908. Individual setpoints on the schedule are shown with the circular setpoint symbols, each displaying the temperature for that setpoint and each being positioned vertically according to its day and horizontally according to the time of day that the setpoint becomes active. For example, the setpoint symbol 1912 represents and indicates to the user that the setpoint temperature is 64 F and will become active every Thursday at 9:15 AM. The setpoint symbols are also color coded to indicate whether the setpoint is a heating or cooling setpoint (e.g. orange for heat and blue for cool. Since in some cases the exact time may not be easily discerned from the horizontal position of the symbols in area 1908, according to some embodiments the time of day is displayed in a textual message area, as shown by textual message 1914. The textual message 1914 displays the detailed information for the setpoint symbol that is highlighted, or selected by hovering the pointer 908. In this case shown in FIG. 19, the user is hovering pointer 908 over setpoint symbol 1912 and in real-time response, the message 1914 is displayed showing details associated with that setpoint. According to some embodiments, the detailed information also includes a colored setpoint symbol indicating the setpoint temperature as shown. According to some embodiments the detailed information in textual message 1914 also includes information that indicates to the user how the selected setpoint was set. For example, in FIG. 19 the textual message 1914 includes the text "set by Nest Web" for setpoint symbol 1912 which indicates to the user that the particular setpoint was set by a user that was using a web interface.

According to some embodiments, information sufficient to indicate the manner that each setpoint was last set is logged and maintained on one or more servers such as thermostat management system 506 and thermostat backend server 610 shown and described with respect to FIGS. 5 and 6 respectively. According to some embodiments the information on the server(s) is synchronized with information on the thermostat device as well as any of the remote devices having access to the thermostat's schedule. According to some embodiments, the information logged and displayed is sufficient to indicate whether the setpoint was last set by any number of methods (as shown in FIG. 5) such as by a web interface, by a mobile device or directly on the thermostat itself. Further, in some cases, such a with mobile devices, further detailed information can be gathered such as the operating system (e.g. iOS or Android) which would indicate the type of mobile device, as well as in some cases the name of the device, such a "Bill's iPad Mini" or "Kate's iPhone" if such information is available from the thermostat access client software for the particular platform. According to the type of information gathered, several types of information can be displayed to the user. Examples of other textual messages 1914 include: (1) "set by Auto-Schedule" indicating that the setpoint was set by the thermostat's self-learning capabilities; (2) "set by Your Adjustment" indicating that the setpoint was set by a user interacting directly with the thermostat's on-device user interface; and (3) "set by Nest Mobile" indicating that the setpoint was set by a mobile device such as a mobile phone or tablet device. In some cases, where further information is known such as for some mobile devices, the device name can be displayed such as "set by Kate's iPhone." According to some embodiments the words "set by" in the textual message refers to both establishing a brand new setpoint such as by using the "ADD" setpoint button in area 1906, and modifying an existing setpoint by either changing the time of day or temperature associated with the setpoint. In such cases the words "set by" refers to the method in which the setpoint was either created (if unmodified since creation) or last modified. According to some other embodiments other phrases can be used to distinguish between these two case such as "created by" or "last modified by", however it has been found that for most users are not concerned or interested in distinguishing between "created by" and "last modified by" and as such the simple words "set by" or the like is used. Other variations of the language of the textual message can be used such as "last set by."

Figure 20:
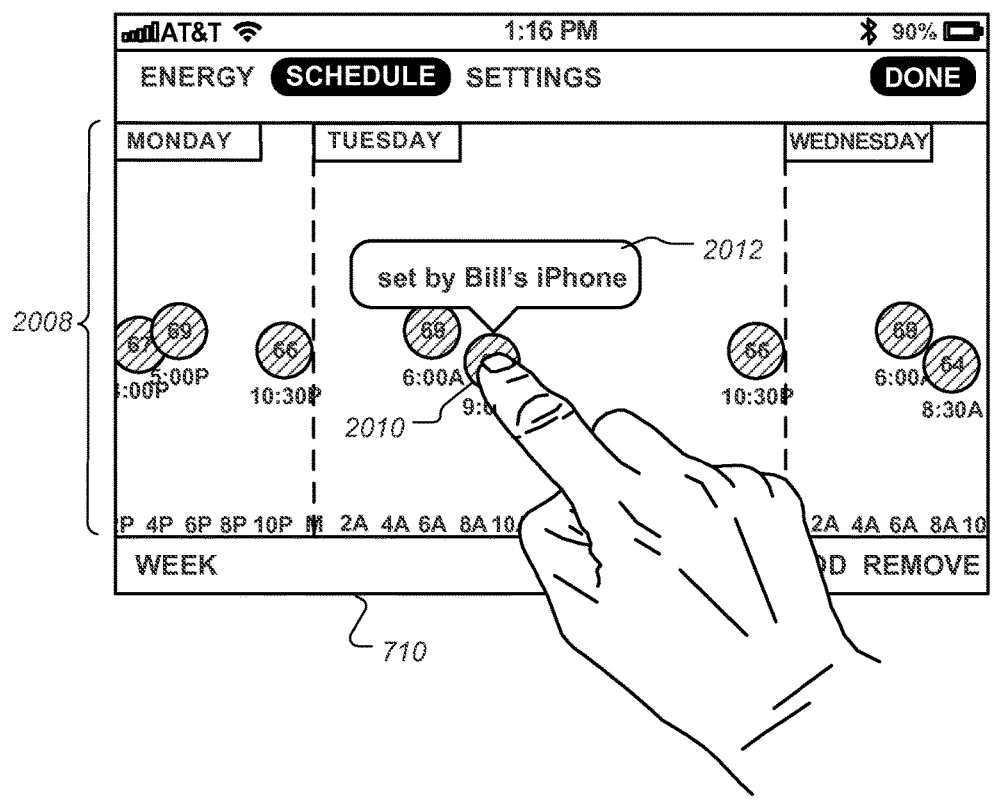
FIG. 20 illustrates aspect of a graphical user interface for interactively displaying schedule information on mobile computing device for an HVAC system controlled by a self-programming network-connected thermostat, according to some embodiments.

FIG. 20 illustrates aspect of a graphical user interface for interactively displaying schedule information on mobile computing device for an HVAC system controlled by a self-programming network-connected thermostat, according to some embodiments. Touch sensitive display 720 is shown and as described above herein, can be on a smart phone such as and iOS or Android smart phone or it can be on a tablet PC or other mobile computing device. Display 720 is showing energy information in on a two-dimensional setpoint plot area 2008. The display area shown setpoints, in this example, of one to two days. In this case, the entire setpoint schedule for Tuesday is being displayed to the user. Further details of the display including navigation is described in commonly-assigned U.S. Ser. No. 13/624,875, filed on Sep. 21, 2012, which is incorporated by reference herein. Each setpoint is represented by a setpoint symbol that is positioned horizontally to indicate the time of day the setpoint becomes active and vertically to indicate the setpoint temperature. The setpoint symbols are also color coded to indicate whether the setpoint is a heating or cooling setpoint (e.g. orange for heat and blue for cool), have a number displayed in the symbol that indicates the setpoint temperature. In response to selection by the user, for example by tapping or double tapping, an information bubble is displayed to the user that provide additional information to the user. For example, in response to the user tapping, touching or double tapping the setpoint symbol 2010, the textual message in bubble 2012 is displayed indicating that the setpoint was set by a mobile device identified as "Bill's iPhone." The gathering of information by one or more servers, and the types of messages indicating the method that the setpoint was create, modified and/or set is as described above with respect to FIG. 19.

According to some embodiments further aspects of interactively displaying setpoint and other energy event information will now be described with reference to FIG. 9D. In FIG. 9D, and example of window 910 is shown that displaying energy information in the lower window area 960, and in particular, detailed energy and performance information is being shown a particular day in response to selection by the user. In this case a main time line activity bar 994 is shown for Thursday the 8$^{th}$. Above activity bar 994 are a number of energy event symbols which include temperature setpoints (both scheduled or due to real-time adjustments during that day) as well as other energy related events such as "away" symbol 992 (which can be used to indicate an away status triggered automatically by a feature such as "auto-away" or set manually by a user). Other examples of energy events that can be symbolically displayed include turning the thermostat "off" or back "on". According to some embodiments other types of events can be shown in the detailed display such as when the thermostat received direct solar radiation. The detailed information for any of the symbolically displayed energy events can be displayed to the user in real-time, such as in response to a hover over with pointing device 908 (or clicking) in the banner area 980. The banner area 980 includes graphical symbol corresponding to the selected symbol, in this case the setpoint symbol corresponding the selected setpoint symbol 982. The area 980 also shown detailed textual information including the day or date and exact time of day corresponding the energy event.

According to some embodiments, the form of textual message can be adapted to the type of energy event. For events triggered by a ad-hoc adjustment, such as a real-time setpoint adjustment, the message takes the form of "set by ____" where the blank is filled in by an appropriate description to indicate the manner in which the ad-hoc adjustment was made. For example if the change was made by via a mobile device "set by Nest web" can be used. Other variations include "Nest Mobile" "Kate's iPhone" for adjustments made using a mobile phone and "Thermostat" where the ad-hoc adjustment was made directly on the thermostat's device user interface. Note that in the example shown in FIG. 9D, the information "Heat to 72" is shown. According to some embodiments, for purposes of simplification, this information can be left off the message since the setpoint icon already conveys this information by the color (e.g. orange for heating, and blue for cooling) and the temperature via the numeral in the symbol.

For events triggered by a scheduled setpoint, as opposed to an ad-hoc, real-time adjustment, the message can be displayed in the form "Schedule set by" followed by the device or manner that the setpoint was created or last modified. In this case, the method of setting information is the same or similar to that described above with respect to FIGS. 19 and 20 (e.g. "Nest mobile," "Auto-Schedule," "your adjustment," "Nest web" and the like).

For events triggered by a scheduled setpoint, with an adaptive recovery algorithm such as an "early-on" feature, the message can be displayed in the form "Started early to reach scheduled temperature set by" and followed by the manner that the setpoint was created or last modified.

For events triggered by an automated schedule adjustment algorithm (ASAA), the message can be displayed in the form "Schedule set by [insert the name of ASAA feature]."

For events triggered by manually setting the thermostat to an "away" status, where the thermostat is set back to an more energy saving setpoint due to non-occupancy, the message can be displayed in the form of "Away set by" followed by the method or device name used to make the setting (e.g. "Nest web," "your adjustment," "Nest mobile," and "Kates iPhone," etc.). When a manually set away status is ended, the form of the message can take several forms depending on the triggering event that ended the away state. For example "Away ended on arrival" is used when the thermostat automatically detected an occupant; "Away ended from [device type or name]" can be used to identify what type of device (web, mobile, on-thermostat) ended the away status. Additionally, if a thermostat feature ends the "away" status such as ASAA algorithm, then "Away ended by" can be used followed by the name of the feature. For events trigged by an "auto away" feature, the messages can take a similar form to the manually set away cases just described but with the word "auto" preceding "away" (e.g. Auto-away set by," "Auto-away ended on arrival," etc.).

For events where the thermostat is switched "off" or back "on" the message can take the form of "Switched off by" or "Switched on by" followed by the type of device (web, mobile, on-thermostat) of name of device that switched the thermostat on or off.

For switchover events (i.e. heating-to-cooling, cooling-to-heating, heating and cooling (e.g. range control)) the message can take the form of "Switched to [Cooling|Heating|Heat•Cool]" followed by the type of device (web, mobile, on-thermostat) of name of device that set the switchover setting.

For emergency heat events, the message can take the form of "Emergency heat started by" followed by the device or feature name or identifier that caused emergency heat to become active.

According to some embodiments, other massage forms can be used. For example for a feature that automatically detects and/or corrects for direct sun exposure on the housing of the thermostat, the message can use a generic description such as "temperature corrected due to direct solar exposure on thermostat housing," or a proprietary name such as "SUNBLOCK™ corrected the temperature."

The subject matter of this patent specification also relates to the subject matter of the following commonly assigned applications: U.S. Ser. No. 13/656,189 filed Oct. 19, 2012; U.S. Ser. No. 29/433,416 filed Sep. 28, 2012; and U.S. Ser. No. 13/624,875 filed Sep. 21, 2012. Each of the above-referenced patent applications is incorporated by reference herein. The above-referenced patent applications are collectively referenced herein as "the commonly assigned incorporated applications."

Various modifications may be made without departing from the spirit and scope of the invention. Accordingly, the invention is not limited to the above-described embodiments, but instead is defined by the appended claims in light of their full scope of equivalents.

What is claimed is:

1. A method of attributing a primary causative agent for HVAC system usage being above or below an average, the HVAC system being controlled by a self-programming network-connected thermostat, the method comprising:
    gathering, by the thermostat, information relating to the HVAC system usage over a plurality of days, wherein:
        the HVAC system usage refers to an amount of energy used by the HVAC system on the plurality of days or an amount of time the HVAC system has operated over the plurality of days;
        the thermostat comprises: a temperature sensor, an occupancy sensor, a wireless network interface, and a processing system, and
        the thermostat is in communication via one of: (1) the wireless network interface with the HVAC system and (2) a plurality of control wires with the HVAC system;
    registering, by the thermostat, the thermostat with a remote thermostat management server system;
    following the thermostat being registered with the remote thermostat management server system, pairing the thermostat with a thermostat management account maintained by the remote thermostat management server system;
    controlling, by the thermostat, operation of the HVAC system via the plurality of control wires or the wireless network interface using data obtained from at least the temperature sensor and the occupancy sensor;
    using the thermostat, gathering information relating to one or more thermostat setpoints over the plurality of days;
    calculating an average value for HVAC system usage for the plurality of days using the gathered information relating to HVAC system usage;
    determining whether HVAC system usage for a candidate day, being one of the plurality of days, is above or below the calculated average value;
    evaluating a first set of potential causative agents when HVAC system usage for the candidate day is below the calculated average value;
    evaluating a second set of potential causative agents when HVAC system usage for the candidate day is above the calculated average value, wherein:
        the first set of potential causative agents and the second set of potential causative agents differ from each other and each comprise multiple causative agents;
    hierarchically evaluating the selected set of potential causative agents for the HVAC system usage for the candidate day being above or below the calculated average value;
    attributing the primary causative agent for the HVAC system usage for the candidate day being above or below the calculated average value using the hierarchical evaluation of the selected set of potential causative agents;
    transmitting, by the remote thermostat management server system, to a mobile device the attributed primary causative agent; and
    providing, by a thermostat access client, via a touch-based user interface of the mobile device, an output indicative of the attributed primary causative agent for the HVAC system usage in response to touch-based user input, wherein the thermostat access client permits access to the thermostat management account with which the thermostat is paired.

2. A method according to claim 1 wherein said hierarchically evaluating and attributing is carried out by the processing system housed within the thermostat.

3. A method according to claim 1 wherein said hierarchically evaluating and attributing is carried out on a processing system which is not housed within the thermostat.

4. A method according to claim 3 wherein the processing system is part of the remote thermostat management server system that is located in a location remote from the thermostat.

5. A method according to claim 1 wherein if the HVAC system usage for candidate day's usage is close to the calculated average value then no primary causative agent is attributed for the candidate day.

6. A method according to claim 1 wherein the candidate day is a day immediately preceding a day on which said calculating, determining, evaluating and attributing are carried out.

7. A method according to claim 6 wherein the plurality of days are seven days immediately preceding the day on which said calculating, determining, evaluating and attributing are carried out.

8. A method according to claim 1 wherein the primary causative agent is selected from a group including: a user, weather, and one or more thermostat features.

9. A method according to claim 8 wherein the one or more thermostat features includes one or more types of features selected from a group consisting of: occupancy detection, automatic setpoint scheduling, auto-dehumidification, and an automated schedule adjustment algorithm.

10. A method according to claim 1 wherein said hierarchically evaluating comprises:
    evaluating a first potential primary causative agent which is attributed as the primary causative agent if a first set of predetermined criteria are met relating to the first primary causative agent are met; and
    evaluating a second potential primary causative agent which is attributed as the primary causative agent if a second set of predetermined criteria are met relating to the second primary causative agent are met, and if neither the first or second sets of predetermined criteria are met, attributing a third potential primary causative agent is attributed as the primary causative agent.

11. A thermostat system for attributing a primary causative agent for HVAC system usage being above or below an average, the system comprising:
    a thermostat management server system; and
    a thermostat in communication with the HVAC system via a plurality of control wires through which the thermostat actuates operation of the HVAC system, the thermostat comprising: a temperature sensor, an occupancy sensor, a wireless network interface for communication with the thermostat management server system, and a processing system, the processing system being configured to:
  register the thermostat with a remote thermostat management server system;
  control operation of the HVAC system via the plurality of control wires using data obtained from at least the temperature sensor and the occupancy sensor;
  gather information relating to HVAC system usage over a plurality of days, wherein the HVAC system usage refers to an amount of energy used by the HVAC system of the plurality of days or an amount of time the HVAC system has operated over the plurality of days;
wherein the thermostat system is configured to:
  following the thermostat being registered with the remote thermostat management server system, pair the thermostat with a thermostat management account maintained by the remote thermostat management server;
  gather information relating to one or more thermostat setpoints over the plurality of days;
  calculate an average value for HVAC system usage for the plurality of days using the gathered information relating to HVAC system usage;
  determine whether HVAC system usage for a candidate day, being one of the plurality of days, is above or below the calculated average value;
  evaluate a first set of potential causative agents in response to the HVAC system usage for the candidate day being below the calculated average value;
  evaluate a second set of potential causative agents in response to the HVAC system usage for the candidate day being above the calculated average value,
wherein:
  the first set of causative agents and the second set of causative agents differ from each other and each comprise multiple causative agents;
  hierarchically evaluating the selected set of potential causative agents for the HVAC system usage for the candidate day being above or below the calculated average value;
  attribute the primary causative agent for the HVAC system usage for the candidate day being above or below average using the hierarchical evaluation of the selected set of potential causative agents; and
  transmitting, to the thermostat management server system, the attributed primary causative agent, wherein the thermostat management system transmits, to a thermostat access client executed by a mobile device, an indication of the attributed primary causative agent for the HVAC system usage, the thermostat access client being linked with the thermostat via the thermostat management account.

12. A non-transitory processor-readable medium for a thermostat management server system, comprising processor-readable instructions that cause one or more processors to:
  register a thermostat with the thermostat management server system;
  following the thermostat being registered with the thermostat management server system, pair the thermostat with a thermostat management account maintained by the thermostat management server system;
  gather information relating to HVAC system usage over a plurality of days from the thermostat, wherein:
    the HVAC system usage refers to an amount of energy used by the HVAC system on the plurality of days or an amount of time the HVAC system has operated over the plurality of days;
    the thermostat is in communication via a plurality of control wires with the HVAC system,
    the thermostat controls operation of the HVAC system using data obtained from at least a temperature sensor of the thermostat and an occupancy sensor of the thermostat; and
    the thermostat actuates operation of the HVAC system via the plurality of control wires;
  gather information relating to one or more thermostat setpoints over the plurality of days;
  calculate an average value for HVAC system usage for the plurality of days using the gathered information relating to HVAC system usage;
  determine whether HVAC system usage for a candidate day, being one of the plurality of days, is above or below the calculated average value;
  evaluate a first set of potential causative agents in response to the HVAC system usage for the candidate day being below the calculated average value;
  evaluate a second set of potential causative agents in response to the HVAC system usage for the candidate day being above the calculated average value,
wherein:
  the first set and the second set differ from each other and each comprise multiple causative agents;
  hierarchically evaluate the selected set of potential causative agents for the HVAC system usage for the candidate day being above or below the calculated average value;
  attribute a primary causative agent for the HVAC system usage for the candidate day being above or below the calculated average value using the hierarchical evaluation of the selected set of potential causative agents; and
  transmit, to a mobile device, the attributed primary causative agent, wherein the mobile device is determined to be linked to the thermostat management account linked with the thermostat and the mobile device executes a thermostat access client that output the attributed primary causative agent in response to touch-based user input.

* * * * *